(12) United States Patent
Morita et al.

(10) Patent No.: US 11,199,840 B2
(45) Date of Patent: Dec. 14, 2021

(54) MOVER CONTROL SYSTEM, MOVER SYSTEM, MOVER CONTROL METHOD, AND NON-TRANSITORY STORAGE MEDIUM

(71) Applicant: Panasonic Intellectual Property Management Co., Ltd., Osaka (JP)

(72) Inventors: Hideo Morita, Osaka (JP); Takashi Ooyama, Tokyo (JP); Koji Arimura, Osaka (JP); Keiji Tanaka, Osaka (JP); Yutaka Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 245 days.

(21) Appl. No.: 16/437,235

(22) Filed: Jun. 11, 2019

(65) Prior Publication Data

US 2020/0012284 A1    Jan. 9, 2020

(30) Foreign Application Priority Data

Jul. 3, 2018   (JP) .............................. JP2018-127158
Jul. 3, 2018   (JP) .............................. JP2018-127159
Jul. 6, 2018   (JP) .............................. JP2018-128881
Jan. 23, 2019  (JP) .............................. JP2019-009546

(51) Int. Cl.
*G05D 1/02* (2020.01)
*G05D 1/00* (2006.01)
*G01C 21/20* (2006.01)

(52) U.S. Cl.
CPC ......... *G05D 1/0212* (2013.01); *G01C 21/206* (2013.01); *G05D 1/0016* (2013.01); *G05D 1/0022* (2013.01); *G05D 1/0287* (2013.01); *G05D 2201/0216* (2013.01)

(58) Field of Classification Search
CPC ............... G05D 1/0212; G05D 1/0287; G05D 1/0016; G05D 1/0022; G05D 2201/0216; G05D 1/0274; G05D 1/0282; G01C 21/206

See application file for complete search history.

(56) References Cited

U.S. PATENT DOCUMENTS

| 9,829,333 | B1 * | 11/2017 | Calder | .................. | G08G 1/166 |
| 2006/0155436 | A1 * | 7/2006 | Matsunaga | .......... | G05D 1/0274 |
| | | | | | 701/23 |
| 2014/0025201 | A1 * | 1/2014 | Ryu | ..................... | G05D 1/0217 |
| | | | | | 700/245 |

FOREIGN PATENT DOCUMENTS

JP    2017-134794 A    8/2017

* cited by examiner

*Primary Examiner* — Anne Marie Antonucci
(74) *Attorney, Agent, or Firm* — Pearne & Gordon LLP

(57) ABSTRACT

A mover control system according to an embodiment includes a controller, a node generator, and a path generator. The controller controls a mover traveling within a predetermined area. The node generator generates a pair of specified nodes at respective arbitrary locations on a map corresponding to the predetermined area. The pair of specified nodes are nodes where the mover is controllable. The path generator generates a path between the pair of specified nodes. The controller makes the mover travel along a traveling route corresponding to the path within the predetermined area.

20 Claims, 24 Drawing Sheets

MOVER CONTROL SYSTEM, MOVER SYSTEM, MOVER CONTROL METHOD, AND NON-TRANSITORY STORAGE MEDIUM

CROSS-REFERENCE TO RELATED APPLICATION

This application claims the benefit of foreign priority to Japanese Patent Applications Nos. 2018-127158 and 2018-127159 both filed on Jul. 3, 2018, Japanese Patent Application No. 2018-128881 filed on Jul. 6, 2018, and Japanese Patent Application. No. 2019-009546 filed on Jan. 23, 2019, all of which are assigned to the assignee of the present application and the entire contents of which are hereby incorporated by reference for all purposes.

TECHNICAL FIELD

The present disclosure generally relates to a mover control system, a mover system, a mover control method, and a non-transitory storage medium, and more particularly relates to a mover control system, a mover system, a mover control method, and a non-transitory storage medium, all of which are configured or designed to control a mover traveling within a predetermined area.

BACKGROUND ART

JP 2017-134794 A (hereinafter referred to as D1) discloses a mover (moving robot) control system including a plurality of movers (automatic carriers) and a server device communicating wirelessly with the movers. In D1, the server device includes a storage device for storing map information, mover route information, and mover information, a route searcher for searching for the mover's traveling route by reference to the map information, and a traveling controller for instructing, in accordance with the route information, the mover where to travel. If the traveling controller determines, by reference to the mover information and the route information, that interference could arise between the movers with their traveling, then the route searcher changes the route information about at least one of the movers that could produce the interference so as to avoid the interference.

In D1, the map information includes a map of a predetermined area as a grid map. When instructing any mover which traveling route to take and how to travel, grid coordinates applicable to the grid map are used. The grid map has a structure in which the map of a given area is divided into a plurality of squares arranged in a grid pattern by a plurality of grid lines that are arranged at generally regular intervals parallel to the X- and Y-axes. This reduces the data size of the map information and facilitates not only the processing of searching for the mover traveling route but also calculation of the traveling information to be given as an instruction to the mover, thus increasing the processing speed of the server device.

Nevertheless, the mover control system of D1 controls the movers on the basis of the grid coordinates, and therefore, is able to control the movers only on the basis of the plurality of squares separated by the grid lines. Therefore, such a mover control system is unable to stop or turn any mover at a halfway location covering two squares, and therefore, could not always perform the best control according to the layout of equipment in a predetermined area.

SUMMARY

The present disclosure provides a mover control system, a mover system, a mover control method, and a non-transitory storage medium, all of which are configured or designed to improve the flexibility of control.

A mover control system according to an aspect of the present disclosure includes a controller, a node generator, and a path generator. The controller controls a mover traveling within a predetermined area. The node generator generates a pair of specified nodes at respective arbitrary locations on a map corresponding to the predetermined area. The pair of specified nodes are nodes where the mover is controllable. The path generator generates a path between the pair of specified nodes. The controller makes the mover travel along a traveling route corresponding to the path within the predetermined area.

A mover system according to another aspect of the present disclosure includes: the mover control system described above; and the mover.

A mover control method according to still another aspect of the present disclosure is designed to control a mover traveling within a predetermined area. The mover control method includes node generation processing and path generation processing. The node generation processing includes generating a pair of specified nodes at respective arbitrary locations on a map corresponding to the predetermined area. The pair of specified nodes are nodes where the mover is controllable. The path generation processing includes generating a path between the pair of specified nodes. The mover control method includes making the mover travel along a traveling route corresponding to the path within the predetermined area.

A non-transitory storage medium according to yet another aspect of the present disclosure stores a program designed to make a computer system execute the mover control method described above.

DESCRIPTION OF EMBODIMENTS

First Embodiment

A mover control system 1 and mover system 10 according to a first exemplary embodiment will now be described with reference to FIGS. 1-18.

(1) Overview

Figure 1:
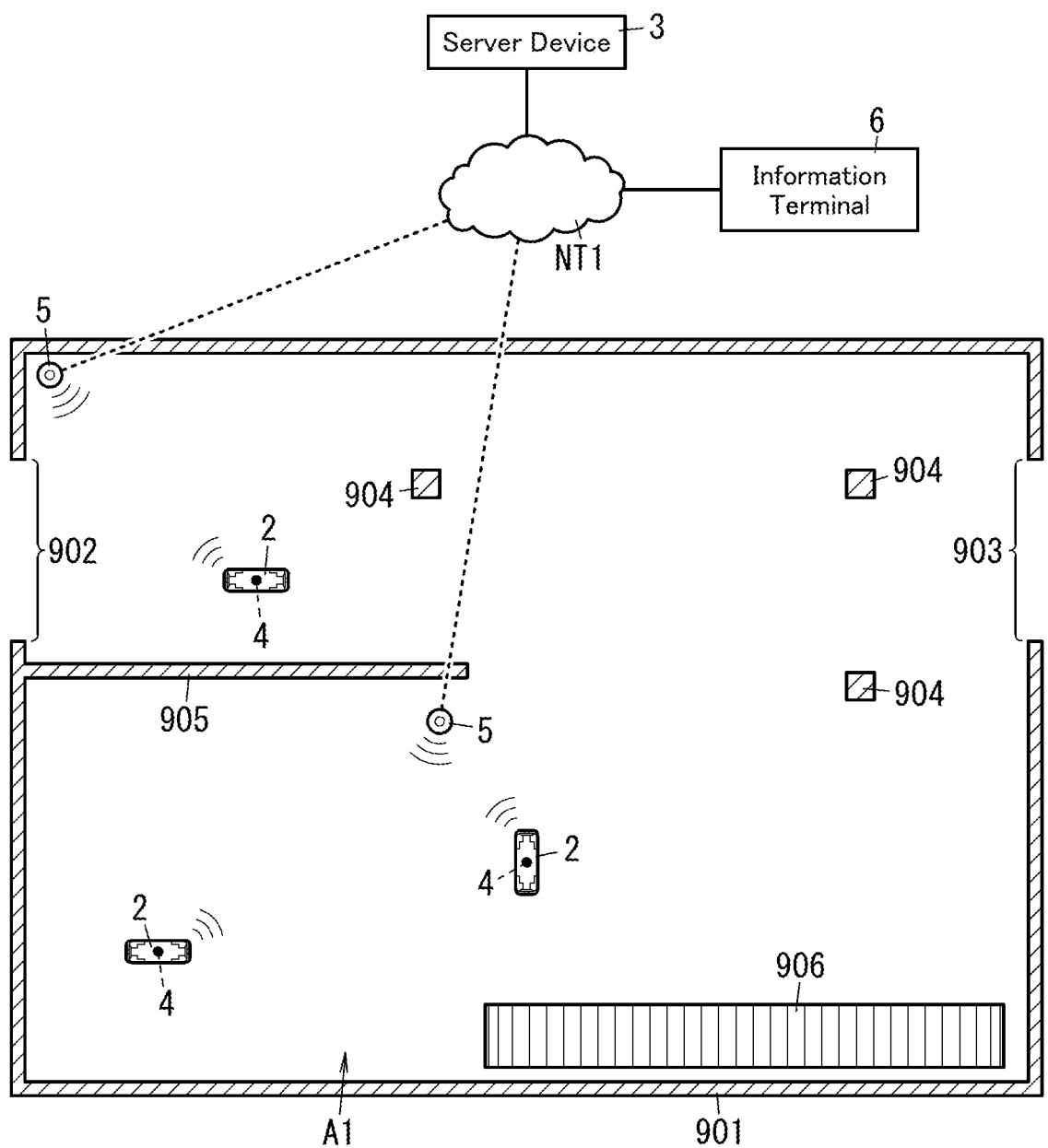
FIG. 1 is a schematic plan view of a predetermined area where movers, which are targets to be controlled by a mover control system according to a first embodiment, are located.
Figure 2:
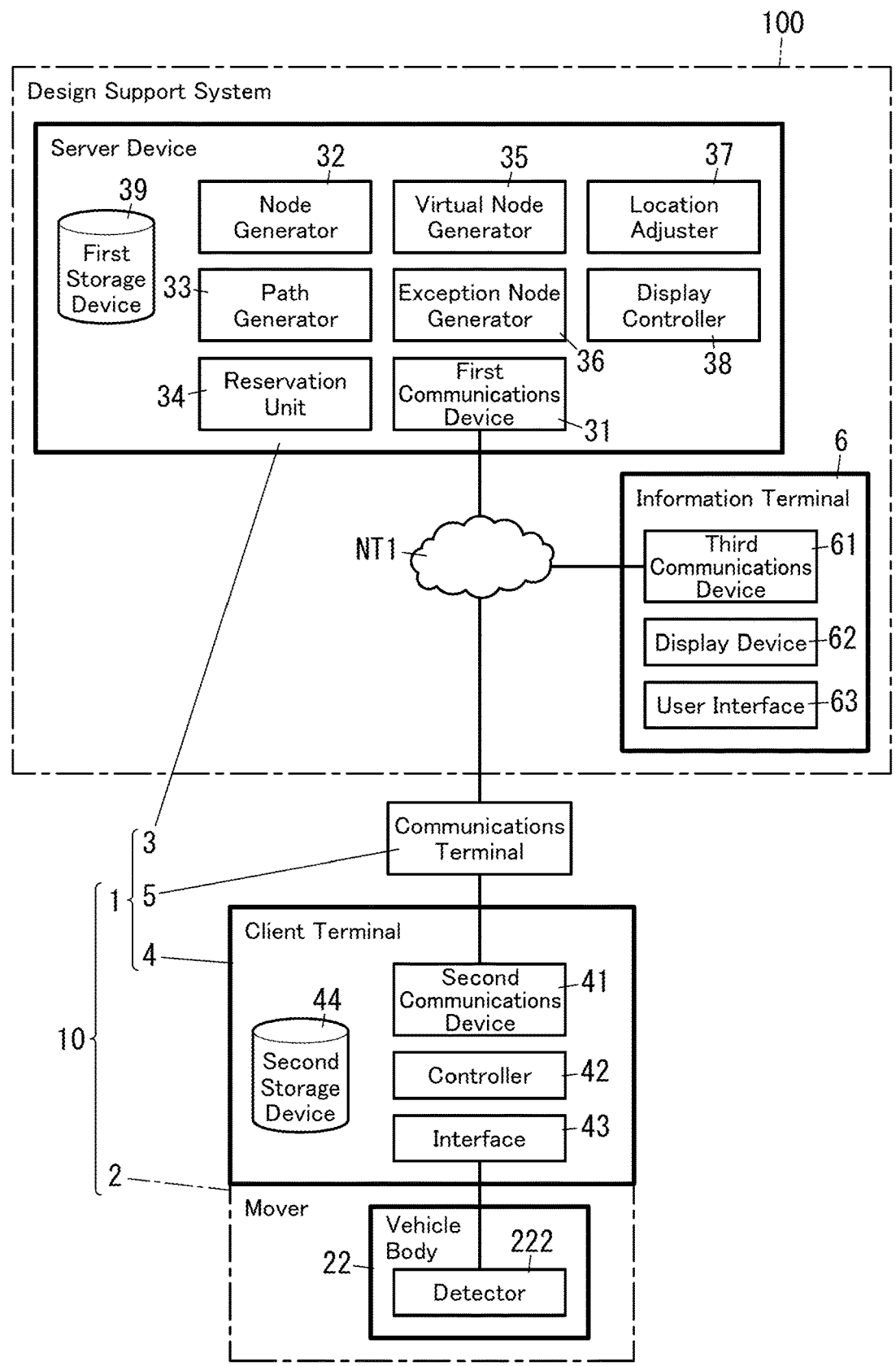
FIG. 2 is a block diagram illustrating a schematic configuration for the mover control system and a design support system according to the first embodiment.

A mover control system 1 according to this embodiment is a system for controlling at least one mover 2 traveling within a predetermined area A1 (see FIG. 1) as shown in FIG. 2. The mover control system 1 and the mover 2 that is the target to be controlled by the mover control system 1 together form a mover system 10. In other words, the mover system 10 according to this embodiment includes the mover control system 1 and the mover 2.

As used herein, the "mover" refers to various types of movers including automated guided vehicles (AGVs), moving robots, and drones. As used herein, the "moving robot" refers to any of various types of robots including wheeled robots, crawler robots, and legged robots (including walking robots). The mover 2 may have not only the function of traveling within the predetermined area A1 but also various other functions including carrying, picking, welding, mounting, displaying, greeting customers, security guarding, assembling, and testing.

The mover control system 1 controls the mover 2 to make the mover 2 move from a first spot toward a second spot within the predetermined area A1, for example. In that case, the mover control system 1 collects various kinds of information required to control the mover 2 (such as the traveling route leading from the first spot to the second spot) and instructs the mover 2 to travel, thereby making the mover 2 move from the first spot to the second spot. This allows the mover 2 to travel within the predetermined area A1 in accordance with the instruction from the mover control system 1.

The mover control system 1 according to this embodiment includes a controller 42, a node generator 32, and a path generator 33 as shown in FIG. 2. The controller 42 controls the mover 2 traveling within the predetermined area A1. The node generator 32 generates a pair of specified nodes Ndm (see FIG. 6) at respective arbitrary locations on a map M1 (see FIG. 5) corresponding to the predetermined area A1. The pair of specified nodes Ndm are nodes where the mover 2 is controllable. The path generator 33 generates a path Pm (see FIG. 6) between the pair of specified nodes Ndm. The controller 42 makes the mover 2 travel along a traveling route corresponding to the path Pm within the predetermined area A1.

As used herein, the "node" is a control point where the mover control system 1 is allowed to control the mover 2. That is to say, the mover control system 1 is able to control the movement of the mover 2 on a node-by-node basis. As will be described in detail later, the nodes as used herein include three types, namely, a specified node Ndm, a virtual node Nvm, and an exception node Nem. The suffix "m" of the specified node Ndm, virtual node Nvm, and exception node Nem indicates the path Pm number and may be a natural number (such as 1, 2, 3, and so on).

In particular, in this embodiment, the node is a control point where at least one of the traveling velocity or traveling direction of the mover 2 is controllable. As used herein, the control of the "traveling velocity" includes "start" for accelerating the mover 2 with a traveling velocity of zero and "stop" for decelerating the mover 2 moving down to a traveling velocity of zero. The mover control system 1 controls the operations (such as stopping and changing the traveling direction (including turn)) of the mover 2 currently located at a location corresponding to any node within the predetermined area A1. Therefore, when the mover 2 is moving between a pair of spots corresponding to a pair of nodes within the predetermined area A1 and is not currently located at a location corresponding to any node, the mover control system 1 is not able to perform any type of control of its operations including stopping and changing its traveling direction. In other words, to allow the mover control system 1 to perform control such stopping, or changing the traveling direction of, a mover 2 currently located at a certain spot, a node corresponding to that spot needs to be set.

In this embodiment, each node is associated with a rectangular area with a certain size within the predetermined area A1. That is to say, in the predetermined area A1, the spot corresponding to each node is not represented by a "point" but is represented by a "rectangular area" with a certain size. Therefore, when finding part or a plane center of any mover 2 located in a rectangular area corresponding to a certain node within the predetermined area A1, the mover control system 1 determines that the mover 2 be present at a location corresponding to that node.

As can be seen, the mover control system 1 controlling the mover 2 on a node-by-node basis makes the mover 2 travel basically along a path P1 that is set between a pair of nodes. For example, in making the mover 2 move from a first spot to a second spot, at least a first node and a second node are set at the first spot and the second spot, respectively, and the mover 2 moves from the first spot to the second spot through a path Pm that is set between the first and second nodes. If one or more intermediate nodes are set on the path Pm between the first and second nodes, then the mover control system 1 is allowed to, for example, stop, or change the traveling direction of, the mover 2 at the one or more intermediate nodes.

For example, suppose a situation where a single intermediate node is set between the first and second nodes. In that case, the mover control system 1 may control the movement of the mover 2 by making the mover 2 move from the first spot to an intermediate spot corresponding to the intermediate node and stop there first, and then move from the intermediate spot to the second spot. This allows the mover control system 1 to control the movement of the mover 2 by making the mover 2 stop temporarily at an intermediate spot between the first and second spots while making the mover 2 move from the first spot to the second spot.

In the mover control system 1 according to this embodiment, the node generator 32 generates, at arbitrary locations on the map M1 corresponding to the predetermined area A1, a pair of specified nodes Ndm as nodes where the mover 2 is controllable. That is to say, the mover control system 1 generates nodes (specified nodes Ndm) at arbitrary locations on the map M1, thus improving the flexibility of control compared with a grid method in which the mover 2 is controlled on the basis of grid coordinates.

That is to say, according to the grid method, the mover 2 is controlled on the basis of grid coordinates, and therefore, nodes may be set only at locations defined by the grid lines. According to the grid method, controlling the stops of the mover 2 finely, for example, requires narrowing the interval between the grid lines, which would increase the computational load accordingly.

In contrast, the mover control system 1 according to this embodiment allows nodes (specified nodes Ndm) to be set at any arbitrary locations on the map M1 irrespective of the grid lines. That is to say, this embodiment enables, instead of setting nodes on the premise that grid lines should be defined first before any path is generated, setting a node first, and then generating a path Pm on the basis of the node. Consequently, the mover control system 1 according to this embodiment improves the flexibility of control, while reducing an increase in computational load.

Note that the mover control system 1 according to this embodiment only needs to set nodes at any arbitrary locations on the map M1 without being restricted by the grid lines. Therefore, the mover control system 1 does not have to be a gridless one. For example, on the setting screen D1 (see FIG. 5) that allows the user to set nodes (specified nodes Ndm), the map M1 may include grid lines G1 (see FIG. 5) as either references or input aid for the user to set the nodes. Even so, the mover control system 1 is still allowed to set nodes at arbitrary locations on the map M1 on the setting screen D1 without being restricted by the grid lines G1.

A design support system 100 according to this embodiment is configured to support the design of a control plan for controlling the mover 2 traveling within the predetermined area A1. The design support system 100 includes a display controller 38, a user interface 63, a node generator 32, and a virtual node generator 35 as shown in FIG. 2. The display controller 38 displays the setting screen D1 including the map M1 corresponding to the predetermined area A1. The user interface 63 outputs a command signal in response to at least a user's command of designating a pair of specified locations on the map M1 on the setting screen D1. The node generator 32 generates, in accordance with the command signal, a pair of specified nodes Ndm, where the mover 2 is controllable, at the pair of specified locations on the map M1. The virtual node generator 35 generates, between the pair of specified nodes Ndm on the map M1, at least one virtual node Nvm (see FIG. 4) separately from the pair of specified nodes Ndm.

In this design support system 100, the user only needs to designate a pair of specified locations on the map M1 to generate the pair of specified nodes Ndm at the pair of specified locations first and then generate at least one virtual node Nvm between the pair of specified nodes Ndm. Thus, compared with a grid method that requires the user to design a traveling route while specifying squares one by one on a grip map in order to design a control plan for controlling the mover 2, this reduces the number of points to be specified on the map M1 by the user. In other words, even when the mover 2 needs to be controlled along a relatively long straight route, for example, this design support system 100 requires the user to designate just the pair of specified locations, respectively defining both ends (namely, a starting point and an end point) of the straight route, to select the straight route. Consequently, the design support system 100 according to this embodiment facilitates the design of a control plan.

In this embodiment, as is clear from FIG. 2, the mover control system 1 and the design support system 100 share at least some constituent elements (such as the node generator 32). As will be described in detail later, those constituent elements shared in common by the mover control system 1 and the design support system 100 are provided for a server device 3.

(2) Configuration

The configurations of the mover control system 1, mover system 10, and design support system 100 according to this embodiment will be described in detail with reference to FIGS. 1-3. Note that the numerical values, shapes, materials, locations of respective constituent elements, arrangement of those constituent elements, and their connections to be disclosed in the following description are all only examples and should not be construed as limiting. In addition, the drawings to be referred to in the following description are all schematic representations. That is to say, the ratio of the dimensions (including thicknesses) of respective constituent elements illustrated on the drawings does not always reflect their actual dimensional ratio.

In the following description, the target to be controlled by the mover control system 1 (i.e., the mover 2 included in the mover system 10) is supposed to be an automated guided vehicle as an example. The automated guided vehicle as an exemplary mover 2 performs the work of carrying a burden 92 (see FIG. 3) while traveling within the predetermined area A1. A configuration for an exemplary mover 2 for use in this embodiment will be described in detail in "(2.2) Mover" section.

As used herein, the "predetermined area" refers to a space where one or more movers 2 are stationed. Each of the movers 2 travels within this predetermined area A1 in accordance with an instruction from the mover control system 1. Examples of the predetermined area A1 include warehouses, factories, construction sites, stores (including shopping malls), distribution centers, offices, parks, dwelling houses, schools, hospitals, railway stations, airports, and parking lots. Furthermore, if the mover 2 is stationed inside some public transportation such as a ship, a railway train, or an aircraft, then the predetermined area A1 is the inside of the public transportation. In the following description of embodiments, the predetermined area A1 is supposed to be a distribution warehouse, for example.

(2.1) Overall Configuration

The mover system 10 includes the mover control system 1 and one or more movers 2 as shown in FIGS. 1 and 2. In this embodiment, the mover system 10 includes a plurality of movers 2.

FIG. 1 is a schematic plan view of the predetermined area A1. In this embodiment, the predetermined area A1 is a distribution warehouse, which is a space surrounded with outer walls 901. The predetermined area A1 supposed to be used in this embodiment has an entrance 902 through which a burden 92 is carried into the predetermined area A1, and an exit 903 through which the burden 92 is carried out of the predetermined area A1. In addition, the predetermined area A1 also has a plurality of columns 904, a boundary wall 905, and a belt conveyer 906.

The mover control system 1 includes a server device 3, one or more client terminals 4, and one or more communications terminals 5. In this embodiment, the mover control system 1 includes a plurality of client terminals 4 and a plurality of communications terminals 5. The plurality of client terminals 4 and the plurality of communications terminals 5 are arranged, along with the plurality of movers 2, within the predetermined area A1. The server device 3 is installed outside of the predetermined area A1 and is connected to the plurality of communications terminals 5 over a network NT1 such as the Internet.

The server device 3 and the plurality of client terminals 4 are configured to be communicable with each other. As used herein, being "communicable" means being able to transmit and receive information either directly or indirectly over the network NT1 or via a relay by an appropriate wired or wireless communication method. That is to say, the server device 3 and the plurality of client terminals 4 are able to transmit and receive information to/from each other. In this embodiment, each of the plurality of client terminals 4 communicates with any of the plurality of communications terminals 5 by wireless communication via radio waves. Thus, the server device 3 and the plurality of client terminals 4 communicate with each other indirectly at least over the network NT1 and via the communications terminals 5.

That is to say, each communications terminal 5 is a device (or access point) to relay communications between an associated one of the client terminals 4 and the server device 3. The communications terminal 5 communicates with the server device 3 over the network NT1. In this embodiment, the communication between the communications terminals 5 and the mover 2 may be wireless communication compliant with the Wi-Fi® standard, the Bluetooth® standard, the ZigBee® standard, or the Specific Low Power Radio standard that requires no licenses. Furthermore, the network NT1 does not have to be the Internet but may also be a local communications network established within either the predetermined area A1 or an operating company that provides the predetermined area A1.

In this embodiment, each client terminal 4 and an associated mover 2 have one-to-one correspondence. That is to say, mounting a single client terminal 4 on each single mover 2 associates the single mover 2 with the single client terminal 4. In this embodiment, the client terminal 4 and the mover 2 are integrated together. As will be described in detail later in the "(2.2) Mover" section, the client terminal 4 is mounted on a vehicle body 22 of the mover 2 and thereby integrated with the mover 2. That is to say, in a single housing of the mover 2, housed are constituent elements that perform the function as the mover 2 and constituent elements of the client terminal 4. Thus, the client terminal 4 may be regarded as a part of the mover 2. Then, this means that the server device 3 communicates with the mover 2 indirectly over the network NT1 and via any of the communications terminal 5. Consequently, communicating with a client terminal 4 (mover 2) allows the server device 3 to control the mover 2 associated with the client terminal 4 indirectly.

In addition, the server device 3 and the information terminal 6 together form the design support system 100. In other words, the design support system 100 according to this embodiment includes the server device 3 and the information terminal 6. The information terminal 6 is connected to the server device 3 over the network NT1 such as the Internet.

The server device 3 and the information terminal 6 are configured to be communicable with each other. That is to say, the server device 3 and the information terminal 6 are able to transmit and receive information to/from each other. In this embodiment, the information terminal 6 is connected to the network NT1 via a router, for example. Thus, the server device 3 and the information terminal 6 communicate with each other indirectly at least over the network NT1. The communication between the server device 3, the communications terminal 5, or the information terminal 6 and the network NT1 may be established by any appropriate wireless or wired communication method.

In this embodiment, each of the server device 3, the client terminals 4, and the information terminal 6 is implemented as a computer system including, as its major constituent elements, a memory and a processor. In other words, the computer system performs the function of the server device 3, the client terminals 4, or the information terminal 6 by making its processor execute a program stored in its memory. The program may be stored in advance in the memory or may also be downloaded via a telecommunications line such as the Internet or distributed after having been stored on a non-transitory storage medium such as a memory card.

The server device 3, the client terminals 4, and the information terminal 6 are communicable with each other bidirectionally. Therefore, information may be transmitted from the server device 3 to the client terminals 4 or the information terminal 6 and information may also be transmitted in the opposite direction, i.e., from the client terminals 4 or the information terminal 6 to the server device 3.

The mover 2 is an automated guided vehicle configured to carry a burden 92 within the predetermined area A1 and travels autonomously to a destination while carrying the burden 92. The server device 3 communicates with, and controls, the mover 2 (client terminal 4) over the network NT1 and via the communications terminal 5.

(2.2) Mover

Next, an exemplary configuration for the movers 2 for use in this embodiment will be described in further detail.

Figure 3:
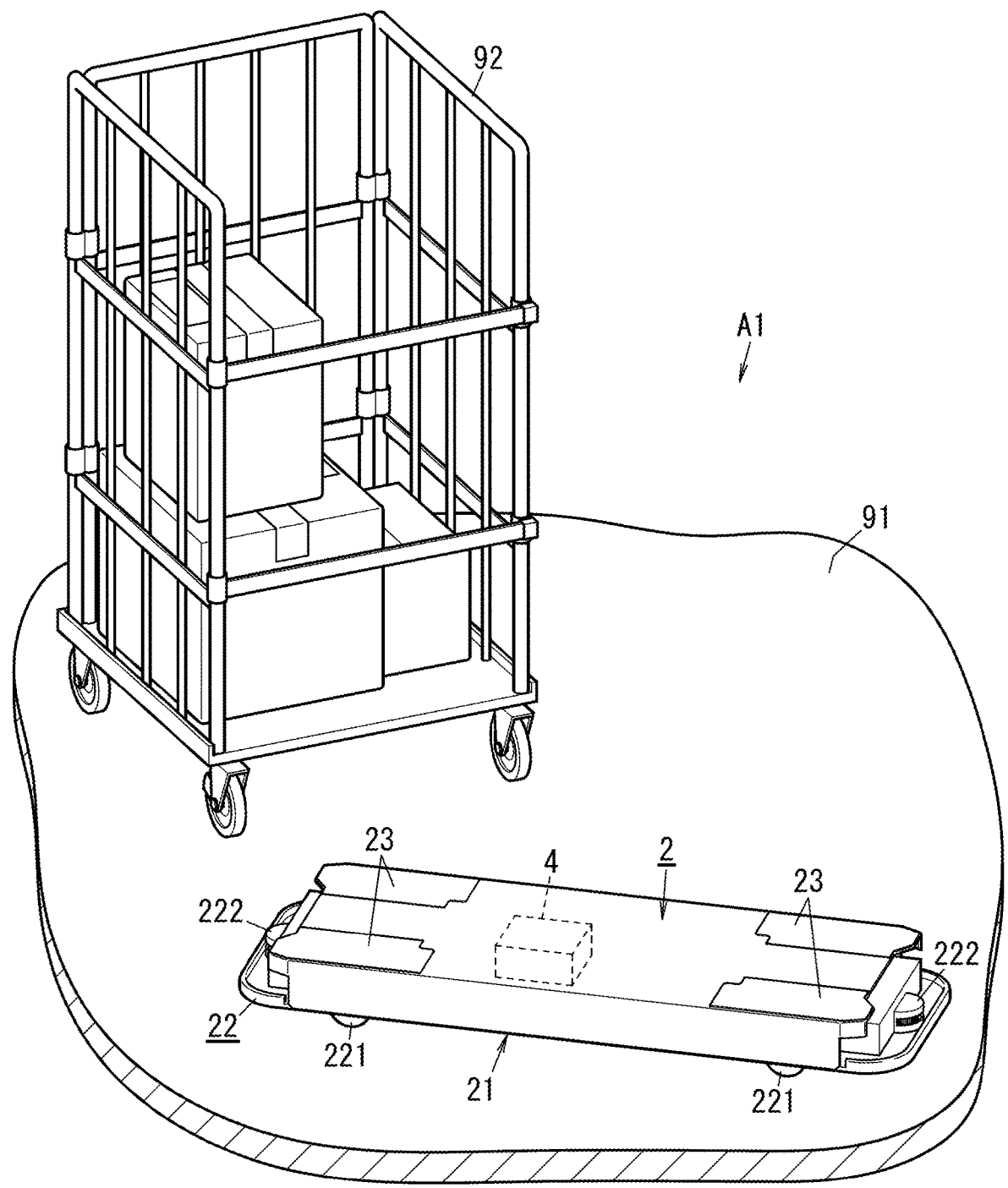
FIG. 3 is a perspective view generally illustrating the appearance of the mover.

The mover 2 travels autonomously on a flat traveling surface 91 such as the floor surface of the predetermined area A1 as shown in FIG. 3. In this embodiment, the mover 2 is supposed to be provided with a storage battery and be powered by electric energy stored in the storage battery. In this embodiment, the mover 2 travels on the traveling surface 91 while being loaded with a burden 92. This allows the mover 2 to carry the burden 92 placed at a certain location in the predetermined area A1 to somewhere else in the predetermined area A1. In this embodiment, the burden 92 may be a palette, loaded with packages, such as a roll box palette.

The mover 2 includes a body 21. The body 21 is formed in the shape of a rectangular parallelepiped, which looks rectangular in a plan view. In this embodiment, the burden 92 is placed on the body 21 so as to be lifted by the body 21 that has slipped into the gap under the burden 92. Thus, the dimension of the body 21 measured in the upward/downward direction is set at a value smaller than its dimension measured in the lateral direction in a plan view such that the body 21 may slip into the gap under the burden 92. In this embodiment, the body 21 may be made of a metallic material. However, this is only an example and should not be construed as limiting. The body 21 does not have to be made of a metallic material but may also be made of a resin, for example.

The body 21 includes a vehicle body 22 and an elevator plate 23. The vehicle body 22 includes a plurality of (e.g., four in this embodiment) wheels 221 and detectors 222.

The plurality of wheels 221 are arranged at four corners of the vehicle body 22 in a plan view. In this embodiment, all of these wheels 221 are "drive wheels." Driving all of these wheels 221 on an individual basis allows the body 21 to move in every direction on the traveling surface 91. For example, driving all of these wheels 221 in rotation in the same direction and at the same velocity allows the vehicle body 22 to travel straight. In addition, making a difference in rotation between the plurality of wheels 221 allows the vehicle body 22 to travel along a curved course or turn around on the spot. In the following description, the vehicle body 22 traveling along a curved course will be hereinafter referred to as "curved traveling" and the vehicle body 22 turning around on the spot will be hereinafter referred to as "turnaround traveling." The vehicle body 22 may drive the plurality of wheels 221 in rotation via a drive mechanism such as a clutch. That is to say, the body 21 is allowed to move on the traveling surface 91 in all directions, including forward, backward, leftward, and rightward directions, by turning the plurality of wheels 221. Each of these wheels 221 may be an omnidirectional moving wheel such as an omni-wheel.

The detector 222 detects the behavior of the body 21 and the situation surrounding the body 21. As used herein, the "behavior" refers to the operation, appearance, and other parameters of the body 21. Examples of the behavior of the body 21 include the operating status, which is either traveling or at a stop, of the body 21, the velocity (and variation in the velocity) of the body 21, acceleration applied to the body 21, and the orientation of the body 21. Specifically, the detector 222 includes some type of sensor such as a velocity sensor, an acceleration sensor, or a gyrosensor to detect the behavior of the body 21 using any of these sensors. The detector 222 also includes another type of sensor such as an image sensor (camera), a sonar sensor, a radar, or a light detection and ranging sensor (LiDAR) to detect the situation surrounding the body 21 using any of these sensors. The situation surrounding the body 21 includes the presence or absence of any object (obstacle) in/from the traveling direction, and in front, of the body 21, and the location (including the distance and azimuth) of the object, if any. Examples of the obstacles include other movers 2 and humans.

The detector 222 further includes a location determiner to determine the location of the body 21, i.e., the current location of the mover 2. The location determiner includes, for example, a receiver for receiving beacon signals transmitted as radio waves from a plurality of transmitters. The plurality of transmitters are arranged within the traveling range of the mover 2, i.e., at a plurality of sites within the predetermined area A1. The location determiner determines the location of the body 21 based on the locations of the plurality of transmitters and the radio field strengths of the beacon signals received at the receiver. In this embodiment, the location determiner is implemented as a positioning system such as a local positioning system (LPS). However, this is only an example and should not be construed as limiting. The location determiner may also be implemented as a satellite positioning system such as a global positioning system (GPS). The result of detection by the detector 222 is output to the client terminal 4.

The client terminal 4 determines, at least by the current location of the body 21, the traveling route of the body 21 to the destination (i.e., a route plan) in cooperation with the server device 3, and puts the vehicle body 22 in motion such that the body 21 travels along the traveling route. That is to say, the mover control system 1 makes the client terminal 4 control the mover 2. The body 21 travels autonomously on the traveling surface 91 by driving the plurality of wheels 221 in rotation independently of each other in accordance with the control signal supplied from the client terminal 4. This allows the body 21 to travel autonomously.

The elevator plate 23 is arranged over the vehicle body 22 so as to cover the upper surface of the vehicle body 22 at least partially. In this embodiment, the elevator plate 23 covers the four corners of the upper surface of the vehicle body 22. When the burden 92 is carried by the mover 2, the burden 92 is mounted on the upper surface of the elevator plate 23.

In this embodiment, the elevator plate 23 is configured to be elevated and lowered with respect to the vehicle body 22. Thus, elevating the elevator plate 23 with the body 21 slipped into the gap under the burden 92 allows the burden 92 to be lifted by the elevator plate 23. Conversely, lowering the elevator plate 23 with the burden 92 lifted by the elevator plate 23 allows the burden 92 to be unloaded from the elevator plate 23.

The traveling modes of the mover 2 include an automatic traveling mode in which the mover 2 travels in accordance with the instruction (control signal) given by the mover control system 1 and a manual traveling mode in which the mover 2 travels in accordance with the instruction given by a remote controller. The remote controller is a device, communicating wirelessly with the mover 2, for controlling the operation of the mover 2 in accordance with the user's command.

The mover 2 may further include other constituent elements, including a charger circuit for the storage battery and a user interface, as appropriate in addition to the constituent elements described above. The user interface is a constituent element that allows the user to enter some kind of information such as his or her command for the mover 2. The user interface may be implemented as, for example, a plurality of tread pedals. These pedals allow the user to enter various types of commands including driving or stopping the mover 2, changing the traveling mode of the mover 2, selecting the traveling route of the mover 2, changing the traveling direction of the mover 2, elevating or lowering the elevator plate 23, and locking or unlocking the plurality of wheels 221. Optionally, the user interface may also be configured to allow the user to set at least one of the departure point or destination point of the traveling route for the mover 2. The configuration and functions of the user interface do not have to be the ones that use a plurality of pedals. Furthermore, an emergency stop device may be provided to have the mover 2 make an emergency stop irrespective of the traveling mode of the mover 2. The emergency stop device may be either built in the mover 2 or configured to communicate wirelessly with the mover 2 as in a remote controller.

In this embodiment, the client terminal 4 is included in, and thereby integrated with, the mover 2. Specifically, in this embodiment, the client terminal 4 is built in the body 21 so as not to interfere with the operation of the mover 2. That is to say, in the housing that forms the shell of the body 21, housed are not only constituent elements that perform the function of the mover 2 but also constituent elements of the client terminal 4.

Optionally, the storage battery that supplies power to (i.e., provides power supply for) the mover 2 may also be used as a power source for the client terminal 4. That is to say, the storage battery may be shared in common by the mover 2 and the client terminal 4. Furthermore, the control function (controller 42) of the client terminal 4 may be used to control not only the vehicle body 22 but also the elevator plate 23 of the mover 2 as well.

(2.3) Client Terminal

Next, a configuration for the client terminal 4 will be described in further detail.

The client terminal 4 includes a second communications device 41, a controller 42, an interface 43, and a second storage device 44 as shown in FIG. 2.

The second communications device 41 communicates with the server device 3 indirectly over the network NT1 and via an associated one of the communications terminals 5. The communication between the second communications device 41 and the server device 3 may be established by an appropriate wireless or wired communication method.

If the traveling mode of the mover 2 is an automatic traveling mode, then the controller 42 outputs a control signal to the body 21 of the mover 2 in accordance with an instruction given by the server device 3. This allows the controller 42 to control the mover 2. More specifically, the controller 42 makes the second communications device 41 transmit and receive information to/from the server device 3 and also makes the interface 43 transmit and receive information to/from the mover 2. The controller 42 generates the control signal in accordance with the instruction information acquired from the server device 3. The controller 42 outputs the control signal to the mover 2, thereby making the mover 2 perform the operation defined by the instruction information, such as starting, stopping, or turning around. The instruction information includes information about the traveling route, traveling velocity, and traveling direction of the mover 2. The controller 42 acquires the instruction information from the server device 3 at regular intervals (e.g., every second).

The controller 42 also has the function of acquiring the results of detection by the detectors 222 from the mover 2 and transmitting the results of detection thus acquired from the second communications device 41 to the server device 3. The results of detection by the detectors 222 include various kinds of information about the behavior of the body 21, the situation surrounding the body 21, and the current location of the body 21. The controller 42 acquires the results of detection by the detectors 222 from the mover 2 at regular intervals (e.g., every second).

In this embodiment, the controller 42 controls the mover 2 in accordance with the instruction given by the server device 3, and therefore, the results of detection by the detectors 222 are also basically used for computations by the server device 3. Nevertheless, the results of detection by the detectors 222 may also be used for the processing by the controller 42. In that case, the controller 42 extracts, from the results of detection by the detectors 222, obstacle information about the presence or absence of any obstacles around the mover 2 and the locations of the obstacles if any, and controls the mover 2 in accordance with the obstacle information. For example, on detecting the presence of any obstacle either on or around the traveling route of the mover 2, the controller 42 instructs the mover 2 to stop. Thereafter, on finding the detectors 222 detecting no obstacles any longer on or around the traveling route, the controller 42 instructs the mover 2 to resume moving.

The interface 43 communicates with the mover 2 either directly or indirectly. The communication between the interface 43 and the mover 2 may be established by any appropriate wireless or wired communication method.

The second storage device 44 may be implemented as a non-transitory storage medium such as a programmable nonvolatile semiconductor memory. The second storage device 44 stores, for example, the instruction information acquired from the server device 3, the results of detection by the detectors 222, and other pieces of information.

(2.4) Server Device

Next, a configuration for the server device 3 will be described in further detail with reference to FIG. 2.

The server device 3 includes a first communications device 31, the node generator 32, the path generator 33, a reservation unit 34, the virtual node generator 35, an exception node generator 36, a location adjuster 37, a display controller 38, and a first storage device 39 as shown in FIG. 2.

The first communications device 31 communicates with the client terminals 4 indirectly over the network NT1 and via the communications terminals 5. In addition, the first communications device 31 also communicates with the information terminal 6 indirectly over the network NT1. The communication between the first communications device 31 and the client terminals 4 or the information terminal 6 may be established by any appropriate wireless or wired communication method.

The node generator 32 generates a specified node Ndm. The specified node Ndm is a type of "node" where the mover 2 is controllable. The node generator 32 generates the specified node Ndm at an arbitrary location on the map M1 corresponding to the predetermined area A1. In this embodiment, the node generator 32 generates at least two (i.e., a pair of) specified nodes Ndm. In other words, the pair of specified nodes Ndm are generated at arbitrary locations on the map M1. As described above, the node is a control point where the mover control system 1 is able to control the mover 2.

The path generator 33 generates a path Pm. The path generator 33 generates the path Pm between the pair of specified nodes Ndm generated by the node generator 32. As used herein, the "path" defines a traveling route along which the mover 2 is made to travel within the predetermined area A1. That is to say, the controller 42 makes the mover 2 move along the traveling route corresponding to the path Pm in the predetermined area A1. In other words, the path generator 33 generates, between the pair of specified nodes Ndm, the path Pm defining the traveling route for the mover 2.

The reservation unit 34 perform reservation processing. The reservation processing is processing of marking one or more nodes, associated with a target mover 2t (see FIG. 4A), as occupied. One of the plurality of movers 2 is picked as the "target mover 2t." As used herein, the "occupied" state of a node refers to a state of the node being occupied by the target mover 2t. If any node is occupied, then access of any mover, other than the target mover 2t, to a zone corresponding to the occupied node within the predetermined area A1 is restricted. In this embodiment, the traveling-related operation of each mover 2 is determined by the controller 42.

Thus, the controller 42 restricts access of any mover 2, other than the target mover 2t, out of the plurality of movers 2, to a zone Zm (see FIG. 4A) corresponding to the occupied node within the predetermined area A1. The suffix "m" of the zone Zm may be a natural number (such as 1, 2, 3, and so on) as in the case of the specified nodes Ndm.

Also, while performing the reservation processing, the reservation unit 34 marks a reserved number of nodes as occupied. The reserved number of nodes are counted in a traveling direction from the node corresponding to the zone Zm where the target mover 2t is currently located. The reservation unit 34 performs the reservation processing every time the zone Zm where the target mover 2t is currently located changes. As used herein, the "reserved number" means the number of nodes that are simultaneously marked as occupied for a single target mover 2t. For example, if the reserved number is three, then three nodes are marked as occupied as counted in the traveling direction from the node corresponding to the zone Zm where the target mover 2t is currently located.

The virtual node generator 35 generates a virtual node Nvm (see FIG. 7). The virtual node Nvm is also a type of node where the mover 2 is controllable, but is different from the specified nodes Ndm. That is to say, the virtual node Nvm is distinguishable from the specified nodes Ndm. If the spatial interval between the pair of specified nodes Ndm is equal to or greater than an upper limit value, then the virtual node generator 35 generates at least one virtual node Nvm on the path Pm. In other words, the virtual node generator 35 generates the virtual node Nvm on the path Pm generated by the path generator 33.

The virtual node generator 35 determines a numerical number and locations of the virtual nodes Nvm such that the interval between adjacent nodes on the path Pm becomes equal to or greater than a lower limit value and less than an upper limit value. That is to say, the numerical number of the virtual nodes Nvm generated on the path Pm by the virtual node generator 35 and the locations of those virtual nodes Nvm on the path Pm are determined based on the interval between the adjacent nodes on the path Pm. In other words, the numerical number and locations of the virtual nodes Nvm are determined by the interval between the pair of specified nodes Ndm.

Figure 9:
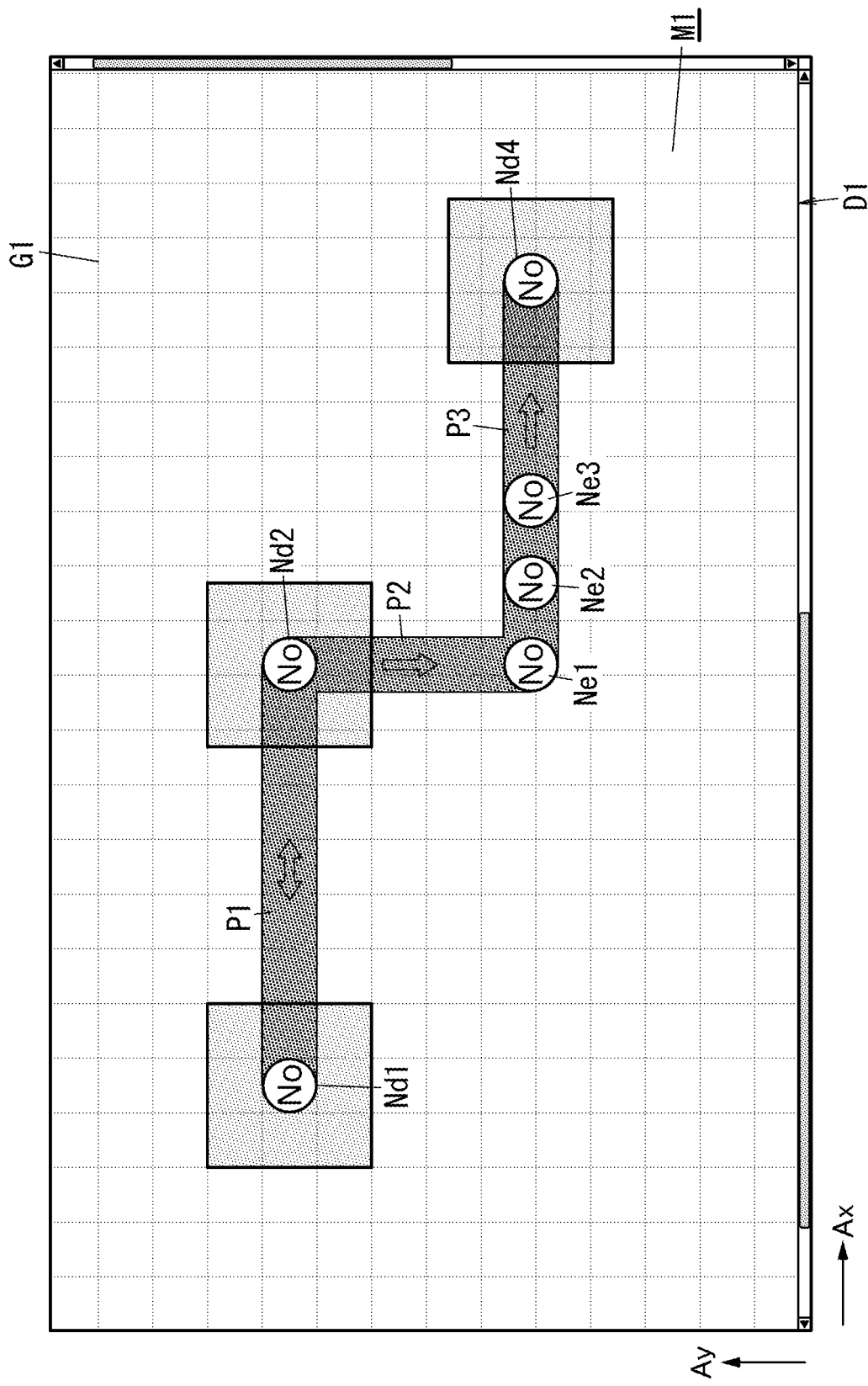
FIG. 9 schematically illustrates another setting screen displayed on the display device of the information terminal in the design support system.

The exception node generator 36 generates an exception node Nem (see FIG. 9). The exception node Nem is also a type of node where the mover 2 is controllable, but is different from the specified nodes Ndm and the virtual node Nvm. That is to say, the exception node Nem is distinguishable from the specified nodes Ndm and the virtual node Nvm. The exception node generator 36 generates at least one exception node Nem on the map M1.

In this case, if a plurality of exception nodes Nem are generated at an interval less than the lower limit value, the plurality of exception nodes Nem are grouped such that the sum of intervals between adjacent ones of the exception nodes Nem is equal to or greater than the lower limit value. As used herein, "grouping" means turning a set of exception nodes Nem into a collectively processible set. For example, when marking nodes as occupied, the reservation unit 34 marks the set of exception nodes Nem grouped as occupied at a time.

The location adjuster 37 adjusts the location of at least one of the pair of specified nodes Ndm. In this embodiment, the map M1 includes a first axis Ax (see FIG. 5) and a second axis Ay (see FIG. 5) that intersect with each other. The location adjuster 37 adjusts the location of at least one of the pair of specified nodes Ndm such that the pair of specified nodes Ndm are arranged parallel to the first axis Ax or the second axis Ay on the map M1.

The display controller 38 has a setting screen D1 displayed. The setting screen D1 includes the map M1 corresponding to the predetermined area A1. More specifically, the display controller 38 makes the first communications device 31 transmit and receive information to/from the information terminal 6 to have the setting screen D1 displayed on the display device 62 of the information terminal 6.

The first storage device 39 is implemented as a non-transitory storage medium such as a programmable nonvolatile semiconductor memory. The first storage device 39 does not have to be built in the server device 3 but may also be present in a cloud computing system to which the server device 3 is allowed to access. The first storage device 39 stores map information about the map of the predetermined area A1, traveling route information about the traveling route of each mover 2, mover information about each mover 2, and other pieces of information.

The operation of the respective constituent elements of the server device 3 will be described in detail in the "(3) Operation" section.

(2.5) Information Terminal

The information terminal 6 is a terminal with the function of accepting the user's command and the function of presenting (displaying) information to the user. As used herein, the "user" includes the user of the mover control system 1, the user of the mover system 10, and the user of the design support system 100.

The information terminal 6 is implemented as a computer system including, as its major constituent elements, a memory and a processor, as described above. In the following description of this embodiment, the information terminal 6 is supposed to be a terminal such as a personal computer, a smartphone, or a tablet computer. The information terminal 6 is allowed to perform the following functions by having dedicated application software installed in itself and running the application software.

The information terminal 6 includes a third communications device 61, the display device 62, and the user interface 63.

The third communications device 61 communicates with the server device 3 indirectly over the network NT1. In this embodiment, the information terminal 6 is connected to the network NT1 through a router, for example, by wireless communication via radio waves. The communication to be established by the information terminal 6 may be wireless communication compliant with, for example, the Wi-Fi® standard, the Bluetooth® standard, the ZigBee® standard, or the Specific Low Power Radio standard that requires no licenses. Optionally, the information terminal 6 may also be connected outdoors to the network NT1 via a cellular phone network (carrier network) provided by a communication service provider or a public local area network (LAN). Examples of the cellular phone network include a third generation (3G) line and a long term evolution (LTE) line.

Figure 5:
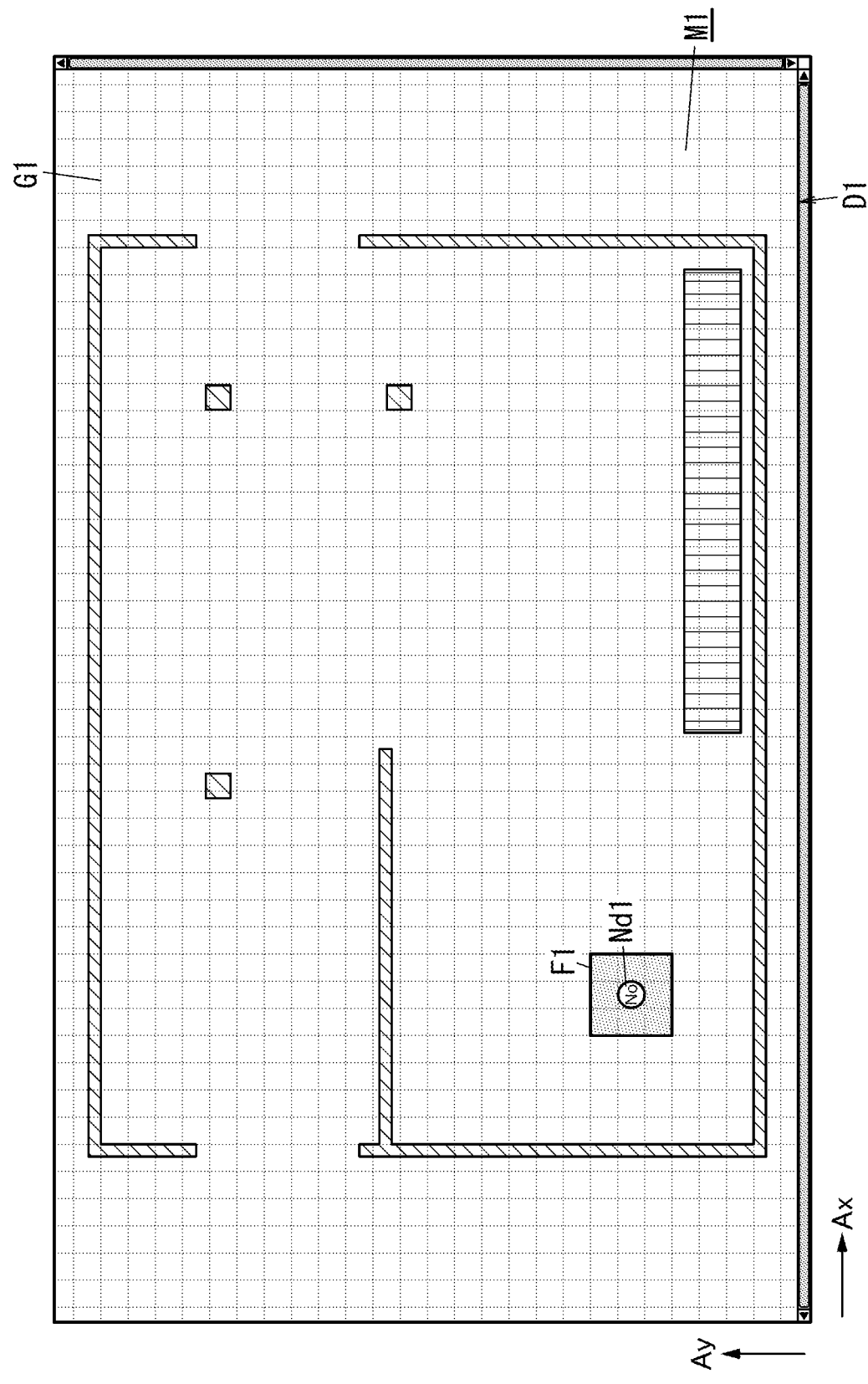
FIG. 5 schematically illustrates a setting screen displayed on a display device of an information terminal in the design support system.

The display device 62 displays a screen for presenting information to the user such as the setting screen D1 (see FIG. 5). As used herein, the "screen" refers to an image produced on the display device 62. The display device 62 may be implemented as an image display device such as a liquid crystal display (LCD) or an organic electroluminescent (OEL) display.

The user interface 63 has the function of accepting a command entered by a human (i.e., the user). In this embodiment, the user interface 63 is implemented as a pointing device such as a mouse, a keyboard, a mechanical switch, or a combination thereof. Also, if the information terminal 6 includes a touchscreen panel display, then the touchscreen panel display may serve as the display device 62 and the user interface 63. In that case, when the user interface 63 detects that any operation (such as tapping, swiping, or dragging) has been performed on any object such as a button displayed on the screen of the display device 62, the information terminal 6 determines that some operation should have been performed on the object such as the button.

(3) Operation

Next, it will be described in detail with reference to FIGS. 4A-18 how the mover control system 1, mover system 10, and design support system 100 according to this embodiment operate. FIGS. 5, 6, 8, and 9 schematically illustrate the setting screen D1 displayed on the display device 62 of the information terminal 6.

(3.1) Basic Operation

First, the basic operations of the mover control system 1 and mover system 10 will be described with reference to FIGS. 4A-4E.

FIGS. 4A-4E are schematic representations conceptually showing, as a top views of the predetermined area A1, how the mover 2 travels within the predetermined area A1. In FIGS. 4A-4E, illustrated are some nodes (including specified nodes Ndm and virtual nodes Nvm) on the map M1 corresponding to the predetermined area A1, zones Zm (Z1-Z6) corresponding to the respective nodes, and a traveling route R10. Each of the zones Zm (Z1-Z6) corresponding to the respective nodes is suitably a square zone which is large enough for the mover 2 to turn around in the predetermined area A1 and may be a square area with dimensions of 180 cm (length)×180 cm (width), for example. Note that the dots indicating these nodes (including the specified nodes Ndm and the virtual nodes Nvm), the frames indicating the zones Zm, and the arrows indicating the traveling route R10 (including route sections R1-R5) are shown there for illustrative purposes only and are insubstantial ones.

In the following description, it will be described as an example how the mover control system 1 and mover system 10 operate to move the mover 2 from a spot corresponding to a specified node Nd1 to a spot corresponding to a specified node Nd2 within the predetermined area A1. In that case, the mover 2 travels, within the predetermined area A1, along the traveling route R10 corresponding to the path P1 (see FIG. 6) generated between the specified nodes Nd1 and Nd2.

In that case, the mover control system 1 makes the server device 3 determine the traveling route R10 for the mover 2 within the predetermined area A1 and controls the mover 2 such that the mover 2 travels along the traveling route R10. In addition, the mover control system 1 also receives, from the client terminals 4 built in the respective movers 2, information about the locations and azimuths of the respective movers 2, information about the presence or absence of any obstacle on the traveling route R10, and other pieces of information at regular intervals, and corrects the traveling route R10 and controls the movers 2 based on the information received. In this case, the mover control system 1 controls the movers 2 based on the nodes (including the specified nodes Ndm, the virtual nodes Nvm, and the exception nodes Nem) and the path Pm defined on the map M1 (see FIG. 5) corresponding to the predetermined area A1.

In this case, there is at least another node between the specified node Nd1 as the departure point and the specified node Nd2 as the destination point. In the example illustrated in FIGS. 4A-4E, there are four virtual nodes Nv1-Nv4 between the pair of specified nodes Nd1 and Nd2. Each of the pair of specified nodes Nd1 and Nd2 and the four virtual nodes Nv1-Nv4 constitutes a control point (node) where at least one of the traveling velocity or traveling direction of the mover 2 is controllable. That is to say, each of these nodes (including the specified nodes Ndm and the virtual nodes Nvm) may be a point where the mover 2 changes its operation mode such as starting, stopping, or changing its traveling direction.

In this example, the traveling route R10 corresponding to the path P1 between the pair of specified nodes Nd1 and Nd2 is divided, at the four virtual nodes Nv1-Nv4, into a plurality of linear route sections R1-R5. Each of the plurality of (e.g., five in this example) route sections R1-R5 is a linear route connecting an associated pair of adjacent nodes together. Also, each of these route sections R1-R5 becomes a minimum unit when the mover control system 1 moves the mover 2. In other words, the mover control system 1 is able to move the mover 2 on a route section R1-R5 basis.

The controller 42 of the client terminal 4 generates, in accordance with the instruction information transmitted from the server device 3 at regular intervals (e.g., every second), a control signal to make the mover 2 travel along the respective route sections R1-R5. Specifically, the controller 42 determines, in accordance with the instruction information and information about the current location of the mover 2, the route sections R1-R5 along which the mover 2 should travel. In addition, the controller 42 also generates a control signal indicating the locations of the starting and end points of the route sections R1-R5 along which the mover 2 should travel next, the traveling velocity, the orientation of the mover 2, and other parameters, and outputs the control signal to the mover 2. In this case, the instruction information may include traveling velocity information about the velocity at which the mover 2 should travel through the respective route sections R1-R5. In addition, the instruction information may further include information about the starting point and/or end point of the respective route sections R1-R5, i.e., information about the orientations of the mover 2 at the respective nodes, and information about the orientation of the mover 2 traveling along the respective route sections R1-R5.

On the other hand, the server device 3 also stores the results of detection by the detectors 222, which are transmitted from the respective movers 2 (or client terminals 4) at regular intervals (e.g., every second), in association with the identification information about the respective movers 2, the time, and other parameters. This allows the server device 3 to acquire and manage, in almost real time, information about the current locations, current azimuths, current statuses, and other attributes of the respective movers 2 on a mover-by-mover basis. The current location of each mover 2 is indicated by the coordinates (X, Y) thereof on the map M1. The current azimuth of each mover 2 is indicated by an azimuth angle. The current status of each mover 2 includes traveling, stopped, waiting, failure occurred, and other statuses of the mover 2.

In this embodiment, the controller 42 controls the mover 2 in accordance with the instruction given by the server device 3, and therefore, the results of detection by the detectors 222 are also basically used for computations by the server device 3. Nevertheless, the results of detection by the detectors 222 may also be used for the processing by the controller 42. In that case, the controller 42 extracts, from the results of detection by the detectors 222, obstacle information about the presence or absence of any obstacles around the mover 2 and the locations of the obstacles if any, and controls the mover 2 in accordance with the obstacle information. For example, if the controller 42 has detected the presence of any obstacle either on or around the traveling route of the mover 2, the controller 42 instructs the mover 2 to stop. Thereafter, when the detectors 222 detect no obstacles any longer on or around the traveling route, the controller 42 instructs the mover 2 to resume moving. Optionally, the controller 42 may change, on receiving the obstacle information from the mover 2, the traveling velocity or traveling route of the mover 2 so as to avoid the obstacle.

Furthermore, when finding the current location of the mover 2 off any of the route sections R1-R5 or traveling route R10 defined by the instruction information, the controller 42 also instructs the mover 2 to stop temporarily. Nevertheless, when finding the mover 2 currently located within a certain distance from any of the route sections R1-R5 or the traveling route R10, the controller 42 instructs the mover 2 to be back on the route section R1-R5 or the traveling route R10.

Next, specific processing for moving the mover 2 will be described.

Figure 4A:
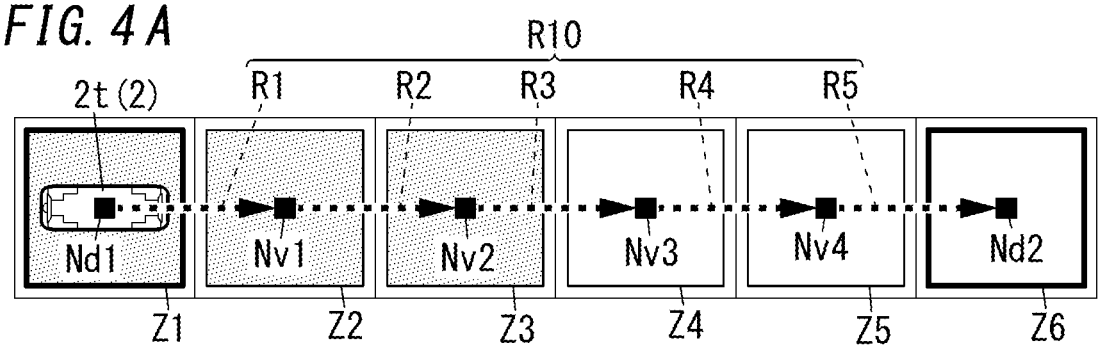
FIG. 4A is a schematic representation showing a concept of the operation of the mover control system by illustrating, as a top view of a predetermined area, how the mover travels within the predetermined area.

First of all, the mover control system 1 performs, on a target mover 2t which may be the mover 2 located in a zone Z1 corresponding to the specified node Nd1 within the predetermined area A1, reservation processing of marking one or more nodes associated with the target mover 2t as occupied as shown in FIG. 4A. As a result of this reservation processing, a reserved number of nodes, which are counted in the traveling direction from the node corresponding to the zone Z1 where the target mover 2t is currently located, are marked as occupied. In this case, the reserved number of nodes include the node corresponding to the zone Z1 where the target mover 2t is currently located (i.e., the specified node Nd1).

For example, the reserved number may be three in this embodiment. In that case, the three nodes, counted in the traveling direction from the node corresponding to the zone Z1 where the target mover 2t is currently located, namely, the specified node Nd1 and virtual nodes Nv1 and Nv2, are marked as occupied. Then, access of all movers, but the target mover 2t, to the zones Z1, Z2, and Z3 corresponding to the occupied nodes (i.e., the specified node Nd1 and virtual nodes Nv1 and Nv2) in the predetermined area A1, is restricted (i.e., prohibited). In FIGS. 4A-4E, the zones Zm corresponding to the occupied nodes are hatched with dots, while the other zones Zm corresponding to the other non-occupied nodes are not hatched.

Figure 4B:
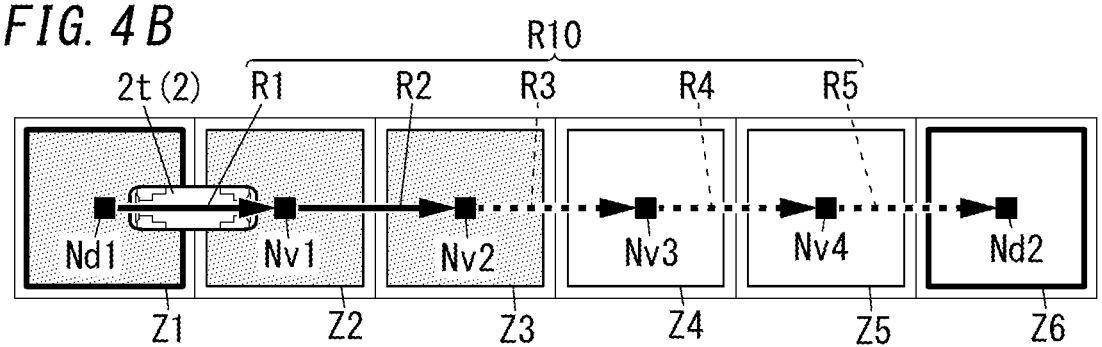
FIG. 4B is a schematic representation showing the concept of the operation of the mover control system by illustrating, as another top view of the predetermined area, how the mover travels within the predetermined area.

Next, the mover control system 1 instructs the mover 2 (target mover 2t) to move within the zones Z1, Z2, and Z3 corresponding to the occupied nodes as shown in FIG. 4B. That is to say, the server device 3 outputs instruction information, instructing the mover 2 to travel along the two route sections R1 and R2 in order to move the mover 2 from the zone Z1 corresponding to the specified node Nd1 to the zone Z3 corresponding to the virtual node Nv2. In accordance with this instruction information, the controller 42 of the client terminal 4 generates a control signal that makes the mover 2 travel along the two route sections R1 and R2. As a result, the mover 2 travels from the zone Z1 toward the zone Z3 along the two route sections R1 and R2.

In this embodiment, the mover control system 1 performs the reservation processing every time the zone Zm where the target mover 2t is currently located changes. That is to say, once the target mover 2t has left the zone Z1, the zone Zm where the target mover 2t is currently located changes into the zone Z2 as shown in FIG. 4C, and therefore, the mover control system 1 performs the reservation processing for the second time.

In performing the reservation processing for the second time, the mover control system 1 marks the specified node Nd1 corresponding to the zone Z1 as unoccupied. This is because the zone Z1 that the target mover 2t has left no longer needs to be occupied by the target mover 2t, and therefore, the state of the specified node Nd1 corresponding to the zone Z1 is turned from occupied into unoccupied. Furthermore, when the reservation processing is performed for the second time, the mover control system 1 marks the node adjacent in the traveling direction to the virtual node Nv2 corresponding to the zone Z3 (namely, the virtual node Nv3) as newly occupied. As a result, access of all movers, but the target mover 2t, to the zones Z2, Z3, and Z4 corresponding to the occupied nodes (i.e., the virtual nodes Nv1, Nv2, and Nv3) in the predetermined area A1, is restricted (i.e., prohibited).

Figure 4C:
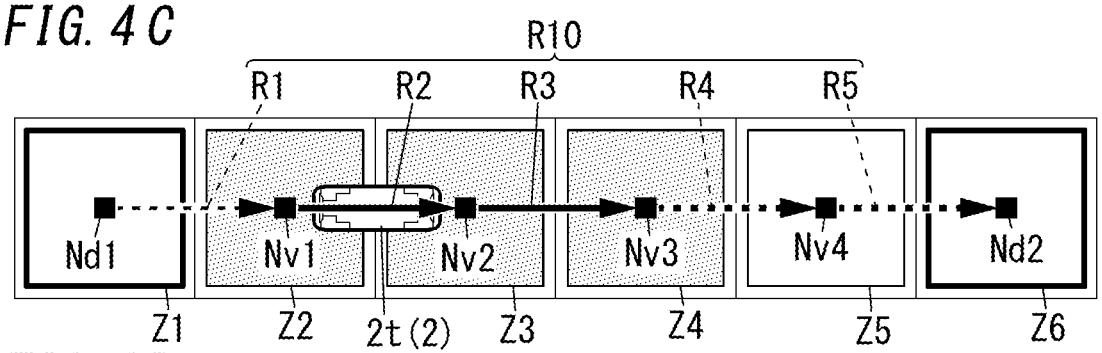
FIG. 4C is a schematic representation showing the concept of the operation of the mover control system by illustrating, as still another top view of the predetermined area, how the mover travels within the predetermined area.

Next, the mover control system 1 instructs the mover 2 (target mover 2t) to move within the zones Z2, Z3, and Z4 corresponding to the occupied nodes as shown in FIG. 4C. As a result, the mover 2 travels from the zone Z2 toward the zone Z4 along the two route sections R2 and R3.

After that, the mover control system 1 performs the reservation processing, every time the zone Zm where the target mover 2t is currently located changes, thereby making the mover 2 travel on a route section R-R5 basis while adding one occupied node in each step of the reservation processing.

Figure 4D:
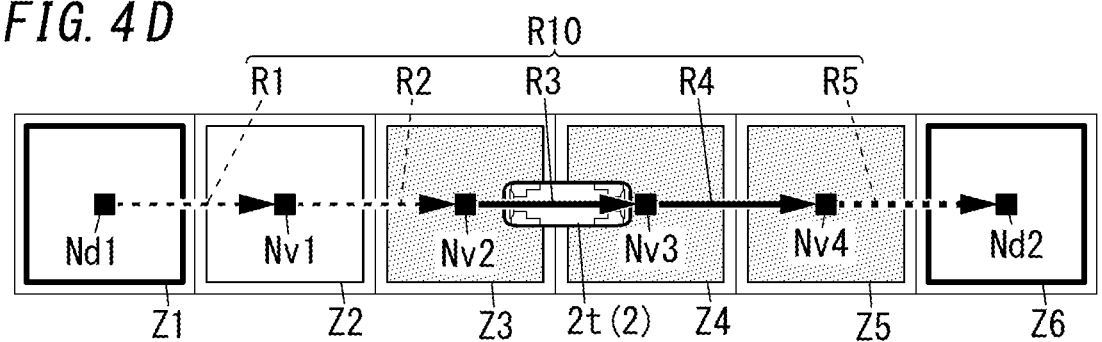
FIG. 4D is a schematic representation showing the concept of the operation of the mover control system by illustrating, as yet another top view of the predetermined area, how the mover travels within the predetermined area.

That is to say, once the target mover 2t has left the zone Z2, the zone Zm where the target mover 2t is currently located changes into the zone Z3 as shown in FIG. 4D, and therefore, the mover control system 1 performs the reservation processing for the third time.

In performing the reservation processing for the third time, the mover control system 1 marks the virtual node Nv1 corresponding to the zone Z2 as unoccupied. Furthermore, when the reservation processing is performed for the third time, the mover control system 1 marks the node adjacent in the traveling direction to the virtual node Nv3 corresponding to the zone Z4 (namely, the virtual node Nv4) as newly occupied. As a result, access of all movers, but the target mover 2t, to the zones Z3, Z4, and Z5 corresponding to the occupied nodes (i.e., the virtual nodes Nv2, Nv3, and Nv4) in the predetermined area A1, is restricted (i.e., prohibited).

Next, the mover control system 1 instructs the mover 2 (target mover 2t) to move within the zones Z3, Z4, and Z5 corresponding to the occupied nodes as shown in FIG. 4D. As a result, the mover 2 travels from the zone Z3 toward the zone Z5 along the two route sections R3 and R4.

Thereafter, when the target mover 2t leaves the zone Z3, the zone Zm where the target mover 2t is currently located changes into the zone Z4, and therefore, the mover control system 1 performs the reservation processing for the fourth time. After that, when the target mover 2t leaves the zone Z4, the zone Zm where the target mover 2t is currently located changes as shown in FIG. 4E, and therefore, the mover control system 1 performs the reservation processing for the fifth time.

In performing the reservation processing for the fifth time, the mover control system 1 marks the virtual node Nv3 corresponding to the zone Z4 as unoccupied. As a result, access of all movers, but the target mover 2t, to the zones Z5 and Z6 corresponding to the occupied nodes (i.e., the virtual node Nv4 and the specified node Nd2) in the predetermined area A1, is restricted (i.e., prohibited).

Figure 4E:
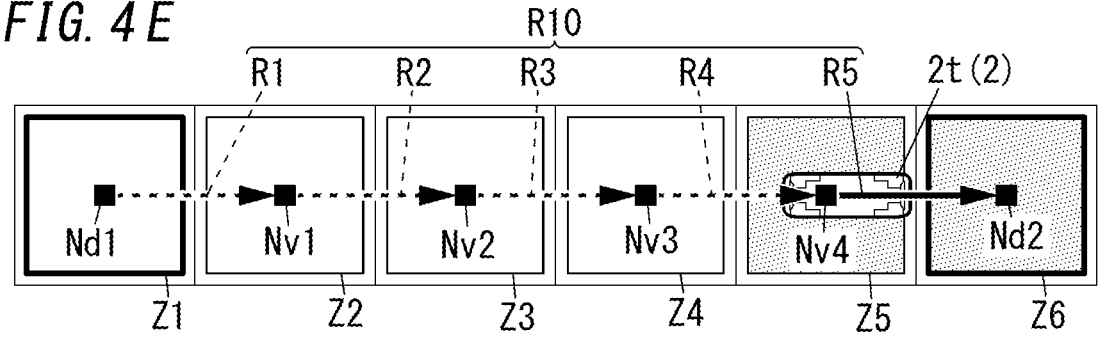
FIG. 4E is a schematic representation showing the concept of the operation of the mover control system by illustrating, as yet another top view of the predetermined area, how the mover travels within the predetermined area.

Next, the mover control system 1 instructs the mover 2 (target mover 2t) to move within the zones Z5 and Z6 corresponding to the occupied nodes as shown in FIG. 4E. As a result, the mover 2 travels from the zone Z5 toward the zone Z6 along the route section R5.

In this manner, the mover control system 1 makes the mover 2 move while adding one occupied node in each step of the reservation processing, thereby allowing the mover 2 to finally reach the zone Z6 corresponding to the specified node Nd2 from the zone Z1 corresponding to the specified node Nd1 within the predetermined area A1. Consequently, the mover control system 1 makes the mover 2 travel along the traveling route R10, corresponding to the path P1 generated between the pair of specified nodes Nd1 and Nd2, within the predetermined area A1.

(3.2) Design of Control Plan

Next, it will be described how the mover control system 1 designs a control plan for controlling the mover 2.

(3.2.1) Map Plan

The server device 3 stores, in the first storage device 39, information about the map M1 corresponding to the predetermined area A1 as shown in FIG. 5. The design of a control plan is carried out on a setting screen D1 including such a map M1.

The map M1 corresponds to a plan view of the predetermined area A1. The map M1 includes information about the entrance 902, exit 903, columns 904, boundary wall 905, and belt conveyer 906 within the predetermined area A1 and information about a restricted area for the movers 2. As used herein, the "restricted area" is an area to which the access of the movers 2 is restricted.

The map M1 includes the plan view of the predetermined area A1 and grid lines G1 displayed to be superimposed on the map data. The grid lines G1 are arranged parallel to the first axis Ax and the second axis Ay and at generally regular intervals. In other words, the map M1 constitutes a grid map that is divided by those grid lines G1 into a plurality of squares arranged in a grid pattern. The squares each suitably have the shape of a square, of which the dimension corresponds to the width, measured in the traveling direction of the mover 2 in the predetermined area A1, of the mover 2. For example, the squares may be formed in the shape of a square with dimensions of 60 cm (length)×60 cm (width) corresponding to the width of the mover 2.

Each location on the map M1 is represented, with respect to an origin set at a particular location on the map M1, as a coordinate location (X, Y) defined by two coordinates on the first axis Ax and the second axis Ay, respectively. That is to say, each location on the map M1 may be specified uniquely by the coordinate location (X, Y). Furthermore, an azimuth on the map M1 is defined by an "azimuth angle." Specifically, the azimuth pointing upward from the bottom of FIG. 5, i.e., the azimuth indicated by the arrow on the second axis Ay, is defined to be an azimuth with an azimuth angle of zero degrees. The azimuth angle is defined so as to increase clockwise from this azimuth. The map M1 information stored in the first storage device 39 may be updated from time to time as needed.

The server device 3 makes the display controller 38 display, on the display device 62 of the information terminal 6, the setting screen D1 including such a map M1. That is to say, a setting screen D1 such as the one shown in FIG. 5 is displayed on the display device 62 of the information terminal 6. The user is allowed to set a traveling route for the mover 2 by using the user interface 63 of the information terminal 6 in a state where the setting screen D1 is displayed. In other words, using the design support system 100 allows the user to design, on the setting screen D1, a control plan for controlling the mover 2 traveling within the predetermined area A1.

Figure 6:
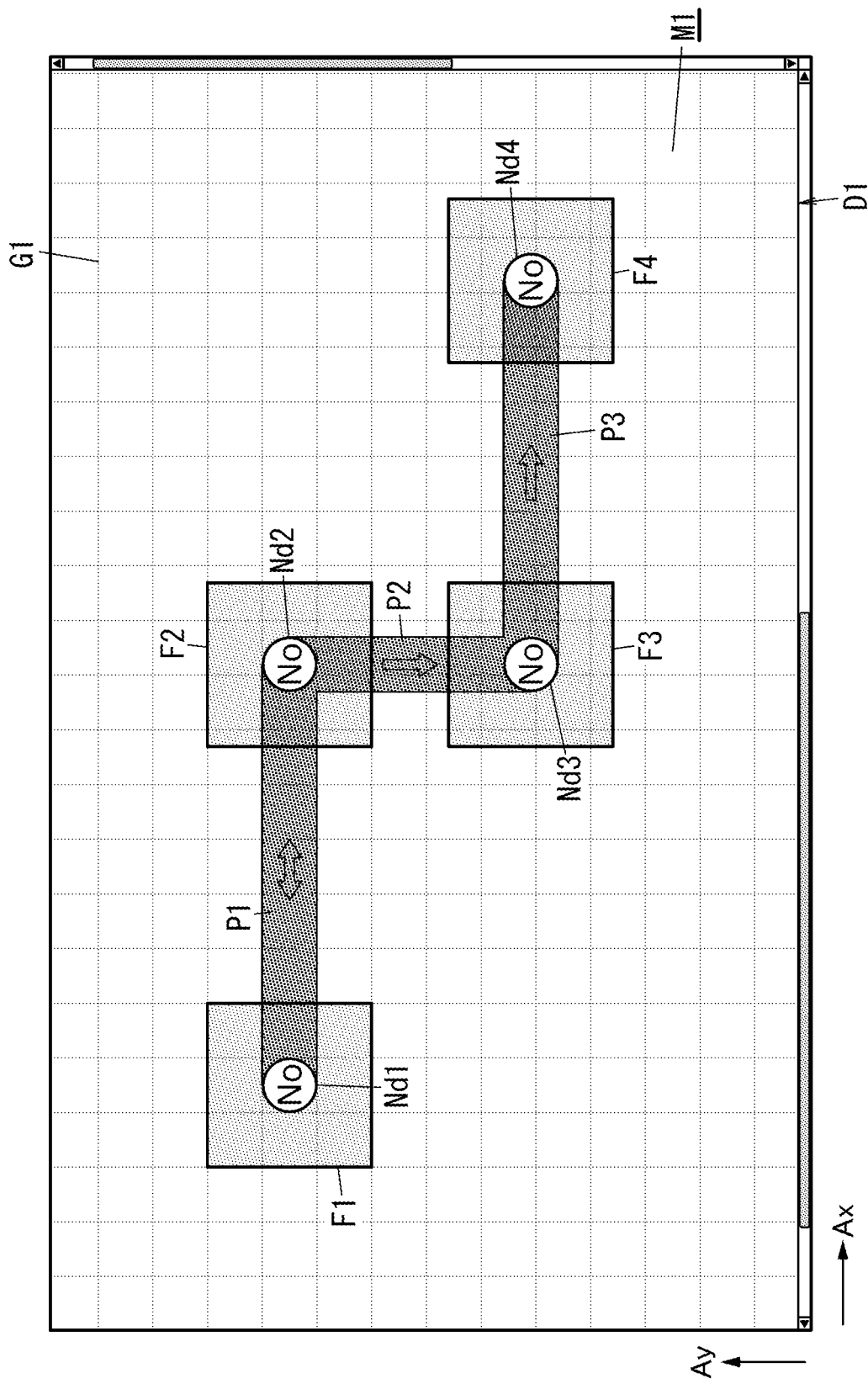
FIG. 6 schematically illustrates another setting screen displayed on the display device of the information terminal in the design support system.

FIG. 6 illustrates the setting screen D1 showing a part of the map M1 on a larger scale. Such a setting screen D1 allows the user to perform the operation of generating a specified node Nd1 on the map M1 by using the user interface 63 of the information terminal 6.

Specifically, the user designates at least one specified location on the map M1 on the setting screen D1 by operating the user interface 63. In this case, the user interface 63 outputs a command signal in response to the user's command of designating the specified location. In accordance with this command signal, the node generator 32 generates, at the specified location on the map M1, a specified node Nd1 as a node where the mover 2 is controllable. In this case, the user is allowed to designate any arbitrary location on the map M1 as the specified location by using a mouse as the user interface 63. This allows the node generator 32 to generate the specified node Ndm at any arbitrary location on the map M1.

In this case, the mover control system 1 according to this embodiment is able to set a node at any arbitrary location on the map M1 without being constrained by any grid line G1. That is to say, the map M1 according to this embodiment includes, on the setting screen D1, grid lines G1 as a reference or an input support for setting nodes. Nevertheless, the node generator 32 generates the specified nodes Ndm irrespective of the locations of the grid lines G1. Thus, this embodiment allows the nodes to be set at any arbitrary locations on the map M1 without being constrained by the grid lines G1.

The user performs the same type of operation repeatedly, thereby generating a plurality of specified nodes Ndm on the map M1. In the example illustrated in FIG. 6, the user performs the same type of operation four times to generate four specified nodes Nd1-Nd4 on the map M1. Out of these four specified nodes Nd1-Nd4, each pair of adjacent specified nodes Ndm forms a pair of specified nodes Ndm. Specifically, the specified nodes Nd1 and Nd2 form a pair of specified nodes Ndm. In the same way, the specified nodes Nd2 and Nd3 form another pair of specified nodes Ndm, so do the specified nodes Nd3 and Nd4.

Also, on the setting screen D1, a frame Fm is displayed around each specified node Ndm so as to surround the specified node Ndm. The suffix m of each frame Fm is a natural number of 1, 2, 3, and so on. In the example illustrated in FIG. 6, frames F1-F4 are set for the four specified nodes Nd1-Nd4, respectively. In this case, each frame Fm corresponds to an associated zone Zm in the predetermined area A1. In this embodiment, each frame Fm is suitably in the shape of a square, of which the size is large enough for the mover 2 to turn around in the predetermined area A1. For example, each frame Fm is large enough to define a square area with a length of 180 cm and a width of 180 cm in the predetermined area A1. Each specified node Ndm is located at the center of its associated frame Fm surrounding the specified node Ndm. In this embodiment, a plurality of frames Fm may not (i.e., are prohibited to) overlap with each other. For example, a frame F2 surrounding the specified node Nd2 is not set inside of a frame F1 surrounding the specified node Nd1. This sets a lower limit value L for the interval between each pair of adjacent specified nodes Ndm. In this case, the lower limit value L may be 180 cm in the predetermined area A1.

That is to say, the specified nodes Ndm may not be arranged such that the interval between any pair of adjacent specified nodes Ndm is less than the lower limit value L (i.e., such an arrangement is prohibited). As can be seen, on the setting screen D1 that allows the user to set nodes (specified nodes Ndm), locations where the specified nodes Ndm may be set are restricted such that the interval between each pair of adjacent nodes becomes equal to or greater than the lower limit value L as a matter of principle. Nevertheless, there are some exceptions. For example, as for an exception node Nem to be described later, the node (exception node Nem) may also be set at such a location where the interval to an adjacent node becomes less than the lower limit value L.

In this case, the user is also allowed to select the attributes of each node to be set on the map M1. Examples of the attributes of nodes include the types of the nodes including at least specified nodes Ndm and exception nodes Nem. For example, the user may have a pull-down menu displayed on the setting screen D1 by operating the user interface 63 and select the attribute of the node on the pull-down menu.

The user is allowed to perform the operation of generating a path Pm on the map M1 by operating the user interface 63 of the information terminal 6 on the setting screen D1 in a state where at least two (i.e., at least one pair of) specified nodes Ndm are generated on the map M1.

Specifically, the user selects at least an arbitrary specified node Ndm on the map M1 on the setting screen D1 by operating the user interface 63. In this case, the user interface 63 outputs a command signal in response to the user's command of selecting the specified node Ndm. The node generator 32 generates, in accordance with this command signal, a path Pm, of which the starting point is the specified node Ndm selected. In this case, while selecting, using a mouse as an exemplary user interface 63, the specified node Ndm as a starting point of the path Pm, the user drags the mouse toward another specified node Ndm as an end point of the path Pm. In this manner, a pair of specified nodes Ndm to be respectively the starting point and end point of the path Pm are selected, and a path Pm is generated between this pair of specified nodes Ndm.

In the example illustrated in FIG. 6, a path P1 is generated between the pair of specified nodes Nd1 and Nd2, another path P2 is generated between the pair of specified nodes Nd2 and Nd3, and still another path P3 is generated between the pair of specified nodes Nd3 and Nd4. That is to say, in the example illustrated in FIG. 6, three paths P1-P3 are generated.

In this case, the user is allowed to select his or her desired attribute for each path Pm to be set on the map M1. Paths Pm may be classified according to attributes into at least bidirectional paths and unidirectional paths. The bidirectional path Pm is a path that allows the mover 2 to move bidirectionally, i.e., a path Pm that allows the mover 2 to go back and forth. The unidirectional path Pm is a path that allows the mover 2 to move in only one direction, i.e., a path Pm that does not allow the mover 2 to go back and forth. For example, the user may have a pull-down menu displayed on the setting screen D1 by operating the user interface 63 and select the attribute of the path Pm on the pull-down menu. The attribute of the path Pm is represented by the arrow shown in the path Pm on the setting screen D1. Specifically, in the example illustrated in FIG. 6, out of the three paths P1-P3, the path P1 is a bidirectional path and the paths P2 and P3 are unidirectional paths.

In this embodiment, the path generator 33 searches the map M1 for a path Pm that connects the departure node and the destination node through the shortest route. The path generator 33 also generates the path Pm such that the path Pm is parallel to either the first axis Ax or the second axis Ay. That is to say, the path Pm generated by the path generator 33 is set to be parallel to either the first axis Ax or the second axis Ay. Optionally, the path generator 33 may generate the path Pm so as to define a traveling route that allows the mover 2 to move smoothly, i.e., a traveling route with as small a number of corners to turn as possible.

(3.2.2) Virtual Node

The mover control system 1 and design support system 100 according to this embodiment have the function of setting, in a situation where a pair of specified nodes Ndm have been set, one or more virtual nodes Nvm between the pair of specified nodes Ndm according to the interval between the pair of specified nodes Ndm.

That is to say, the virtual node generator 35 generates, between the pair of specified nodes Ndm on the map M1, at least one virtual node Nvm separately from the pair of specified nodes Ndm. As used herein, the "virtual node" is also a type of node, but is not displayed on the setting screen D1 unlike the specified nodes Ndm and is generated automatically on the path Pm generated between the pair of specified nodes Ndm.

Specifically, an upper limit value is set with respect to the interval between the pair of specified nodes Ndm, and one or more virtual nodes Nvm are set appropriately between the pair of specified nodes Ndm such that the interval between the pair of specified nodes Ndm becomes less than the upper limit value. In this embodiment, the upper limit value is 2L, that is, twice as long as the lower limit value L that is set with respect to the interval between a pair of adjacent specified nodes Ndm. Specifically, if the lower limit value L is 180 cm in the predetermined area A1, the upper limit value 2L is 360 cm in the predetermined area A1.

This allows the mover control system 1 to control the mover 2 on the basis of nodes (including the specified nodes Ndm and the virtual nodes Nvm) that are set at appropriate intervals. Therefore, even if a pair of specified nodes Ndm have been set at an excessively long interval due to the absence of grid lines, the mover control system 1 is still able to control the mover 2 by making the mover 2 stop or change the traveling route thereof at an appropriate spot.

Also, the interval between two adjacent nodes on the path Pm is limited as a matter of principle to the range from the lower limit value L to less than the upper limit value 2L. Even if the interval between the pair of specified nodes Ndm turns out to be equal to or greater than the upper limit value 2L under such a limitation, one or more virtual nodes Nvm are set appropriately between the pair of specified nodes Ndm. Thus, the virtual node generator 35 determines the numerical number and locations of the virtual nodes Nvm such that the interval between adjacent nodes on the path Pm is equal to or greater than the lower limit value L and less than the upper limit value 2L.

FIGS. 7A-7D schematically illustrate how to generate the virtual nodes Nvm. In the following example, virtual nodes Nvm are generated between the pair of specified nodes Nd1 and Nd2. That is to say, the interval between the pair of specified nodes Nd1 and Nd2, i.e., the length of the path Pm (hereinafter referred to as a "path length Lp"), is supposed to be equal to or greater than the upper limit value 2L.

Figure 7A:
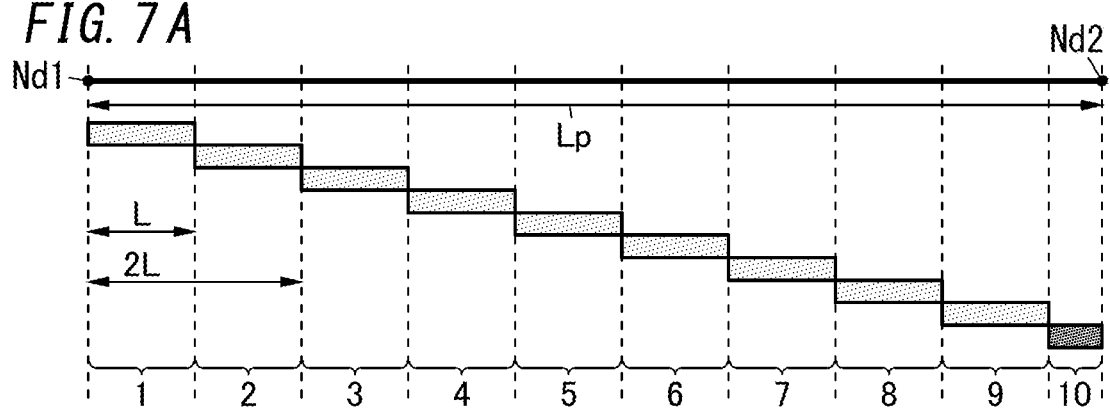
FIG. 7A illustrates a concept of a method for generating a virtual node in the design support system.

In this case, first, the virtual node generator 35 divides the interval between the pair of specified nodes Nd1 and Nd2 (i.e., the path length Lp) by the lower limit value L to obtain a quotient α (where α is a natural number) and a remainder β (where β is a natural number) as shown in FIG. 7A. Since the quotient α is 9 in this example, nine unitary paths, each having a length corresponding to the lower limit value L, are included between the pair of specified nodes Nd1 and Nd2 as shown in FIG. 7A. In the example illustrated in FIG. 7A, the unitary path is included in each of Sections 1 through 9, and a remainder path, of which the length corresponds to the remainder β, is included in Section 10.

Figure 7B:
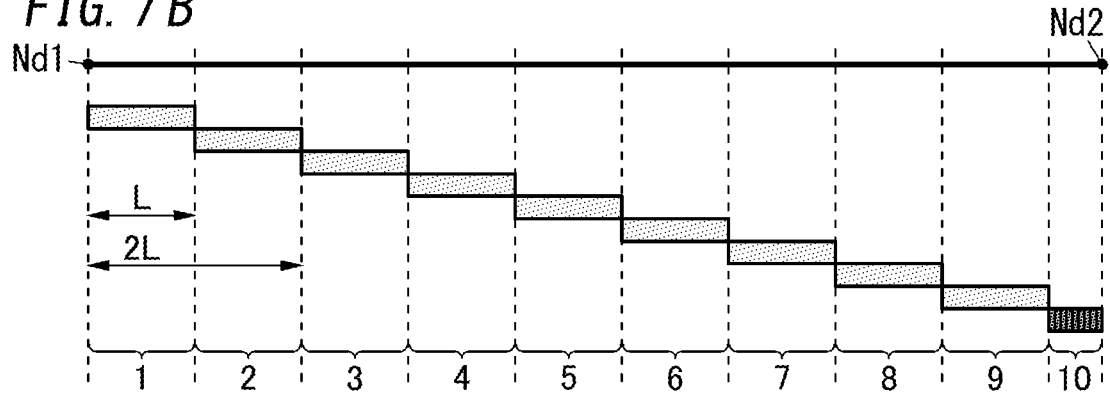
FIG. 7B illustrates the concept of the method for generating a virtual node in the design support system.
Figure 7C:
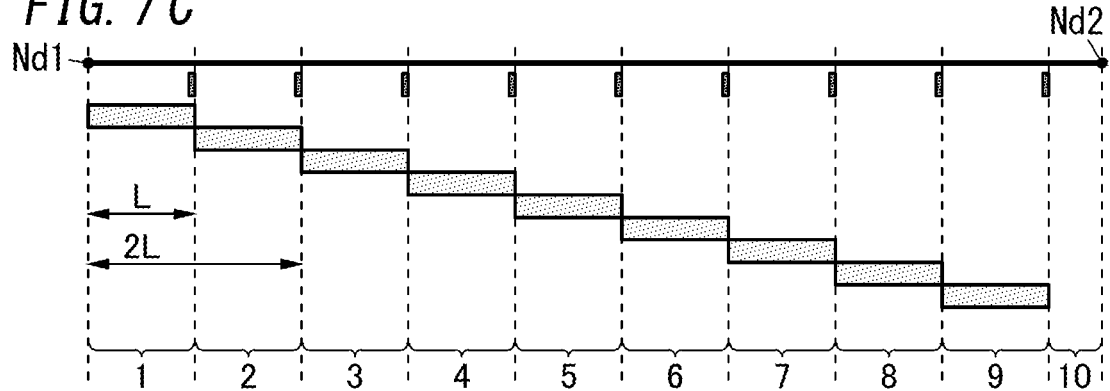
FIG. 7C illustrates the concept of the method for generating a virtual node in the design support system.

Next, the virtual node generator 35 performs proration processing of prorating the remainder β by the quotient α as shown in FIG. 7B. The remainder path is equally divided by proration processing into nine remainder paths, which are respectively allocated to a plurality of Sections 1 through 9 as shown in FIG. 7C. In this case, a unit may be defined with respect to the remainder path to be prorated by the proration processing. In that case, the remainder path may be equally divided into, for example, five remainder paths, which are respectively allocated to Sections 1 through 5.

Figure 7D:
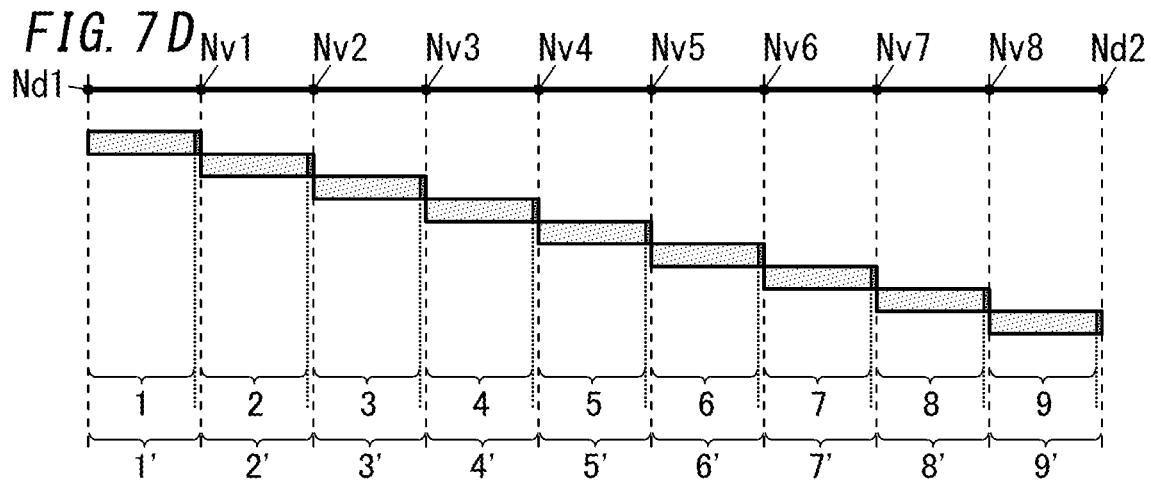
FIG. 7D illustrates the concept of the method for generating a virtual node in the design support system.

Finally, an associated one of the prorated remainder paths is added to each unitary path, thereby extending the unitary paths for those Sections 1 through 9 as shown in FIG. 7D. As a result, the path between the pair of specified nodes Nd1 and Nd2 is divided into nine Sections 1' through 9' and a virtual node Nvm is set at each division point as shown in FIG. 7D. That is to say, in the example illustrated in FIG. 7D, eight virtual nodes Nv1-Nv8 are generated between the pair of specified nodes Nd1 and Nd2.

(3.2.3) Location Adjustment Function

The mover control system 1 and design support system 100 according to this embodiment have the function of adjusting the location of at least one of the pair of specified nodes Ndm.

Figure 8:
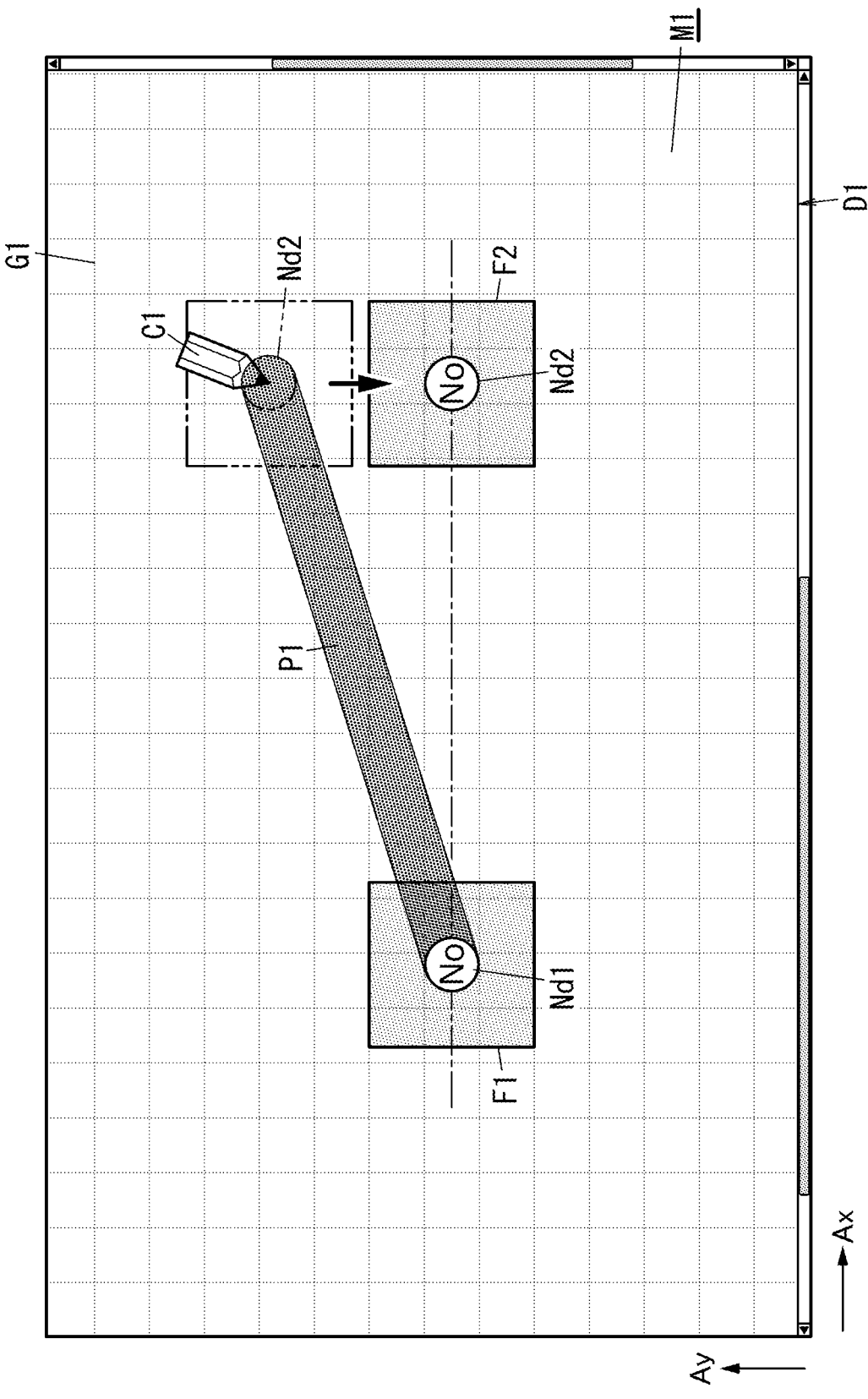
FIG. 8 schematically illustrates another setting screen displayed on the display device of the information terminal in the design support system.

In this embodiment, the location adjuster 37 adjusts, in generating a path Pm, the location of at least one of the pair of specified nodes Ndm that respectively define the starting point and end point of the path Pm. Specifically, when the path P1 is generated, the location of at least one of the pair of specified nodes Nd1 and Nd2 is adjusted such that the pair of specified nodes Nd1 and Nd2, respectively defining the starting point and end point of the path P1, are arranged parallel to the first axis Ax as shown in FIG. 8. FIG. 8 illustrates how the user uses a mouse as an exemplary user interface 63 to move a cursor C1 and drag, while selecting the specified node Nd1 to be the starting point of the path P1, the mouse toward the other specified node Nd2 to be the end point of the path P1.

In that case, even if the specified node Nd2 is not originally arranged, along with the specified node Nd1, parallel to the first axis Ax, the specified node Nd2 has its location adjusted, when selected as the end point of the path P1, so as to be arranged, along with the specified node Nd1, parallel to the first axis Ax. That is to say, the location of the specified node Nd2 is adjusted downward as shown in FIG. 8. As a result, the path P1 generated between the pair of specified nodes Nd1 and Nd2 is also adjusted so as to be parallel to the first axis Ax.

Nevertheless, such adjustment is not always performed but is omitted if the magnitude of shift between the pair of specified nodes Nd1 and Nd2 is equal to or greater than an adjustment limit value. As used herein, the adjustment limit value is equal to the length of each side of the frame Fm (e.g., 180 cm in the predetermined area A1). For example, if the distance from a line passing through the specified node Nd1 and parallel to the first axis Ax to the specified node Nd2 is equal to or greater than the adjustment limit value, the location of the specified node Nd2 is not adjusted along the second axis Ay. Likewise, if the distance from a line passing through the specified node Nd1 and parallel to the second axis Ay to the specified node Nd2 is equal to or greater than the adjustment limit value, the location of the specified node Nd2 is not adjusted along the first axis Ax. In addition, when the magnitude of shift between the pair of specified nodes Nd1 and Nd2 is found to be equal to or greater than the adjustment limit value to omit the adjustment, no paths P1 are generated between the pair of specified nodes Nd1 and Nd2, either.

(3.2.4) Exception Node

The mover control system 1 and design support system 100 according to this embodiment further have the function of generating an exception node Nem.

In this embodiment, the exception node generator 36 generates an exception node Nem as shown in FIG. 9, for example. The exception node Nem may also be generated even at a location, from which the interval to an adjacent node is less than the lower limit value L. In this embodiment, the minimum interval from any exception node Nem to an adjacent node may be defined as long as the interval between the grid lines G1 (e.g., 60 cm in the predetermined area A1). In this embodiment, no frames Fm such as the one displayed for each specified node Ndm is displayed for any exception node Nem on the setting screen D1.

That is to say, in a situation where three exception nodes Ne1-Ne3 are generated on the setting screen D1 as shown in FIG. 9, the lower limit value L is not applied to the interval between any of these exception nodes Ne1-Ne3 and an adjacent node. Thus, the exception nodes Ne1-Ne3 are applicable to even a location, from which the interval to an adjacent node is less than the lower limit value L.

In this case, if a plurality of exception nodes Nem have been generated at intervals that are less than the lower limit value L, then the plurality of exception nodes Nem are grouped such that the sum of the intervals between adjacent ones of the plurality of exception nodes Nem becomes equal to or greater than the lower limit value L. In the example illustrated in FIG. 9, the three exception nodes Ne1-Ne3 are arranged at an interval (e.g., 90 cm in the predetermined area A1) that is 1.5 times as long as the interval between the grid lines G1. Thus, these three exception nodes Ne1-Ne3 are grouped. Therefore, when the reservation unit 34 marks a node as occupied, these three exception nodes Ne1-Ne3 are marked as occupied at a time.

(3.2.5) Reserved Number Adjustment Function

Next, the reserved number adjustment function will be described with reference to FIGS. 10A-10E.

FIGS. 10A-10E are schematic representations conceptually illustrating, as top views of the predetermined area A1, how the mover 2 travels within the predetermined area A1 just like FIGS. 4A-4E referred to for the "(3.1) Basic operation" section. In the following description, any features that have already been described in the "(3.1) Basic operation" section will not be described all over again.

In this embodiment, each communications terminal 5 communicates, by wireless communication via radio waves, with the communications device (second communications device 41) built in an associated one of the movers 2 traveling within the predetermined area A1. Thus, the reservation unit 34 determines the reserved number according to the status of the wireless communication with the communications device (second communications device 41) of the communications terminal 5. That is to say, according to this embodiment, the reserved number indicating the number of nodes that are simultaneously marked as occupied for a single target mover 2t at the time of the reservation processing is not a constant value but may be a variable value varying according to the status of the wireless communication.

In this embodiment, the reservation unit 34 determines the reserved number according to the status of the wireless communication such that as radio field strength of the wireless communication decreases, the reserved number increases. Specifically, the reservation unit 34 obtains the radio field strength of the wireless communication between the communications terminal 5 and the second communications device 41 as the received signal strength indication (RSSI) of either the communications terminal 5 or the second communications device 41. In general, the lower the radio field strength of the wireless communication is, the slimmer the chances of the wireless communication being established between the client terminal 4 (second communications device 41) for mover 2 and the communications terminal 5 are. Therefore, in such a situation, the reserved number of the reservation unit 34 is increased.

In this embodiment, a threshold value may be set with respect to the radio field strength, for example. The reservation unit 34 rates the status of the wireless communication "good" and sets the reserved number at two, when finding the radio field strength equal to or greater than the threshold value, but rates the status of the wireless communication "bad" and sets the reserved number at three, when finding the radio field strength less than the threshold value.

The statuses of the wireless communication may be measured in advance on a node-by-node basis and stored in the first storage device 39 in association with the map M1. Therefore, it is already known to the server device 3 at which of the plurality of nodes generated on the map M1 the status of the wireless communication is good (i.e., the radio field strength is equal to or greater than a threshold value). Also, when finding any node with a bad wireless communication status (i.e., with a radio field strength less than the threshold value) in the nodes marked as occupied, the reservation unit 34 decreases the reserved number to three. Alternatively, the status of the wireless communication may be acquired in real time by the server device 3.

Next, specific processing of adjusting the reserved number will be described. In the example illustrated in FIGS. 10A-10E, only the virtual node Nv2, out of the plurality of nodes, is supposed to have a bad wireless communication status, and the other nodes are supposed to have a good wireless communication status.

Figure 10A:
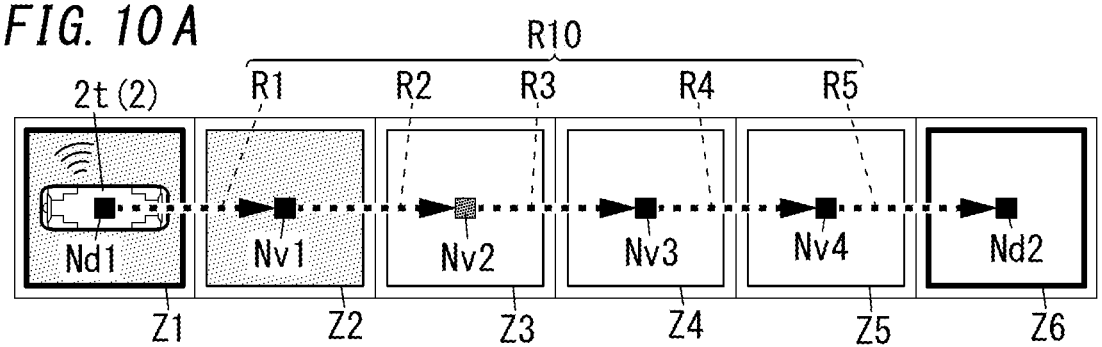
FIG. 10A is a schematic representation showing a concept of the operation of the mover control system by illustrating, as a top view of a predetermined area, how the mover travels within the predetermined area.

First of all, the mover control system 1 performs, on a target mover 2t which may be the mover 2 currently located in a zone Z1 corresponding to the specified node Nd1 within the predetermined area A1, reservation processing of marking one or more nodes associated with the target mover 2t as occupied as shown in FIG. 10A. As a result of this reservation processing, a reserved number of nodes, which are counted in the traveling direction from the node corresponding to the zone Z1 where the target mover 2t is currently located, are marked as occupied. In this case, the specified node Nd1 and the virtual node Nv1 both have a good wireless communication status, and therefore, the reserved number is two in this situation.

Therefore, the two nodes, counted in the traveling direction from the node corresponding to the zone Z1 where the target mover 2t is currently located, namely, the specified node Nd1 and the virtual node Nv1, are marked as occupied.

Figure 10B:
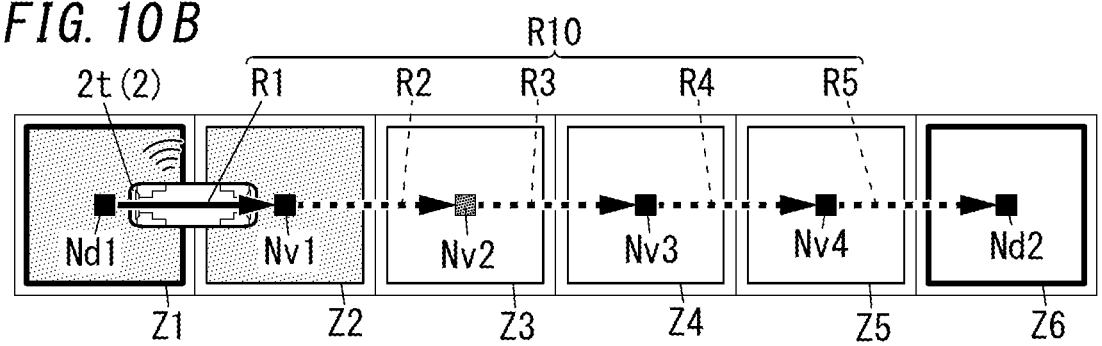
FIG. 10B is a schematic representation showing the concept of the operation of the mover control system by illustrating, as another top view of the predetermined area, how the mover travels within the predetermined area.

Next, the mover control system 1 instructs the mover 2 (target mover 2t) to move within the zones Z1 and Z2 corresponding to the occupied nodes as shown in FIG. 10B. As a result, the mover 2 travels along the route section R1 from the zone Z1 toward the zone Z2.

Figure 10C:
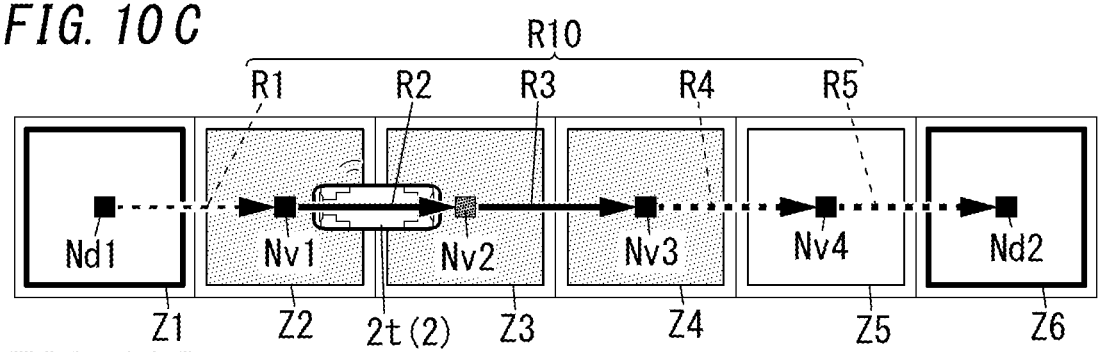
FIG. 10C is a schematic representation showing the concept of the operation of the mover control system by illustrating, as still another top view of the predetermined area, how the mover travels within the predetermined area.

In this embodiment, once the target mover 2t has left the zone Z1, the zone Zm where the target mover 2t is currently located changes into the zone Z2 as shown in FIG. 10C, and therefore, the mover control system 1 performs the reservation processing for the second time.

In performing the reservation processing for the second time, the mover control system 1 marks the specified node Nd1 corresponding to the zone Z1 as unoccupied. Furthermore, when the reservation processing is performed for the second time, the mover control system 1 marks the node adjacent in the traveling direction to the virtual node Nv1 corresponding to the zone Z2 (namely, the virtual node Nv2) as newly occupied. In this case, since the virtual node Nv2 has a bad wireless communication status, the reserved number is three in this situation.

Therefore, the three nodes, counted in the traveling direction from the node corresponding to the zone Z2 where the target mover 2t is currently located, namely, the virtual nodes Nv1, Nv2, and Nv3, are marked as occupied as shown in FIG. 10C. As a result, access of all movers, but the target mover 2t, to the zones Z2, Z3, and Z4 corresponding to the occupied nodes (i.e., the virtual nodes Nv1, Nv2, and Nv3) in the predetermined area A1, is restricted (i.e., prohibited).

Next, the mover control system 1 instructs the mover 2 (target mover 2t) to move within the zones Z2, Z3, and Z4 corresponding to the occupied nodes as shown in FIG. 10C. As a result, the mover 2 travels along the two route sections R2 and R3 from the zone Z2 toward the zone Z4.

Figure 10D:
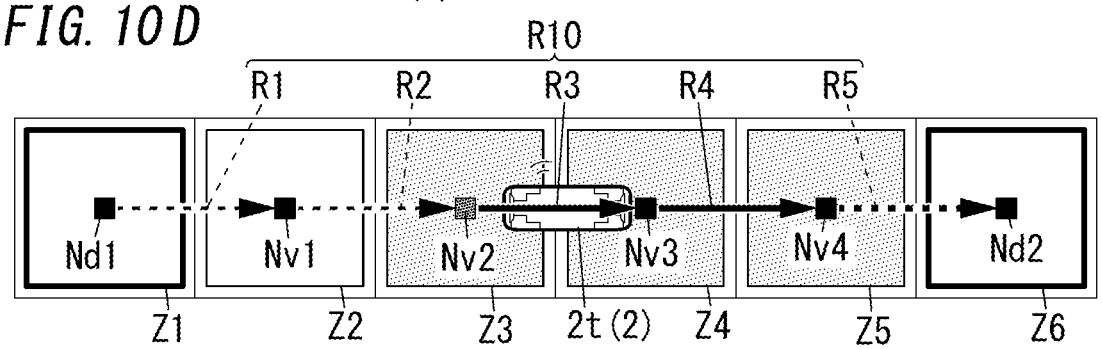
FIG. 10D is a schematic representation showing the concept of the operation of the mover control system by illustrating, as yet another top view of the predetermined area, how the mover travels within the predetermined area.

Thereafter, once the target mover 2t has left the zone Z2, the zone Zm where the target mover 2t is currently located changes into the zone Z3 as shown in FIG. 10D, and therefore, the mover control system 1 performs the reservation processing for the third time.

In performing the reservation processing for the third time, the mover control system 1 marks the virtual node Nv1 corresponding to the zone Z2 as unoccupied. Furthermore, when the reservation processing is performed for the third time, the mover control system 1 marks the node adjacent in the traveling direction to the virtual node Nv3 corresponding to the zone Z4 (namely, the virtual node Nv4) as newly occupied. As a result, access of all movers, but the target mover 2t, to the zones Z3, Z4, and Z5 corresponding to the occupied nodes (i.e., the virtual nodes Nv2, Nv3, and Nv4) in the predetermined area A1, is restricted (i.e., prohibited).

Next, the mover control system 1 instructs the mover 2 (target mover 2t) to move within the zones Z3, Z4, and Z5 corresponding to the occupied nodes as shown in FIG. 10D. As a result, the mover 2 travels along the two route sections R3 and R4 from the zone Z3 toward the zone Z5.

Thereafter, once the target mover 2t has left the zone Z3, the zone Zm where the target mover 2t is currently located changes into the zone Z4, and therefore, the mover control system 1 performs the reservation processing for the fourth time. When the reservation processing is performed for the fourth time, the virtual node Nv2 with a bad wireless communication status is not marked as occupied. Therefore, the reserved number is two at this time.

Figure 10E:
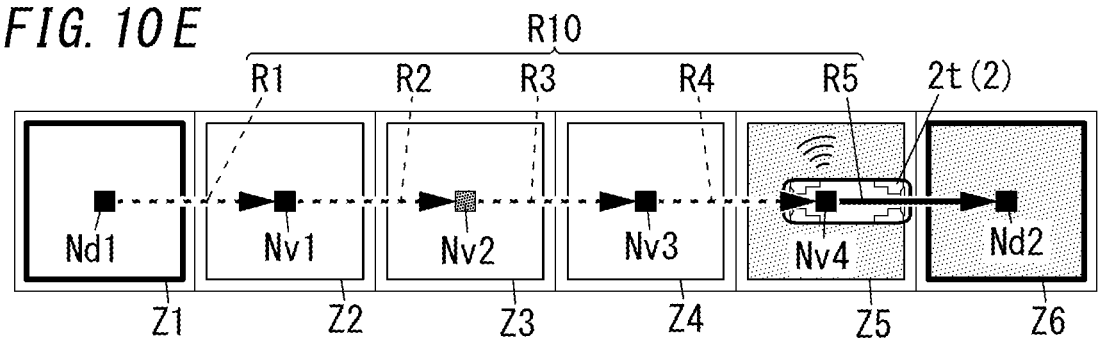
FIG. 10E is a schematic representation showing the concept of the operation of the mover control system by illustrating, as yet another top view of the predetermined area, how the mover travels within the predetermined area.

Subsequently, once the target mover 2t has left the zone Z4, the zone Zm where the target mover 2t is currently located changes into the zone Z5 as shown in FIG. 10E, and therefore, the mover control system 1 performs the reservation processing for the fifth time. The reserved number is also two at this time.

In performing the reservation processing for the fifth time, the mover control system 1 marks the virtual node Nv3 corresponding to the zone Z4 as unoccupied. Furthermore, when the reservation processing is performed for the fifth time, the mover control system 1 marks the node adjacent in the traveling direction to the virtual node Nv4 and corresponding to the zone Z5 (namely, the specified node Nd2) as newly occupied. As a result, access of all movers, but the target mover 2t, to the zones Z5 and Z6 corresponding to the occupied nodes (i.e., the virtual node Nv4 and the specified node Nd2) in the predetermined area A1, is restricted (i.e., prohibited).

Next, the mover control system 1 instructs the mover 2 (target mover 2t) to move within the zones Z5 and Z6 corresponding to the occupied nodes as shown in FIG. 10E. As a result, the mover 2 travels along the route section R5 from the zone Z5 toward the zone Z6.

(3.2.6) Area Template Function

Next, the area template function will be described with reference to FIGS. 11-13B.

Figure 11:
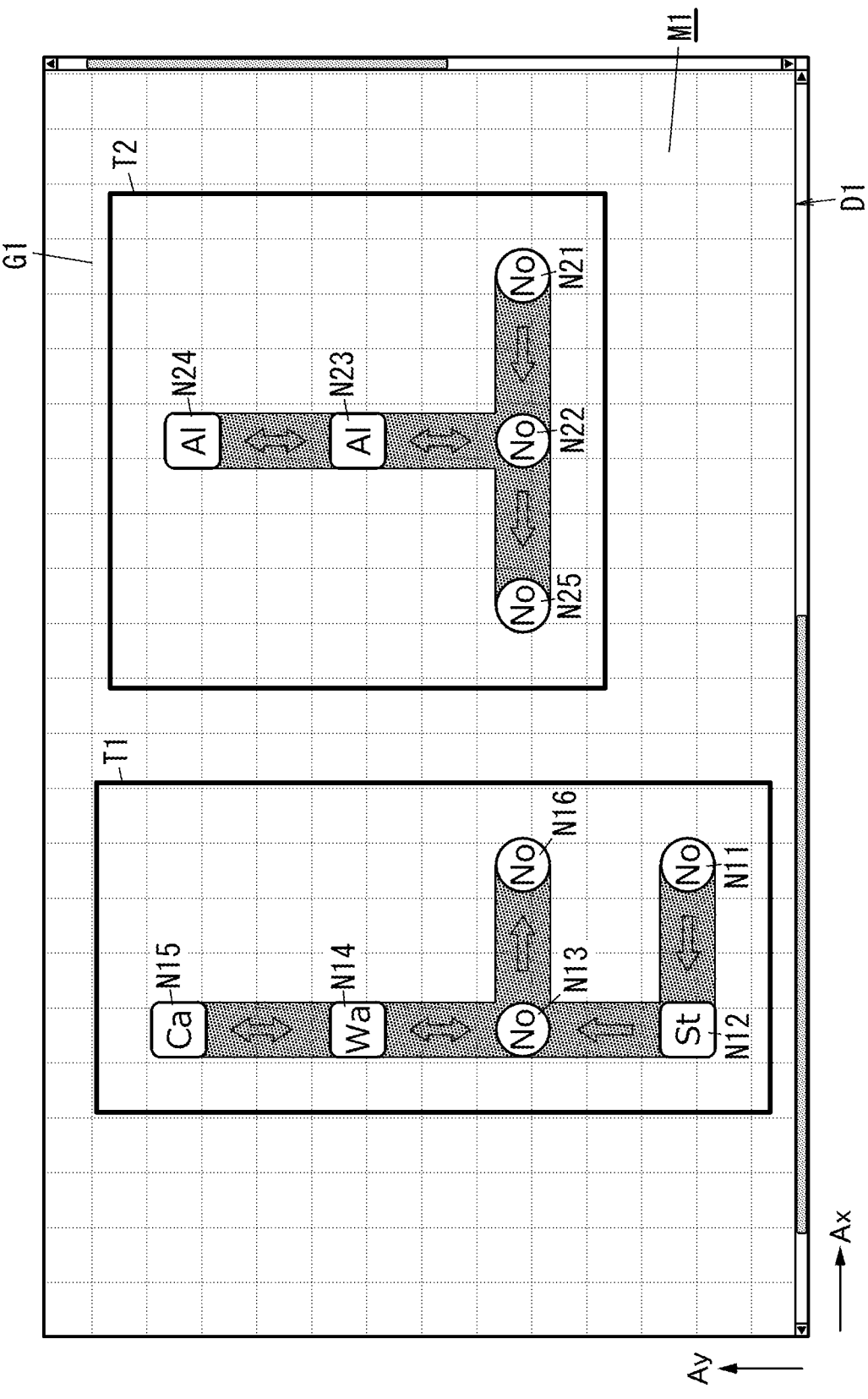
FIG. 11 schematically illustrates another setting screen displayed on the display device of the information terminal in the design support system.

In this embodiment, at least one area template T1, T2 may be used to design a control plan as shown in FIG. 11. The area template T1 includes a combination of nodes N11-N16 and the area template T2 includes a combination of nodes N21-N25. Each of these area templates T1 and T2 further includes a path connecting these nodes.

In this case, each of these area templates T1 and T2 includes "control types" for the respective nodes as an attribute of the nodes. As used herein, the control types refer to the specific types of control to be performed on the mover 2 at each node. Examples of the control types include stopping, changing the traveling direction (including turning), stopping to be aligned, standing by, waiting for grasping (grasping or loading the burden 92), and carrying out. For example, out of the plurality of nodes N11-N16 of the area template T1, the control types for the nodes N12, N14, and N15 are standing by (St), waiting for grasping (Wa), and carrying out (Ca), respectively. Out of the plurality of nodes N21-N25 of the area template T2, the control type for the nodes N23 and N24 is stopping to be aligned (Al).

Each of the area templates T1 and T2 includes an "entrance node" defining an entrance through which the mover 2 enters the area template T1, T2 and an "exit node" defining an exit through which the mover 2 leaves the area template T1, T2. For example, in the area template T1, out of the plurality of nodes N11-N16, the node N11 serves as the entrance node and the node N16 serves as the exit node. In this case, the mover 2 enters the area template T1 through the node N11 and leaves the area template T1 through the node N16. Likewise, in the area template T2, out of the plurality of nodes N21-N25, the node N21 serves as the entrance node and the node N25 serves as the exit node. In this case, the mover 2 enters the area template T2 through the node N21 and leaves the area template T2 through the node N25. Also, depending on the area template, a single node may be used as both the entrance node and the exit node.

When an area template T1 including a combination of a plurality of nodes N11-N16 has been set in an arbitrary area on the map M1 on the setting screen D1, the node generator 32 generates the plurality of nodes N11-N16 in the arbitrary area on the map M1. Likewise, when an area template T2 including a combination of a plurality of nodes N21-N25 has been set in an arbitrary area on the map M1 on the setting screen D1, the node generator 32 generates the plurality of nodes N21-N25 in the arbitrary area on the map M1. That is to say, this embodiment allows the design process of a control plan to be simplified by using such an area template T1 (or T2) including the plurality of nodes N11-N16 (N21-N25) as a single set. Specifically, simply connecting the entrance node and exit node of the area template T1 (or T2) to nodes outside of the area template T1 (or T2) allows the area template T1 (or T2) to be incorporated into the map M1.

Providing a single or a plurality of such area templates in advance before designing a control plan simplifies the design process compared with setting nodes one by one, because, in the former case, the user just needs to select an arbitrary area template and incorporate the area template into the map M1.

Figure 12A:
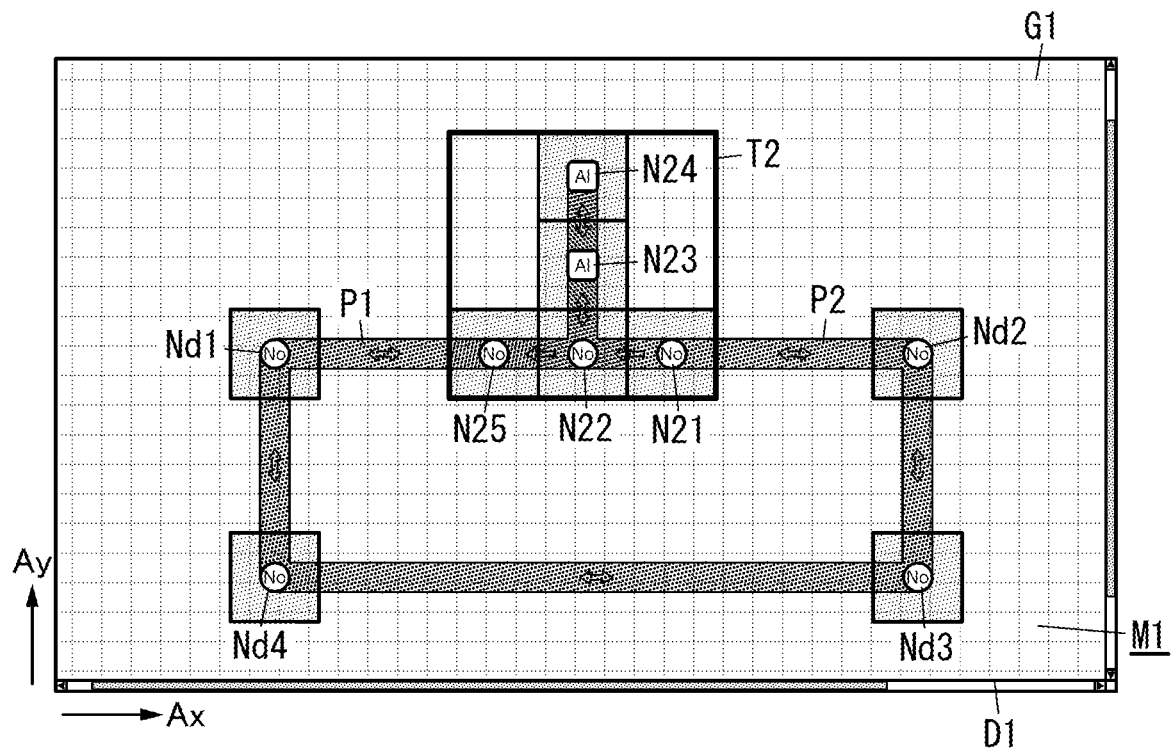
FIG. 12A schematically illustrates another setting screen displayed on the display device of the information terminal in the design support system.
Figure 12B:
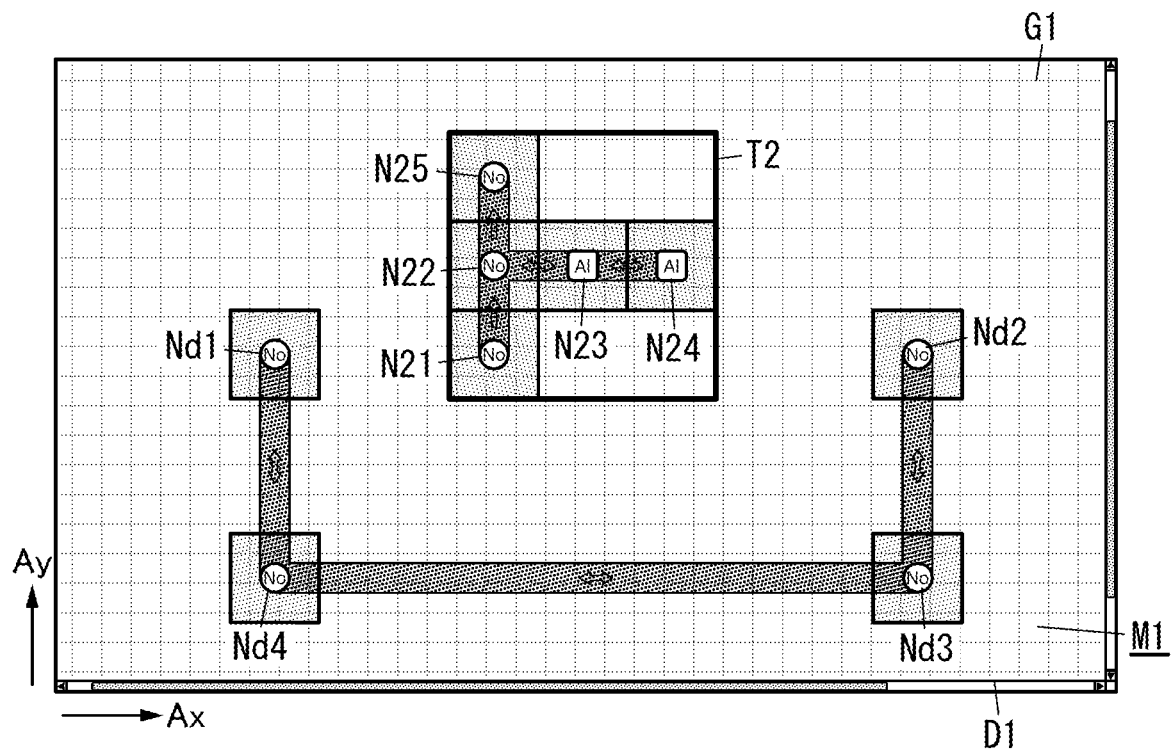
FIG. 12B schematically illustrates another setting screen displayed on the display device of the information terminal in the design support system.

Optionally, each of the area templates T1 and T2 may be rotated on an area template T1, T2 basis as shown in FIGS. 12A and 12B. In this case, the area template T1, T2 may be rotated either clockwise or counterclockwise and the angle of rotation of the area template T1, T2 is suitably selected from the group consisting of 90 degrees, 180 degrees, and 270 degrees. For example, suppose the area template T2 incorporated into the map M1 as shown in FIG. 12A is rotated 90 degrees clockwise. In this case, if the user specifies, while selecting the area template T2 with a mouse used as an exemplary user interface 63, the rotational direction as clockwise and the angle of rotation as 90 degrees, then the plurality of nodes N21-N25 included in the area template T2 rotates 90 degrees clockwise at a time while maintaining their positional relationship as shown in FIG. 12B. Then, with an alert message displayed on the setting screen D1, the path P1 that connected the node N25 of the area template T2 to the specified node Nd1 and the path P2 that connected the node N21 of the area template T2 to the specified node Nd2 are erased automatically.

Figure 13A:
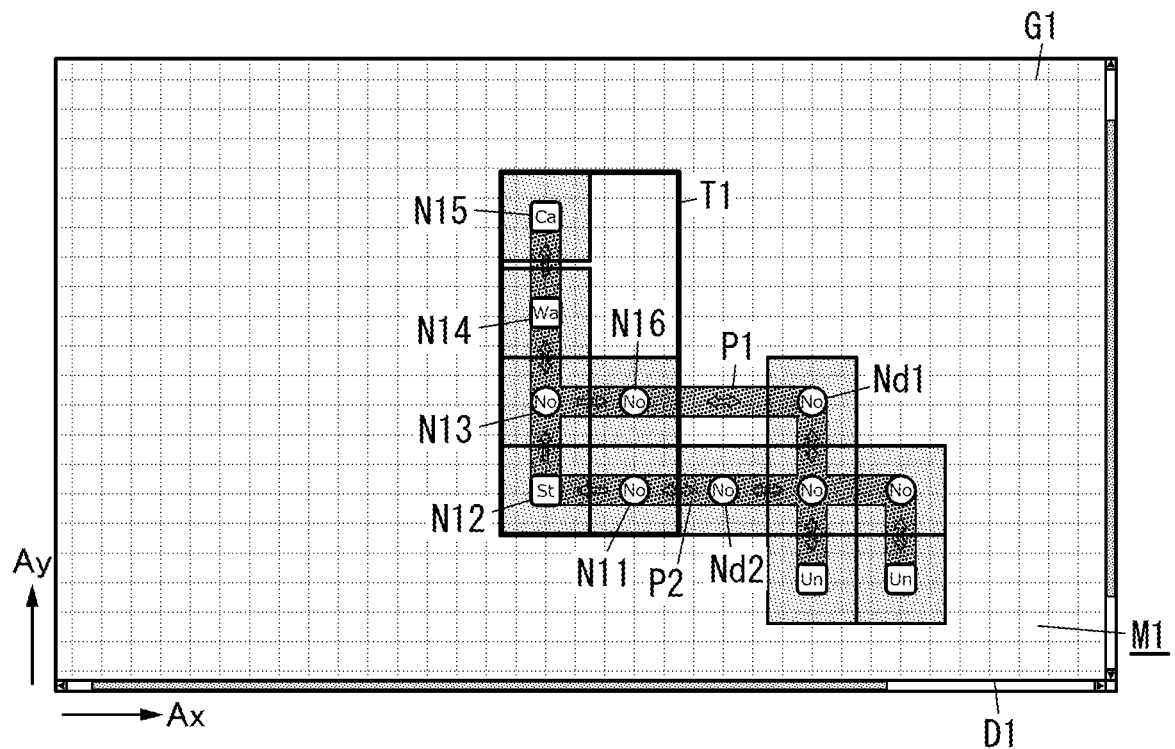
FIG. 13A schematically illustrates another setting screen displayed on the display device of the information terminal in the design support system.
Figure 13B:
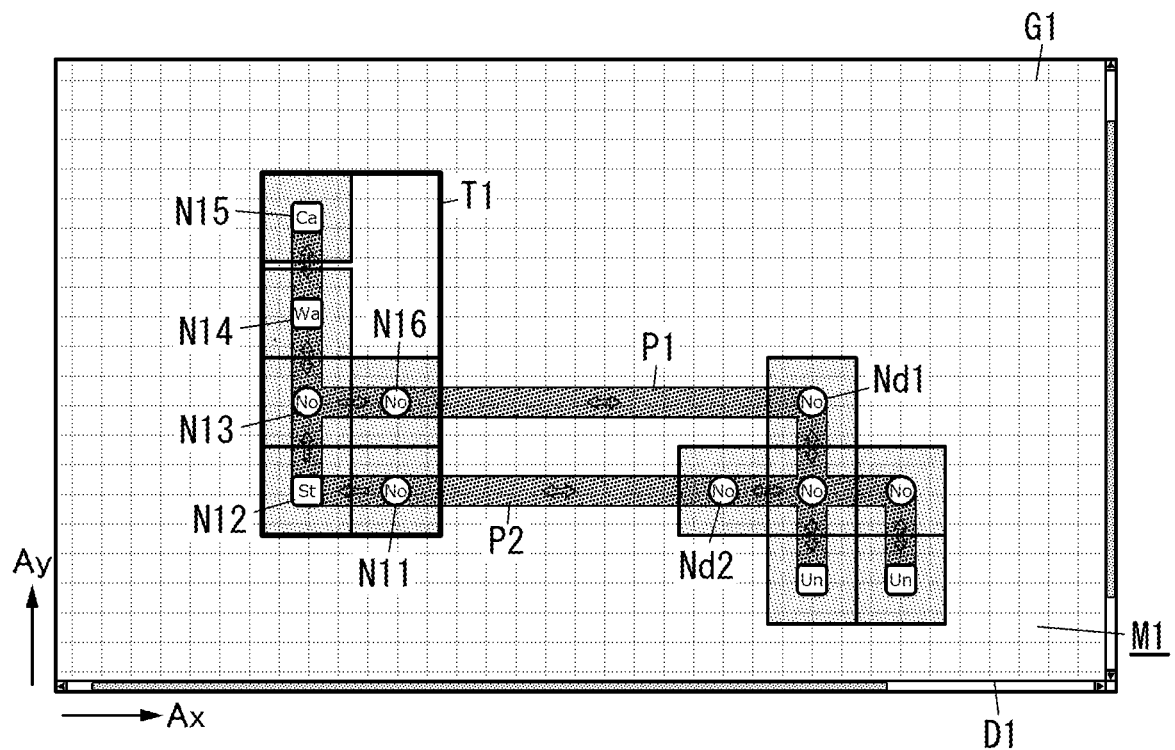
FIG. 13B schematically illustrates another setting screen displayed on the display device of the information terminal in the design support system.

Optionally, each of the area templates T1 and T2 may also be moved straight on an area template basis as shown in FIGS. 13A and 13B. For example, suppose the area template T1 incorporated into the map M1 as shown in FIG. 13A is moved straight to the left. In this case, if the user drags a mouse as an exemplary user interface 63 to the left, while selecting the area template T1 with the mouse, then the plurality of nodes N11-N16 included in the area template T1 moves straight to the left at a time while maintaining their positional relationship as shown in FIG. 13B. Then, the path P1 that connects the node N16 of the area template T1 to the specified node Nd1 and the path P2 that connects the node N11 of the area template T1 to the specified node Nd2 are extended automatically.

As can be seen from the foregoing description, this embodiment allows a plurality of nodes included in an area template to move on the map M1 on the setting screen D1 while maintaining their positional relationship. As used herein, the "movement" includes the rotational movement such as the one shown in FIGS. 12A and 12B and the straight movement such as the one shown in FIGS. 13A and 13B.

The mover control system 1 and design support system 100 according to this embodiment further have the function of aiding the user in selecting an arbitrary area template from a plurality of area templates provided in advance before the design process of a control plan.

Specifically, the plurality of area templates are managed to form a hierarchical structure (tree structure). For example, the hierarchical structure has a structure in which the plurality of area templates are itemized in the order of the area types (area names), area configurations, orientations of the entrance node and exit node, and the number of columns. These items including the area type (area name), area configuration, orientations of the entrance node and exit node, and the number of columns are determined by the user who creates the area template, and are registered as the name of the area template in association with the area template. As used herein, the "area type" indicates the purpose of the area. Examples of the area types include a grasping area, a passing area, a shooting area, a stopping to be aligned area, a charging area, a simple grasping area, and a simple passing area. The area configuration indicates the configuration of that area and may indicate, for example, whether or not there are any standby sections. As used herein, the "number of columns" indicates the number of paths that are provided in parallel with each other for that area. Such a hierarchical structure allows the user to reach his or her desired area template by sequentially making, on an area template selection screen, selections from the item of the highest order (i.e., the area type) while narrowing the ranges one after another. For example, when the grasping area is selected as the area type, only area templates belonging to the grasping area are displayed, and the other types of area templates are hidden, on the selection screen.

In addition, the mover control system 1 and design support system 100 according to this embodiment further have a thumbnail display function as a function of aiding the user in selecting an arbitrary area template. That is to say, displaying thumbnail images on the selection screen for candidate area templates allows the features of those area templates to be displayed as a list of small images. As used herein, the "thumbnail image" refers to image data, of which the file size has been decreased by reducing the resolution of the original image, compressing the original image, or any other technique. This allows the user to visually recognize the features of the area templates and select his or her desired area template more easily, compared with a situation where the names or any other properties of those area templates are displayed as text data. The thumbnail image of an area template is an image representing the appearance of the area template such as the shapes of the nodes and paths and their relative arrangement.

Optionally, such a thumbnail display function may also be adopted to confirm the traveling route. For example, in changing the traveling route for the mover 2, the user may confirm the current traveling route on a confirmation screen. In that case, with the traveling route to be confirmed displayed on the confirmation screen, the user confirms the traveling route visually. While confirming such a traveling route, displaying a thumbnail image on the confirmation screen as for the traveling route to be confirmed allows the feature of the traveling route to be displayed as an image. This allows the user to visually recognize the features of the traveling route and confirm the traveling route more easily, compared with a situation where the name or any other property of the traveling route is displayed as text data. The thumbnail image of the traveling route is an image representing the appearance, including at least the shape and length, of the traveling route. Using such a thumbnail image allows the traveling route loading process to be done in a shorter time, compared with displaying the traveling route in full size on the setting screen D1 including the map M1. In addition, the thumbnail display function also reduces an increase in computational load involved with loading and presenting the traveling route on the screen.

(3.2.7) Restriction Function

Next, restriction functions applicable to generation of a path Pm or a specified node Ndm will be described.

A first restriction function is applied to a situation where α path Pm intersecting with any other path Pm is going to be generated. In such a situation where two paths Pm intersect with each other, unless any node (specified node Ndm) is arranged at the intersection between these two paths Pm, the mover 2 is uncontrollable at the intersection between the two paths Pm, and therefore, a plurality of movers 2 could enter the intersection between the two paths Pm simultaneously. Thus, the design support system 100 according to this embodiment performs first restriction processing when the user is going to generate paths Pm that satisfy a first restriction condition.

As used herein, the first restriction condition is that one path Pm intersect with another path Pm and no nodes (or no specified nodes Ndm) be arranged at the intersection between the former and latter paths Pm. Examples of the first restriction processing include displaying, on the setting screen D1, an error message indicating that the paths Pm intersect with each other and arranging a node (or a specified node Ndm) at the intersection between the two paths Pm. In the former case (of displaying an error message), the error message prompts the user to perform the operation of making correction. In the latter case, correction (node generation) is made automatically. Also, in this embodiment, the first restriction processing includes processing of invalidating generation of any paths Pm that satisfy the first restriction condition. Therefore, when the first restriction processing is performed, no paths Pm satisfying the first restriction condition are generated.

A second restriction function may be the function of restricting overlap between a specified node Ndm and a path Pm. If a specified node Ndm was generated on a path Pm or if a path Pm was generated on a specified node Ndm, then the specified node Ndm and the path Pm could overlap with each other. Such overlap between the specified node Ndm and the path Pm may allow one mover 2 traveling along a traveling route defined by the path Pm to interfere with another mover 2 currently located in a zone Zm corresponding to the specified node Ndm. Thus, the design support system 100 according to this embodiment performs second restriction processing when the user is going to generate a specified node Ndm or a path Pm that satisfies a second restriction condition.

As used herein, the second restriction condition is that a certain specified node Ndm be arranged on any of the paths Pm or that a certain path Pm be arranged on any of the specified nodes Ndm. Examples of the second restriction processing include displaying, on the setting screen D1, an error message indicating that the specified node Ndm and the path Pm overlap with each other. Such an error message prompts the user to perform the operation of making correction. Also, in this embodiment, the second restriction processing includes processing of invalidating generation of any specified node Ndm (or path Pm) that satisfies the second restriction condition. Therefore, when the second restriction processing is performed, no specified nodes Ndm (or paths Pm) satisfying the second restriction condition are generated.

A third restriction function may be the function of restricting generation of one specified node Ndm overlapping with another node (which may be another specified node Ndm, a virtual node Nvm, or an exception node Nem). If the one specified node Ndm overlapped with another node, then a plurality of movers 2 could interfere with each other in the zones Zm corresponding to these nodes. Thus, the design support system 100 according to this embodiment performs third restriction processing when the user is going to generate specified nodes Ndm that satisfy a third restriction condition.

As used herein, the third restriction condition is that a certain specified node Ndm be arranged on any other node. Examples of the third restriction processing include displaying, on the setting screen D1, an error message indicating that the nodes overlap with each other. Such an error message prompts the user to perform the operation of making correction. Also, in this embodiment, the third restriction processing includes processing of invalidating generation of any specified nodes Ndm that satisfy the third restriction condition. Therefore, when the third restriction processing is performed, no specified nodes Ndm satisfying the third restriction condition are generated.

Also, each of the first to third restriction functions is valid even when the location adjustment function is enabled. That is to say, the design support system 100 according to this embodiment has the function of adjusting the location of at least one of a pair of specified nodes Ndm as already described for the "(3.2.3) Location adjustment function" section. Thus, when the path P1 is generated, for example, the location of at least one of a pair of specified nodes Nd1 and Nd2, which will respectively define the starting point and end point of the path P1, is adjusted such that the pair of specified nodes Nd1 and Nd2 are arranged parallel to the first axis Ax. Adjusting the location of at least one of the pair of specified nodes Ndm in this manner allows the location of a path Pm, which will be generated between the pair of specified nodes Ndm, to be adjusted (or corrected) as well. Also, if adjusting the locations of the specified nodes Ndm and the path Pm by the location adjustment function generates any path Pm or specified nodes Ndm that satisfy any of the first to third restriction conditions, any of the first to third restriction processing is performed. For example, if the adjustment of the location of a specified node Ndm by the location adjustment function allows the specified node Ndm to overlap with another node, then the third restriction condition is satisfied, and therefore, the third restriction processing is performed.

As can be seen from the foregoing description, if any path Pm or any of a pair of specified nodes Ndm satisfies a predetermined restriction condition, then the design support system 100 according to this embodiment performs predetermined restriction processing to restrict the generation of the path Pm or any of the pair of specified nodes Ndm. Therefore, when the user is going to generate any specified node Ndm or path Pm that satisfies the restriction condition, the restriction processing may prompt the user to perform the operation of making correction, thus making it easier to avoid the generation of any unwanted path Pm or unwanted specified nodes Ndm.

(3.2.8) Other Functions

The mover control system 1 and design support system 100 according to this embodiment further have the following functions related to the design of a control plan.

Figure 14A:
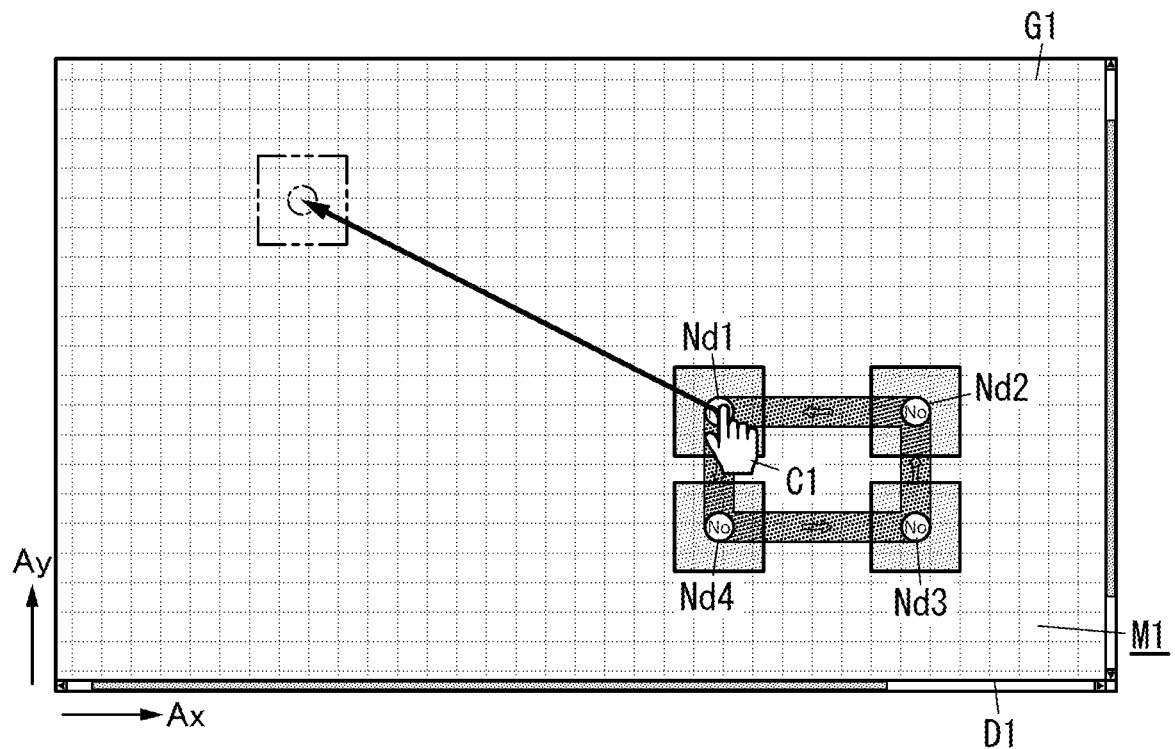
FIG. 14A schematically illustrates another setting screen displayed on the display device of the information terminal in the design support system.
Figure 14B:
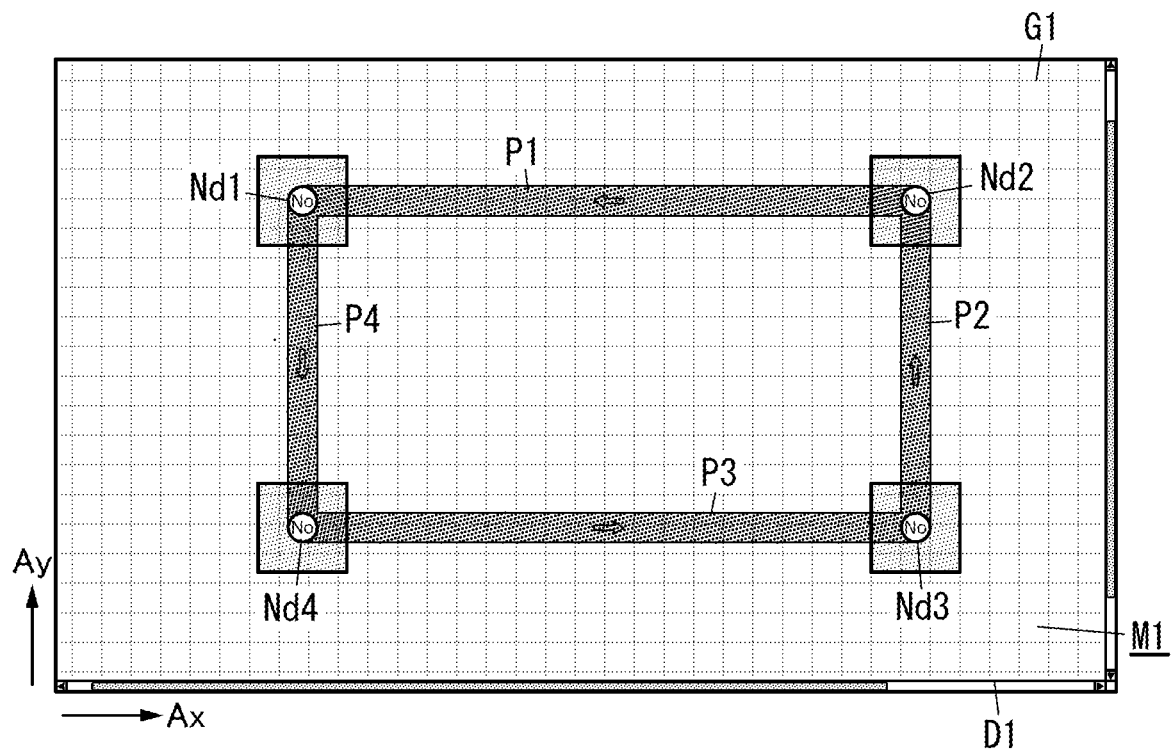
FIG. 14B schematically illustrates another setting screen displayed on the display device of the information terminal in the design support system.

A first one of those other functions enables moving a specified node Ndm, connected to a path Pm, to automatically trigger movement of the path Pm along with the specified node Ndm as shown in FIGS. 14A and 14B. Specifically, the user may move, while selecting one specified node Ndm connected to a path Pm using a mouse as an exemplary user interface 63, a cursor C1 by dragging the mouse. This causes the one specified node Ndm selected to move along with the cursor C1 and also causes the path Pm, connected to the specified node Ndm, to move automatically. For example, selecting a specified node Nd1 out of the specified nodes Nd1-Nd4 and moving the specified node Nd1 toward the upper left corner as shown in FIG. 14A causes the paths P1 and P4 connected to the specified node Nd1 to move along with the specified node Nd1 as shown in FIG. 14B. At this time, the specified node Nd2 connected to the specified node Nd1 through the path P1 and the specified node Nd4 connected to the specified node Nd1 through the path P4 also move along with the specified node Nd1. As a result, the paths P2 and P3 are also extended automatically.

Figure 15A:
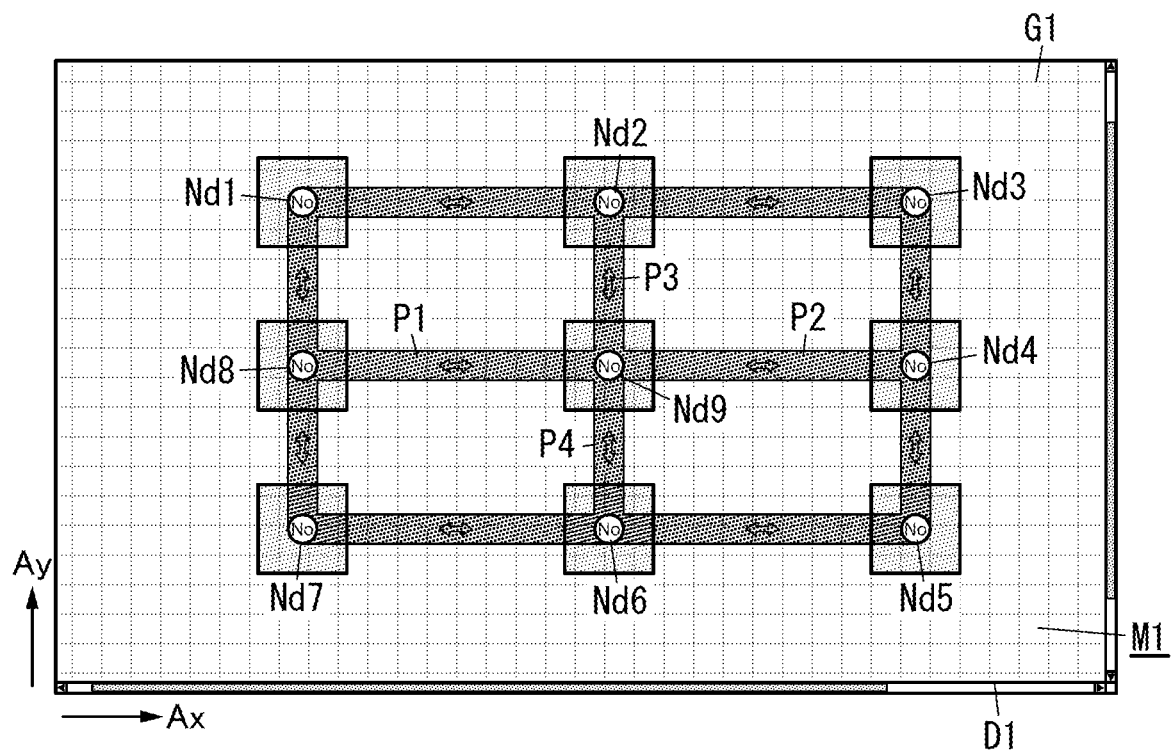
FIG. 15A schematically illustrates another setting screen displayed on the display device of the information terminal in the design support system.
Figure 15B:
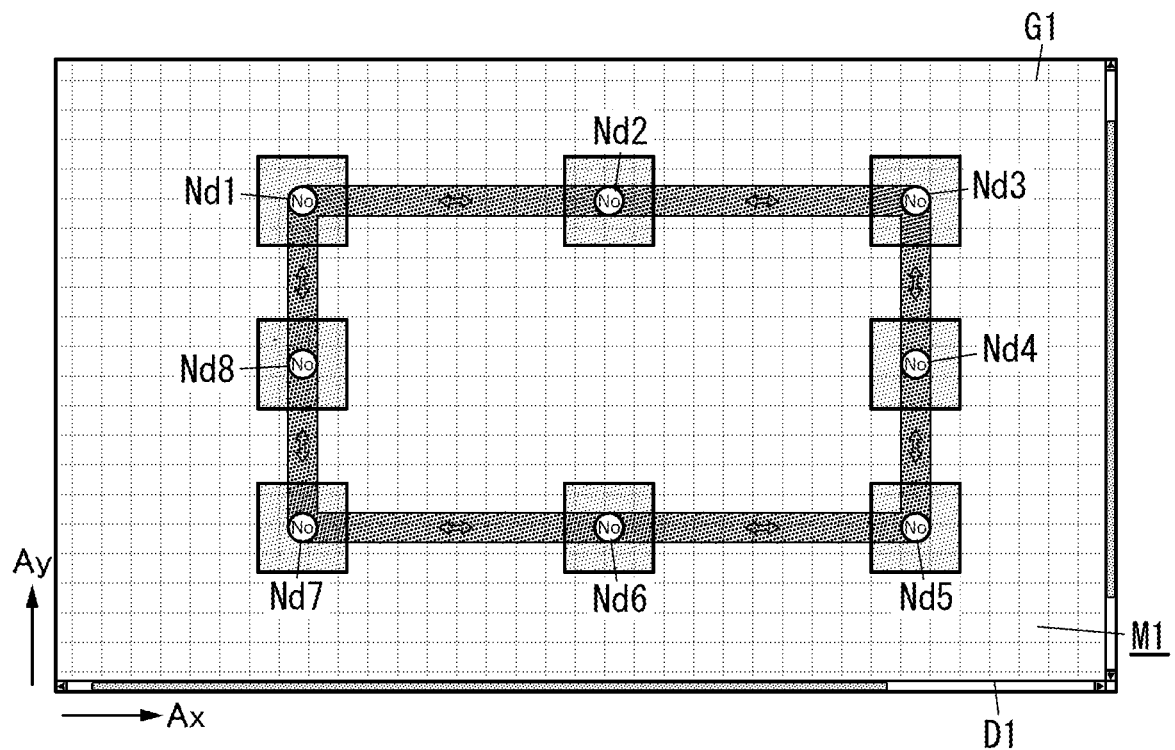
FIG. 15B schematically illustrates another setting screen displayed on the display device of the information terminal in the design support system.

A second one of those other functions enables removing a specified node Ndm, connected to a path Pm, to automatically remove the path Pm along with the specified node Ndm as shown in FIGS. 15A and 15B. Specifically, the user may remove, while selecting one specified node Ndm connected to a path Pm using a mouse as an exemplary user interface 63, the specified node Ndm. This causes the paths Pm, connected to the specified node Ndm, to be removed automatically. For example, removing a specified node Nd9 out of the specified nodes Nd1-Nd9 as shown in FIG. 15A causes the paths P1-P4 connected to the specified node Nd9 to be removed along with the specified node Nd9 as shown in FIG. 15B.

Figure 16A:
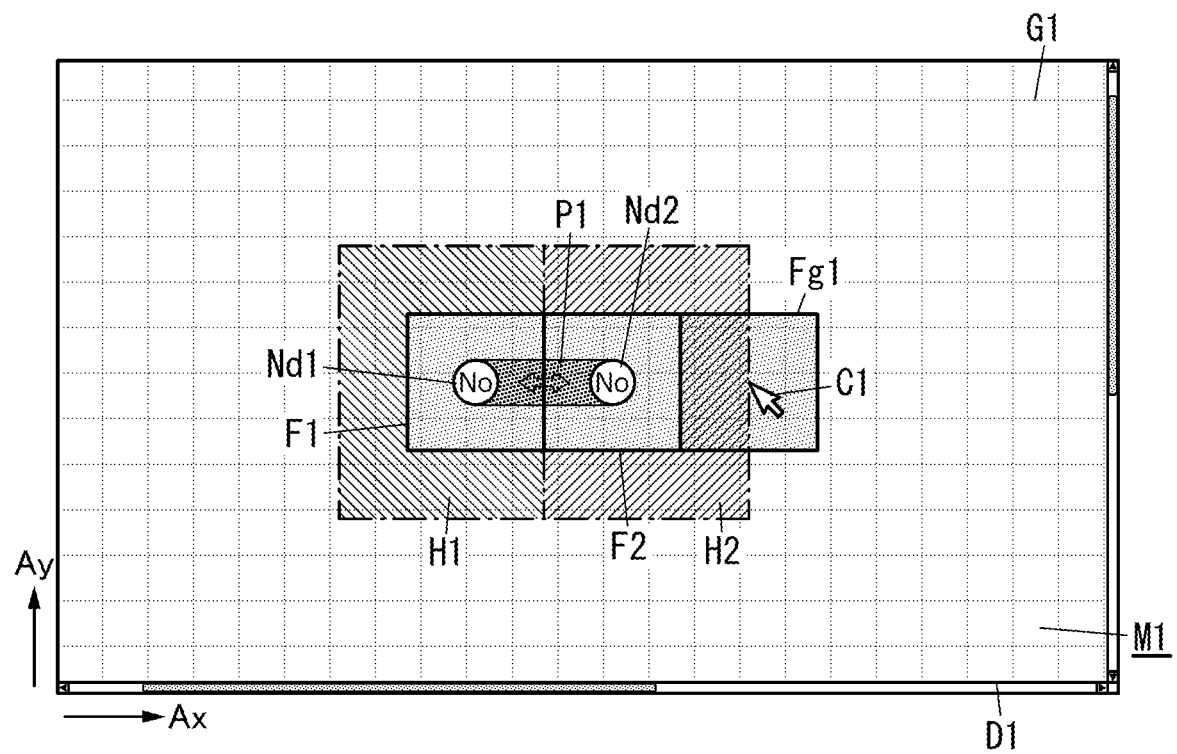
FIG. 16A schematically illustrates another setting screen displayed on the display device of the information terminal in the design support system.
Figure 16B:
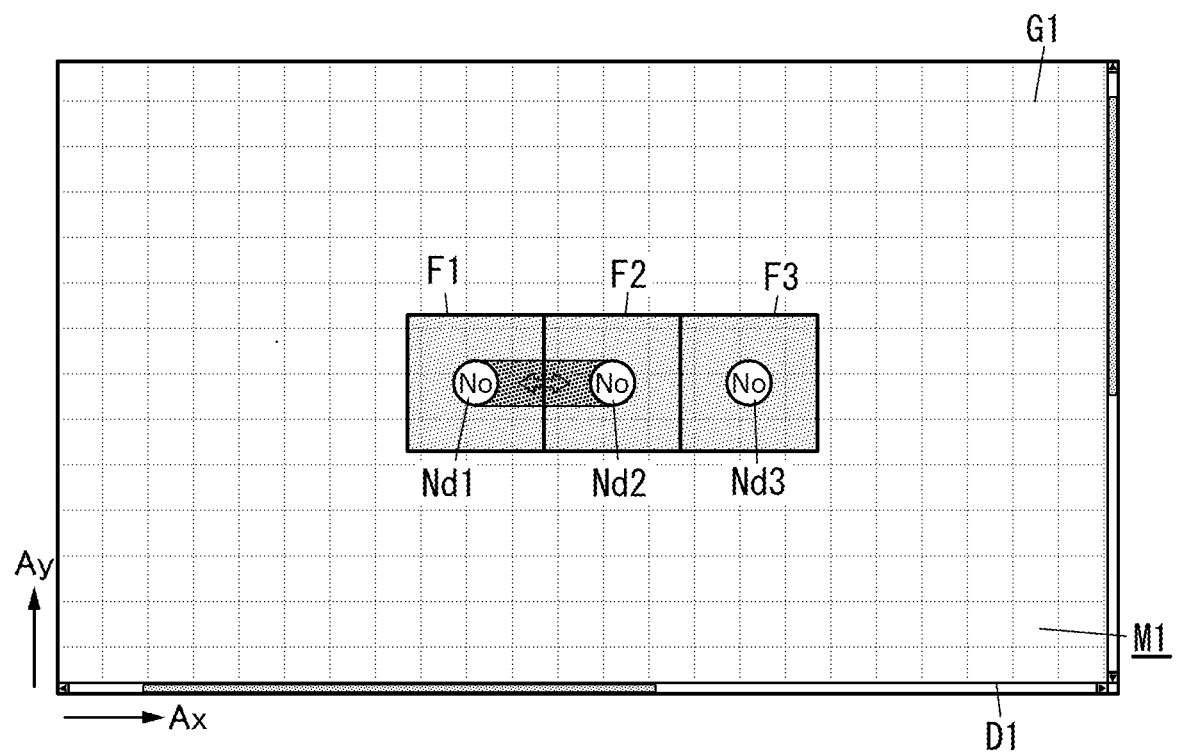
FIG. 16B schematically illustrates another setting screen displayed on the display device of the information terminal in the design support system.

A third one of those other functions enables a guide frame Fg1 to be displayed on the map M1 on the setting screen D1 while a specified node Ndm is being generated as shown in FIGS. 16A and 16B. Specifically, in generating a specified node Ndm, the user moves a cursor C1 by using a mouse as an exemplary user interface 63 to display a guide frame Fg1 according to the location of the cursor C1 as shown in FIG. 16A. Then, the user clicks the mouse with the guide frame Fg1 displayed, thereby generating a specified node Nd3 inside the guide frame Fg1 and turning the guide frame Fg1 into a frame F3 as shown in FIG. 16B.

In this case, the location of the guide frame Fg1 on the map M1 is automatically adjusted according to the location of an adjacent node. Specifically, the location of the guide frame Fg1 is adjusted such that one side of a frame Fm surrounding the adjacent specified node Ndm perfectly superposes on (i.e., perfectly matches) one side of the guide frame Fg1. For example, in the state shown in FIG. 16A, if the guide frame Fg1 is displayed inside an area H1 surrounding a frame F1 that encloses a specified node Nd1, then the guide frame Fg1 is displayed such that one side of the guide frame Fg1 superposes on any of the upper side, left side, or lower side of the frame F1. On the other hand, in the state shown in FIG. 16A, if the guide frame Fg1 is displayed inside an area H2 surrounding a frame F2 that encloses a specified node Nd2, then the guide frame Fg1 is displayed such that one side of the guide frame Fg1 superposes on any of the upper side, right side, or lower side of the frame F2. In the example illustrated in FIG. 16A, the left side of the guide frame Fg1 superposes on the right side of the frame F2.

Figure 17:
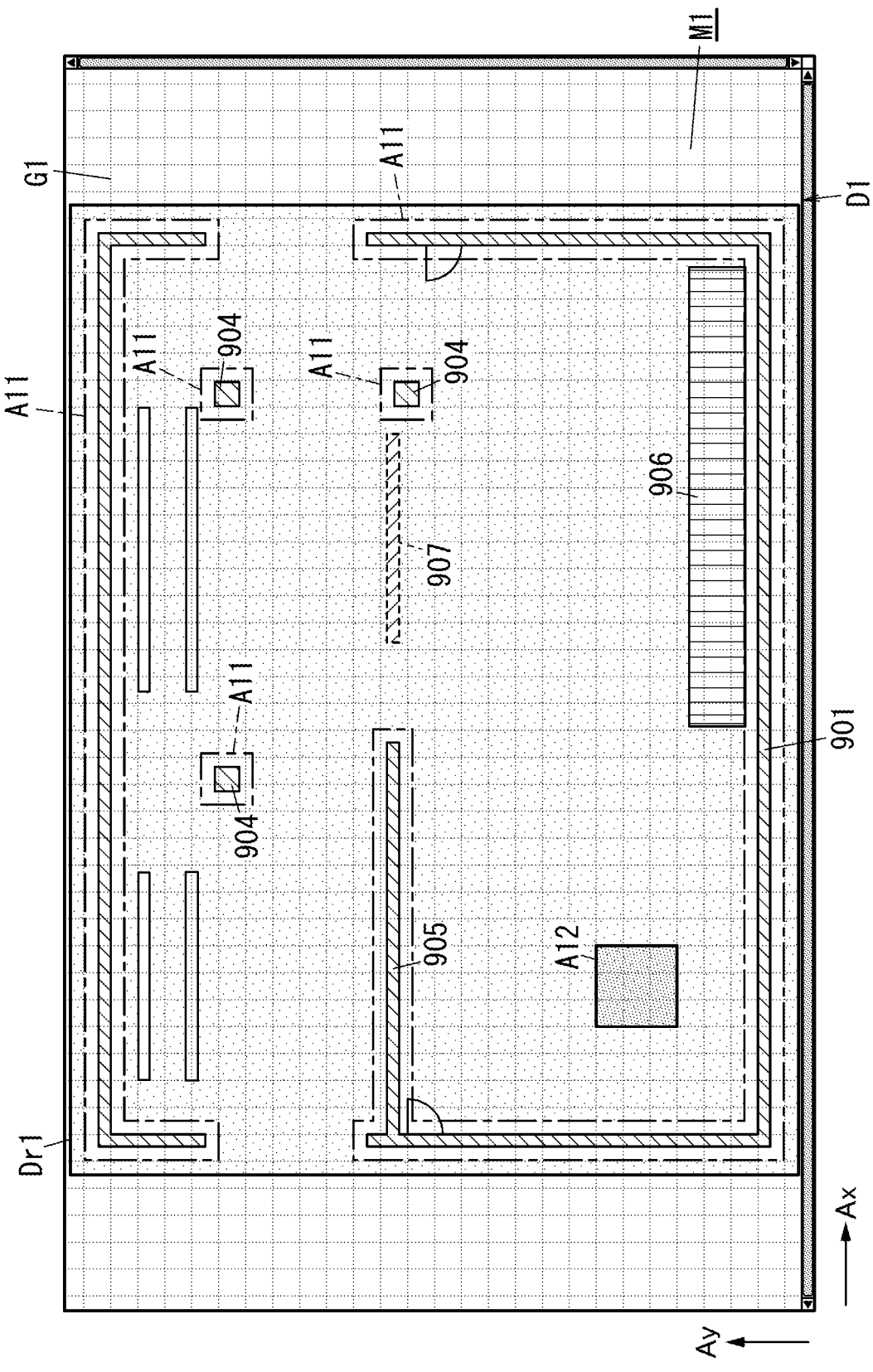
FIG. 17 schematically illustrates another setting screen displayed on the display device of the information terminal in the design support system.

A fourth one of those other functions enables the display controller 38 to display a map drawing Dr1 as a plan view of the predetermined area A1 over, and along with, the map M1 on the setting screen D1 as shown in FIG. 17. In this embodiment, the map M1 is an electronic map corresponding to the predetermined area A1. The map M1 implemented as an electronic map is data represented at a coordinate location (X, Y) with respect to an origin that is set at a predetermined location on the map M1 as described above. The map M1 as an electronic map includes information about the outer walls 901, columns 904, boundary wall 905, and other members of a structure. On the other hand, the map drawing Dr1 is a plan view of the predetermined area A1 and may be either a drawing generated by computer-assisted drafting (CAD), i.e., a CAD drawing, or a manually drafted drawing, for example. The map drawing Dr1 describes fittings, furniture, and other types of equipment arranged in the predetermined area A1 such as a fire door, shelves, and material handling devices. The map drawing Dr1 is just image data (or drawing data), and therefore, no coordinate locations (X, Y) are present in the map drawing Dr1.

When loaded with such a map drawing Dr1, the design support system 100 according to this embodiment allows the map drawing Dr1 to be displayed over, and along with, the map M1 on the setting screen D1. Specifically, the display controller 38 superposes a semi-transparent map drawing Dr1 over the map M1, thereby displaying the map drawing Dr1 along with the map M1 on the setting screen D1. In this case, the relative location, angle (i.e., the angle of rotation), and size (dimensions) of the map drawing Dr1 with respect to the map M1 may be adjusted as appropriate by the user.

The user is allowed to generate, on the setting screen D1, the specified nodes Ndm, the paths Pm, and other objects on the map M1 by reference to the map drawing Dr1. This allows the user to design a control plan for controlling the mover 2 while taking, into account, the locations of fittings, furniture, and other types of equipment, which are located within the predetermined area A1 but not shown on the map M1, thus improving the efficiency of design of the control plan.

Also, the display controller 38 needs to display the map drawing Dr1 over, and along with, the map M1, and therefore, at least one of the map M1 or the map drawing Dr1 may be a semi-transparent one. That is to say, the display controller 38 may display the map M1 along with the map drawing Dr1 on the setting screen D1 by displaying a semi-transparent map M1 over the map drawing Dr1, for example.

A fifth one of those other functions enables the design support system 100 according to this embodiment to recognize the structure information included in the map M1. That is to say, the map M1 implemented as an electronic map includes information about the outer walls 901, columns 904, boundary walls 905, and other structural elements as described above. The "structure information" as used herein refers to information, included in the map M1, about the outer walls 901, columns 904, boundary walls 905, and other structural elements. The structure information includes information indicating at least the locations of the structural elements on the map M1. In other words, the map M1 allows the user to determine exactly where in the predetermined area A1 those structural elements (including the outer walls 901, columns 904, and boundary walls 905) are located. Referring to this structure information allows the design support system 100 to automatically recognize the structural elements included in the map M1. For instance, in the example shown in FIG. 17, the design support system 100 recognizes the outer walls 901, columns 904, boundary walls 905, and others as respective structural elements. On the map M1, the structure information is given particular hatching or a particular color. Thus, in performing image processing on the map M1, the design support system 100 extracts structure information to which the particular hatching or particular color is given.

A sixth one of those other functions enables the design support system 100 according to this embodiment to set, based on the information about the locations of the structural elements on the map M1, restricted areas A11, to which access of the mover 2 is restricted, on the map M1. In this embodiment, the restricted areas A11 are set in the areas where the structural elements (including the outer walls 901, columns 904, and boundary walls 905) recognized on the map M1 are located and areas located within a predetermined distance (of 30 cm, for example) from the structural elements. This allows the design support system 100 to automatically recognize the structure information included in the map M1 and automatically generate the restricted areas A11 on the map M1 based on the structure information thus recognized. Therefore, on the setting screen D1, generation of specified nodes Ndm, paths Pm, and other objects is restricted to prevent the mover 2 from entering the restricted areas A11 for the structural elements and surrounding areas. That is to say, in the restricted areas A11, generation of the specified nodes Ndm, paths Pm, and other objects is restricted (or prohibited).

In addition, in some cases, the access of the mover 2 is suitably restricted to not only those restricted areas A11 that are generated automatically based on the information about the locations of those structural elements but also areas with level differences and areas confined to humans. Therefore, the design support system 100 suitably has the function of manually setting restricted areas A11 in accordance with the user's command instead of, or in addition to, the function of automatically generating the restricted areas A11 based on the information about the locations of those structural elements on the map M1. Specifically, the user specifies an arbitrary area on the map M1 using a mouse as an exemplary user interface 63 to generate the restricted area A11 in that arbitrary area. This allows the user to manually set the restricted area A11 in any arbitrary range on the map M1. Thus, setting the additional restricted areas A11 in those areas with level differences and areas confined to humans within the predetermined area A1 allows generation of specified nodes Ndm, paths Pm, and other objects to be restricted (or prohibited).

A seventh one of those other functions enables the mover control system 1 and design support system 100 to instruct the mover 2 to perform a particular type of operation while passing through an openable/closable shutter 907 (see FIG. 17) such as a fire shutter (fire door). In this embodiment, the map M1 as an electronic map includes not only information about those structural elements such as the outer walls 901, columns 904, and boundary walls 905 but also information about the shutter 907 as another structural element. Therefore, the "control types" for respective nodes, which are among various attributes of the respective nodes, include "shutter" related to the control of the mover 2 passing through the shutter 907. That is to say, the node generator 32 may generate a shutter node, of which the attribute specified is "shutter." The mover control system 1 controls the mover 2 such that the mover 2 decelerates while passing through the shutter node and stops temporarily right after having passed through the shutter node. Generating the shutter node (as a type of specified node Ndm) at a location corresponding to the shutter 907 allows the mover control system 1 to control the mover 2 such that the mover 2 decelerates while passing through the shutter 907 and stops temporarily after having passed through the shutter 907. This reduces the chances of the mover 2 that has just passed through the shutter 907 colliding against a human or any other object when they meet each other unexpectedly, for example.

The design support system 100 according to this embodiment also automatically recognizes information about the shutter 907 as another piece of structure information included in the map M1. When recognizing information about the shutter 907 as another piece of structure information included in the map M1, the node generator 32 automatically generates, at a location corresponding to the shutter 907, a node of which the attribute is "shutter" (i.e., generates a shutter node). This allows the user to make the mover 2 perform a particular type of operation while passing through the shutter 907 even without generating a shutter node (as a type of specified node Ndm) by him- or herself by specifying the location where the shutter 907 is arranged.

An eighth one of those other functions enables the design support system 100 according to this embodiment to set an operation regulated area A12, where particular types of operations of the mover 2 are regulated (or prohibited), on the map M1. As used herein, the operation regulated area A12 is an area, to which the access of the mover 2 is permitted unlike the restricted area A11 but where only particular types of operations of the mover 2 are prohibited. Examples of the particular types of operations prohibited in the operation regulated area A12 include turning, reversing, stopping, and grasping (including grasping or loading the burden 92). For example, suppose a situation where the particular type of operation is "turning" and the mover 2 enters a working area, corresponding to the operation regulated area A12, of the predetermined area A1 from an azimuth angle of zero degrees, unloads the burden 92 within the working area, and then leaves the working area from an azimuth angle of zero degrees. In that case, as the operation of the mover 2 in the working area, an alternative operation such as reversing may be adopted as a replacement for turning. This allows the mover 2 to enter, even when there is not sufficient space left in the working area for the mover 2 to make a turn, for example, the working area from an azimuth angle of zero degrees and then leave the working area from the azimuth angle of zero degrees.

Such an operation regulated area A12 is basically set in accordance with the user's command. Specifically, the user specifies an arbitrary area on the map M1 using a mouse as an exemplary user interface 63 and generates the operation regulated area A12 in that arbitrary area. This allows the user to manually set the operation regulated area A12 within an arbitrary range on the map M1. The particular types of operations regulated in the operation regulated area A12 are also determined in accordance with the user's command. For example, the user may operate the user interface 63 to have a pull-down menu displayed on the setting screen D1 and may select particular types of operations on the pull-down menu. The design support system 100 suitably has the function of automatically generating the operation regulated area A12 based on information about the locations of structural elements on the map M1 either in addition to, or instead of, the function of manually setting the operation regulated area A12 on the map M1 in accordance with the user's command. This function allows the operation regulated area A12, as well as the restricted area A11, to be generated automatically.

(3.3) Flowchart

Figure 18:
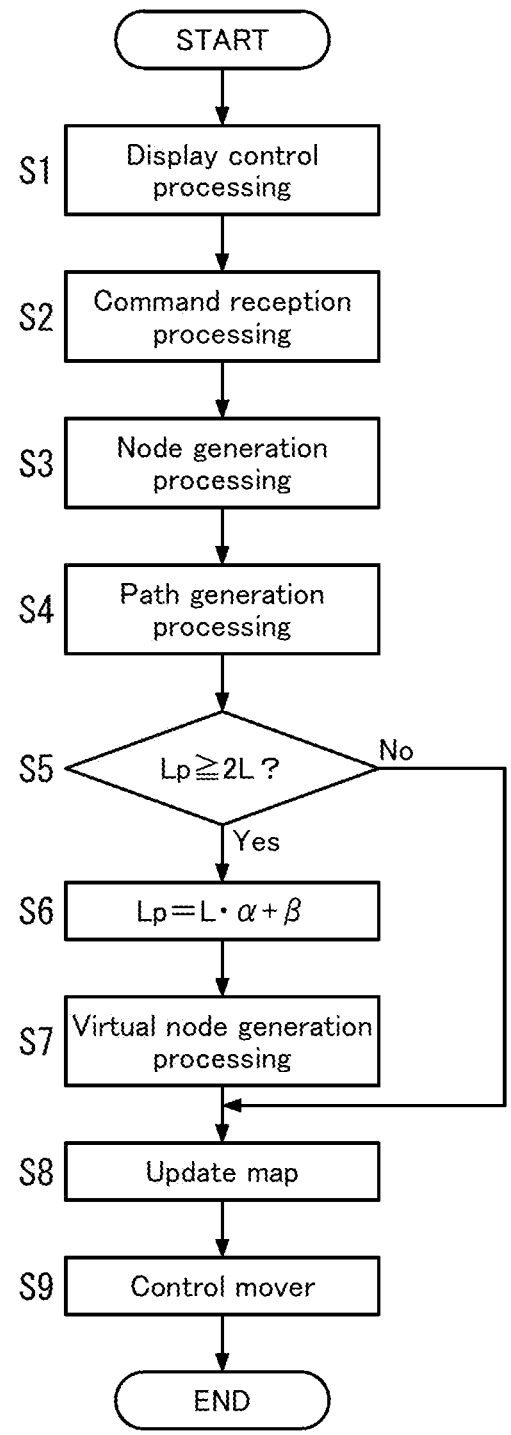
FIG. 18 is a flowchart showing the procedure of operations of the mover control system and design support system.

FIG. 18 is a flowchart briefly summarizing the operations of the mover control system 1 and design support system 100 described above. In other words, the flow of a mover control method corresponding to the operation of the mover control system 1 and the flow of a design support method corresponding to the operation of the design support system 100 are schematically represented by the flowchart shown in FIG. 18.

Specifically, according to the method of this embodiment, first of all, a setting screen D1 including a map M1 corresponding to a predetermined area A1 is displayed (in S1 as display control processing). In this embodiment, the display control processing (S1) is performed by a processor of the server device 3 and the setting screen D1 is displayed on the display device 62 of the information terminal 6.

Next, according to the method of this embodiment, at least a user's command of designating a pair of specified locations on the map M1 on the setting screen D1 is received (in S2 as command reception processing). That is to say, in this embodiment, the command reception processing (S2) is performed by the user interface 63 of the information terminal 6.

Subsequently, according to the method of this embodiment, in accordance with the user's command received in the command reception processing, a pair of specified nodes Ndm where the mover 2 is controllable are generated at a pair of specified locations on the map M1 (in S3 as node generation processing). In this case, since any arbitrary locations on the map M1 may be designated as specified locations during the command reception processing, the pair of specified nodes Ndm are generated at arbitrary locations on the map M1. In this embodiment, the node generation processing (S3) is performed by the processor of the server device 3. That is to say, the user performing the operation of designating, using the information terminal 6, any arbitrary locations on the map M1 as the specified locations allows the pair of specified nodes Ndm to be generated on the map M1 by the server device 3.

Thereafter, according to the method of this embodiment, a path Pm is generated between the pair of specified nodes Ndm generated in the node generation processing (in S4 as path generation processing). In this embodiment, the path generation processing (S4) is performed by the processor of the server device 3. That is to say, the user performing the operation of generating, using the information terminal 6, the path Pm between the pair of specified nodes Ndm on the map M1 allows the path Pm to be generated on the map M1. In other words, strictly speaking, command reception processing of receiving at least the user's command of generating the path Pm between the pair of specified nodes Ndm on the map M1 on the setting screen D1 is performed between the node generation processing (S3) and the path generation processing (S4).

At this time, according to the method of this embodiment, a determination is made whether the interval between the pair of specified nodes Ndm, i.e., the length of the path Pm (the path length Lp), is equal to or greater than an upper limit value 2L (in Step S5). If the path length Lp is equal to or greater than the upper limit value 2L (i.e., if the answer is YES in Step S5), then virtual node generation processing (S7) of generating at least one virtual node Nvm between the pair of specified nodes Ndm on the map M1 separately from the pair of specified nodes Ndm is performed.

In this embodiment, before the virtual node generation processing (S7) is performed, the path length Lp is divided by a lower limit value L to obtain a quotient $\alpha$ (where $\alpha$ is a natural number) and a remainder $\beta$ (where $\beta$ is also a natural number) (in Step S6). In this case, a number smaller by one than the quotient $\alpha$ is the number of virtual nodes Nvm. Furthermore, the remainder $\beta$ is prorated by the quotient $\alpha$, thereby determining the locations of the respective virtual nodes Nvm. The virtual node generation processing (S7) includes generating at least one virtual node Nvm between the pair of specified nodes Ndm, i.e., on the path Pm, in accordance with a numerical number and locations of the virtual nodes Nvm thus determined.

On the other hand, if the path length Lp turns out to be less than the upper limit value 2L (i.e., if the answer is NO in Step S5), then the processing step S8 is performed with the processing steps S6 and S7 skipped.

Thereafter, according to the method of this embodiment, the map M1 is updated so as to reflect the nodes (including the specified nodes Ndm and the virtual nodes Nvm) and path Pm thus generated (in S8). This series of processing steps S2-S8 are performed repeatedly as appropriate.

Thereafter, according to the method of this embodiment, the mover 2 traveling within the predetermined area A1 is controlled in accordance with the finally update map M1 (in Step S9). In this processing step, the mover 2 is made to travel along the traveling route R10 corresponding to the path Pm within the predetermined area A1.

Note that FIG. 18 just schematically shows an exemplary operation of the mover control system 1 and design support system 100 according to this embodiment. Therefore, some additional processing steps may performed, and/or some of the processing steps shown in FIG. 18 may be changed, omitted, or have their order changed, whenever it is appropriate.

(4) Variations

The first embodiment described above is only one of various embodiments of the present disclosure, and may be readily modified, changed, replaced, or combined with any other embodiments, depending on a design choice or any other factor, without departing from a true spirit and scope of the present disclosure.

Also, the same function as that of the mover control system 1 according to the first embodiment may be implemented as a mover control method, a computer program, or a non-transitory storage medium that stores the computer program thereon, for example. A mover control method according to an aspect is designed to control a mover 2 traveling within a predetermined area A1. The mover control method includes node generation processing and path generation processing. The node generation processing includes generating a pair of specified nodes Ndm at respective arbitrary locations on a map M1 corresponding to the predetermined area A1, where the pair of specified nodes Ndm are nodes where the mover 2 is controllable (see S3 shown in FIG. 18). The path generation processing includes generating a path Pm between the pair of specified nodes Ndm (see S4 shown in FIG. 18). The mover control method includes making the mover 2 travel along a traveling route R10 corresponding to the path Pm within the predetermined area A1. A (computer) program according to another aspect is designed to make a computer system execute the mover control method described above.

Alternatively, the same function as that of the design support system 100 according to the first embodiment may also be implemented as a design support method, a computer program, or a non-transitory storage medium that stores the computer program thereon, for example. A design support method according to an aspect is a method for supporting the design of a control plan for controlling a mover 2 traveling within a predetermined area A1. The design support method includes display control processing, command reception processing, node generation processing, and virtual node generation processing. The display control processing includes displaying a setting screen D1 including a map M1 corresponding to a predetermined area A1 (see S1 shown in FIG. 18). The command reception processing includes receiving at least a user's command of designating a pair of specified locations on the map M1 on the setting screen D1 (see S2 shown in FIG. 18). The node generation processing includes generating, in accordance with the user's command, a pair of specified nodes Ndm, where the mover 2 is controllable, at the pair of specified locations on the map M1 (see S3 shown in FIG. 18). The virtual node generation processing includes generating, between the pair of specified nodes Ndm on the map M1, at least one virtual node Nvm separately from the pair of specified nodes Ndm (see S7 shown in FIG. 18). A (computer) program according to another aspect is designed to make a computer system execute the design support method described above.

Next, variations of the first embodiment described above will be enumerated one after another. Note that any of the variations to be described below may be combined as appropriate.

The mover control system 1 and design support system 100 according to the present disclosure each include a computer system. In that case, the computer system may include, as principal hardware components, a processor and a memory. The functions of the mover control system 1 or the design support system 100 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (VLSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips without limitation. Those multiple chips may be integrated together in a single device or distributed in multiple devices without limitation.

Also, in the embodiment described above, the plurality of constituent elements (or the functions) of the mover control system 1 or the design support system 100 are integrated together in a single housing. However, this is only an example and should not be construed as limiting. Alternatively, those constituent elements (or functions) of the mover control system 1 or the design support system 100 may be distributed in multiple different housings. Still alternatively, at least some functions of the mover control system 1 or the design support system 100 may be implemented as a cloud computing system as well.

Conversely, at least some functions, distributed in multiple devices, of the mover control system 1 or design support system 100 according to the first embodiment may be aggregated together in a single housing. For example, some functions distributed in the server device 3 and the client terminal 4 may be aggregated together in a single housing. Also, some functions distributed in the server device 3 and the information terminal 6 may be aggregated together in a single housing.

Also, in the present disclosure, expressions with an adverb "generally" are sometimes used as in the phrases such as "generally parallel" and "generally perpendicular." For example, "generally parallel" refers to the state of being substantially "parallel," which naturally covers a situation where something is exactly parallel to something else but may also cover a situation where the former is substantially parallel to the latter with a tolerance of about a few percent. The same statement is applied to other expressions with "generally."

Furthermore, in the present disclosure, if one of two values being compared with each other is "equal to or greater than" the other, this phrase may herein cover both a situation where these two values are equal to each other and a situation where one of the two values is greater than the other. However, this should not be construed as limiting. Alternatively, the phrase "equal to or greater than" may also be a synonym of the phrase "greater than" that covers only a situation where one of the two values is over the other. That is to say, it is arbitrarily changeable, depending on selection of a reference value or any preset value, whether or not the phrase "equal to or greater than" covers the situation where the two values are equal to each other. Therefore, from a technical spot of view, there is no difference between the phrase "equal to or greater than" and the phrase "greater than." Similarly, the phrase "less than" may be a synonym of the phrase "equal to or less than" as well.

Optionally, the server device 3 may be disposed within the predetermined area A1. Furthermore, the communications terminals 5 are not constituent elements indispensable to the mover control system 1 but may be omitted as appropriate. In the latter case, the server device 3 may communicate with the movers 2 directly, not via any of the communications terminals 5.

Furthermore, in the first embodiment described above, the reservation unit 34 increases the reserved number as the radio field strength decreases in the wireless communication. However, this is only an example and should not be construed as limiting. Alternatively, the reservation unit 34 may also decrease the reserved number as the radio field strength decreases in the wireless communication. Furthermore, the status of wireless communication with the communications device (second communications device 41) of the communications terminals 5 does not have to be represented by the radio field strength. Alternatively, the status of the wireless communication may also be evaluated by the error rate in the wireless communication with the communications device (second communications device 41) of the communications terminal 5 or the modulation method thereof.

Furthermore, in the first embodiment described above, the virtual nodes Nvm generated by the virtual node generator 35 are supposed to be not displayed on the setting screen D1. However, this is only an example and should not be construed as limiting. Alternatively, the virtual nodes Nvm may also be displayed on the setting screen D1.

Furthermore, in the first embodiment described above, the location adjuster 37 adjusts the location of the specified node Ndm defining the end point of the path Pm, out of the pair of specified nodes Ndm to be the starting point and end point of the path Pm. However, this is only an example and should not be construed as limiting. Alternatively, the location adjuster 37 may also adjust the location of the specified node Ndm defining the starting point of the path Pm, out of the pair of specified nodes Ndm to be the starting point and end point of the path Pm. Still alternatively, the location adjuster 37 may also adjust the respective locations of the pair of specified nodes Ndm to be the starting point and end point of the path Pm.

Furthermore, the burden 92 to be carried by the mover 2 does not have to be a palette such as a roll box palette. In particular, if the mover 2 is configured to mount the burden 92 on the body 21 such that the burden 92 is lifted by the body 21 that has slipped into the gap under the burden 92 as already described for the first embodiment, the burden 92 is suitably a mounting device or a related device thereof. As used herein, the "mounting device" is a device for mounting parts (electronic parts) onto a board, and may be used to mount parts by surface mount technology (SMT) or insertion mount technology (IMT). Examples of devices related to the mounting devices include a parts feeder for feeding parts to the mounting device.

Second Embodiment

A mover control system 1 according to a second exemplary embodiment does not have the function of generating a virtual node Nvm, which is a major difference from the mover control system 1 according to the first embodiment. In the following description, any constituent element of this second embodiment, having the same function as a counterpart of the first embodiment described above, will be designated by the same reference numeral as that counterpart's, and a detailed description thereof will be omitted herein.

That is to say, the virtual node generator 35 (see FIG. 2) is omitted from the mover control system 1 according to this embodiment. Therefore, the upper limit value does not have to be set for the interval between the pair of specified nodes Ndm. In the mover control system 1 according to this embodiment, the node generator 32 is also allowed to generate the specified nodes Ndm at arbitrary locations on the map M1.

The configuration described for this second embodiment may be adopted as appropriate in combination with various configurations described for the first embodiment (and its variations).

Third Embodiment

In a design support system 100 according to a third exemplary embodiment, the locations on the map M1, where the pair of specified nodes Ndm may be generated, are limited by the grid lines G1, which is a major difference from the design support system 100 according to the first embodiment. In the following description, any constituent element of this third embodiment, having the same function as a counterpart of the first embodiment described above, will be designated by the same reference numeral as that counterpart's, and a detailed description thereof will be omitted herein.

That is to say, the design support system 100 according to this embodiment is unable to generate a pair of specified nodes Ndm at arbitrary locations on the map M1, and therefore, the locations where the pair of specified nodes Ndm may be generated are limited by grid lines G1 included in the map M1. Specifically, a specified node Ndm may be generated only at the center of any of a plurality of squares that are arranged in a grid pattern, which is formed by dividing the map M1 by the grid lines G1 into those squares. Therefore, the design support system 100 according to this embodiment requires the user to select, in designating a specified location on the map M1 on the setting screen D1, any one of the plurality of squares and set the specified location at the center of the selected square. This allows the specified node Ndm to be generated at the center of the selected square.

Note that even when the configuration of this embodiment is adopted, the virtual node generator 35 also generates at least one virtual node Nvm between the pair of specified nodes Ndm on the map M1. The virtual nodes Nvm may or may not be generated at only limited locations on the map M1 as in the specified nodes Ndm.

The configuration described for this third embodiment may be adopted as appropriate in combination with various configurations described for the first embodiment (and its variations).

Fourth Embodiment (1) Overview of Fourth Embodiment

Figure 19:
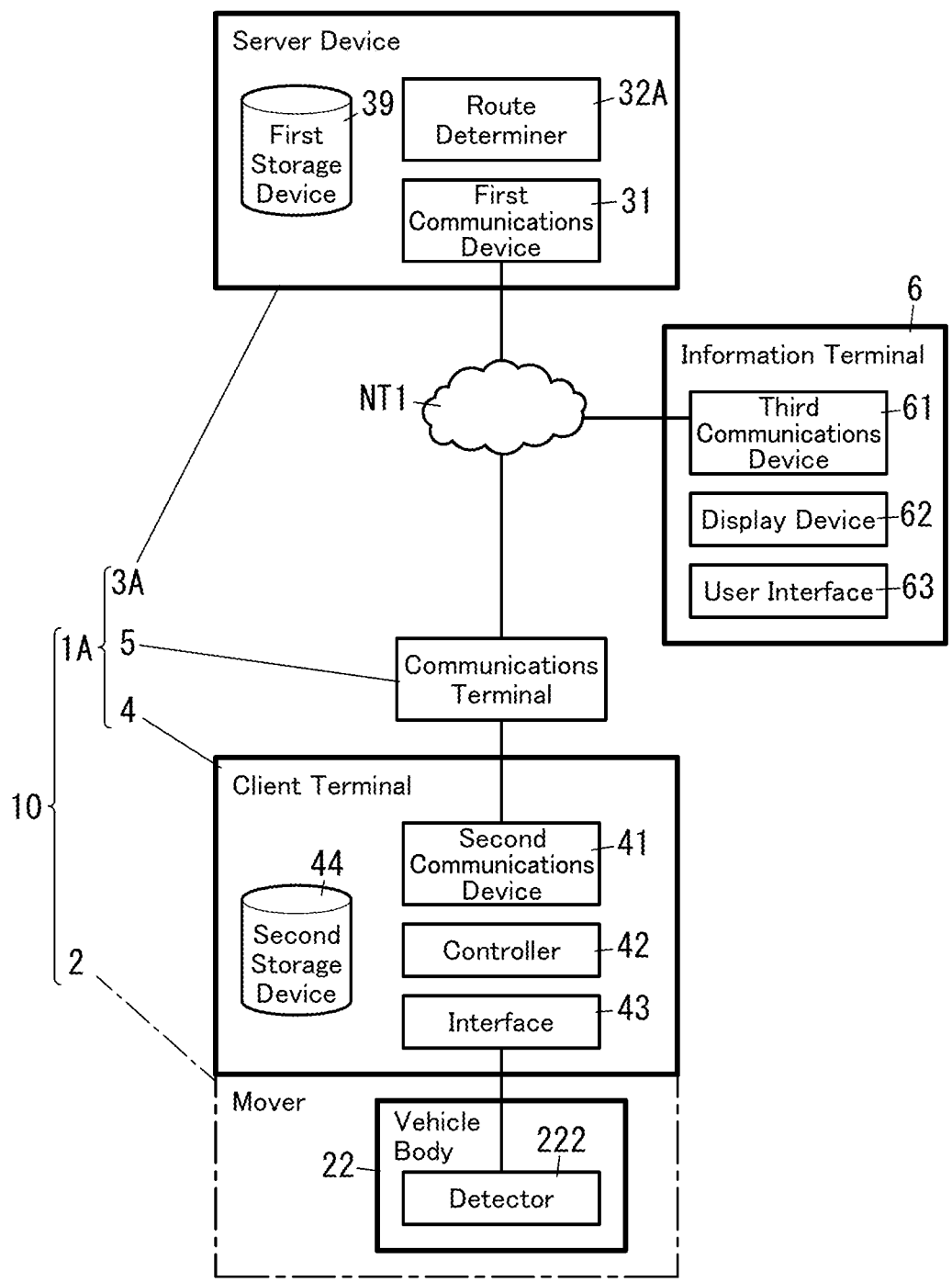
FIG. 19 is a block diagram illustrating a schematic configuration for a mover control system and mover system according to a fourth embodiment.

A mover control system 1A according to a fourth exemplary embodiment includes a route determiner 32A and a controller 42 as shown in FIG. 19. In the following description, any constituent element of this fourth embodiment, having the same function as a counterpart of the first embodiment described above, will be designated by the same reference numeral as that counterpart's, and a detailed description thereof will be omitted herein.

Figure 20:
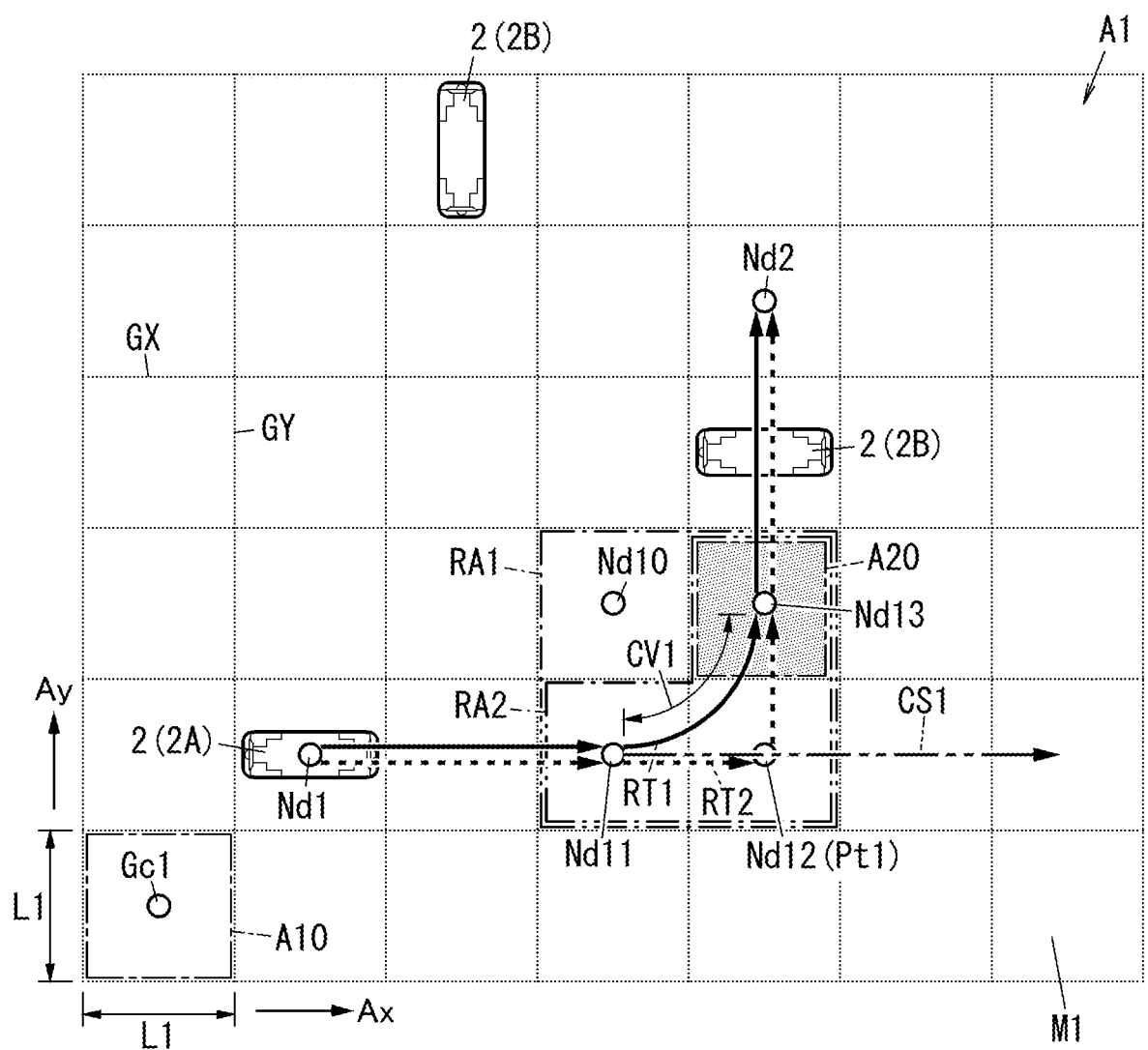
FIG. 20 is a schematic representation showing a concept of the operation of the mover control system by illustrating, as a top view of a predetermined area, how the mover travels within the predetermined area.

The route determiner 32A determines a traveling route, along which the mover 2 traveling within the predetermined area A1 should move from a first spot (e.g., a spot corresponding to a node Nd1) to a second spot (e.g., a spot corresponding to a node Nd2), and instructs the mover 2 to travel along the traveling route, as shown in FIG. 20. These nodes Nd1 and Nd2 are spots on the map M1 corresponding to the predetermined area A1, and will be described in detail later.

The controller 42 controls the mover 2 to travel along the traveling route instructed by the route determiner 32A.

When finding the second spot (i.e., a spot corresponding to the node Nd2) not located on a straight course CS1, the route determiner 32A determines, in accordance with a predetermined decision condition, the traveling route to be either a first traveling route RT1 (see FIG. 20) or a second traveling route RT2 (see FIG. 20). The straight course CS1 is a course that the mover 2 takes to go straight from the first spot (i.e., a spot corresponding to the node Nd1). The first traveling route RT1 requires the mover 2 to change its traveling direction by traveling along a curve section CV1 that is set halfway through the first traveling route RT1 leading from the first spot (i.e., the spot corresponding to the node Nd1) to the second spot (i.e., the spot corresponding to the node Nd2). The second traveling route RT2 requires the mover 2 to change its traveling direction by turning, while moving from the first spot (i.e., the spot corresponding to the node Nd1) to the second spot (i.e., the spot corresponding to the node Nd2), at a turning point Pt1 (i.e., a spot corresponding to the node Nd12) that is set halfway through the straight course CS1.

In the mover control system 1A according to this embodiment, the route determiner 32A divides the predetermined area A1 into a plurality of subareas A10 by a plurality of grid lines GX and GY. The plurality of grid lines GX are arranged in the predetermined area A1 at generally regular intervals so as to be generally parallel to the X-axis (i.e., the first axis Ax). The plurality of grid lines GY are arranged in the predetermined area A1 at generally regular intervals so as to be generally parallel to the Y-axis (i.e., the second axis Ay). Those subareas A10 may be square areas, for example. Each of those subareas A10 has its size set such that when the mover 2, currently located in the subarea A10, turns on the spot, the mover 2 does not interfere with any object (such as another mover 2) currently located outside of that subarea A10. Therefore, the size of the respective subareas A10 may be determined to be an appropriate size according to the size of the mover 2 or any other factor. In this embodiment, the size of each subarea A10 is determined to have a length L1 of 180 cm each side.

In the mover control system 1A according to this embodiment, the route determiner 32A regards the center location Gc1 of each subarea A10 as a node Ndm, where the suffix "m" of the node Ndm may be a natural number (such as 1, 2, 3, and so on). As used herein, the nodes Ndm are control points where the mover control system 1A is allowed to control the mover 2. That is to say, the mover control system 1A is able to control the movement of the mover 2 on a node-by-node basis. Therefore, in making the mover 2 move from the first spot to the second spot, the mover control system 1A according to this embodiment is allowed to specify nodes Ndm corresponding to the first spot, the second spot, and the turning point, respectively, from the plurality of nodes Ndm. In the example illustrated in FIG. 20, nodes Nd1, Nd2, and Nd12 are specified as the first spot, the second spot, and the turning point Pt1, respectively. The mover control system 1A according to this embodiment allows the mover 2 to go straight in directions that are generally parallel to the X-axis (first axis Ax) and the Y-axis (second axis Ay), respectively. In the following description, the movement of the mover 2 along a straight course will be hereinafter referred to as "straight movement" and a course along which the mover 2 goes straight will be hereinafter referred to as a "straight course." The mover control system 1A according to this embodiment controls the mover 2 such that the mover travels along the straight course that is generally parallel to either the X-axis or the Y-axis, except the curve section where the mover 2 changes its traveling direction.

As described above, the route determiner 32A determines, in accordance with a predetermined decision condition, the traveling route, along which the mover 2 should travel from the first spot to the second spot, to be either the first traveling route RT1 (see FIG. 20) or the second traveling route RT2 (see FIG. 20).

Determining the traveling route of the mover 2 to be the first traveling route RT1 eliminates the need for the mover 2 to stop and turn at the turning point Pt1 (i.e., the spot corresponding to the node Nd12 in the example illustrated in FIG. 20) unlike the second traveling route RT2. This provides a mover control system 1A that would take a shorter time to move the mover 2.

(2) Configuration of Server Device

The server device 3A includes a first communications device 31, the route determiner 32A, and a first storage device 39 as shown in FIG. 19.

The route determiner 32A determines a traveling route, along which the mover 2 should move from a first spot to a second spot within the predetermined area A1, and transmits instruction information, including information about the traveling route, to a client terminal 4 associated with the mover 2 via the first communications device 31. When finding the second spot (i.e., a spot corresponding to the node Nd2) not located on the straight course CS1 that the mover 2 takes to go straight from the first spot (i.e., a spot corresponding to the node Nd1) as shown in FIG. 20, the route determiner 32A determines, in accordance with a predetermined decision condition, the traveling route for the mover 2 to be either the first traveling route RT1 or the second traveling route RT2. The first traveling route RT1 requires the mover 2 to change its traveling direction by traveling along a curve section CV1 (curve-traveling) that is set halfway through the first traveling route RT1 leading from the first spot to the second spot. The second traveling route RT2 requires the mover 2 to change its traveling direction by turning at a turning point Pt1 (i.e., a spot corresponding to the node Nd12) (i.e., doing turnaround traveling) that is set halfway on the course leading from the first spot to the second spot.

In this case, the decision condition, on which a determination is made which traveling route a target mover 2A (see FIG. 20), which is one of a plurality of movers 2, should take to move from the first spot to the second spot, includes a traveling status of another mover 2B (see FIG. 20), other than the target mover 2A, out of the plurality of movers 2. The route determiner 32A determines a traveling route for each of the plurality of movers 2, and every mover 2 may be the target mover 2A. If the route determiner 32A regards one of the plurality of movers 2 as the target mover 2A and determines the traveling route for the target mover 2A, another mover, other than the target mover 2A, out of the plurality of movers 2 may be the other mover 2B.

As used herein, the "traveling status" of the other mover 2B refers to the status of the other mover 2B on the traveling route along which the target mover 2A is made to travel from the first spot (i.e., a spot corresponding to the node Nd1) to the second spot (i.e., a spot corresponding to the node Nd2). That is to say, the route determiner 32A determines the traveling route to be either the first traveling route RT1 or the second traveling route RT2 according to the traveling status of the other mover 2B on the traveling route along which the target mover 2A is made to travel from the first spot to the second spot. As used herein, the status of the other mover 2B on the traveling route refers to information about whether or not the other mover 2B is present on the traveling route and information about whether or not the other mover 2B on the traveling route, if any, is traveling (moving).

On determining the traveling route for the target mover 2A, the route determiner 32A has the instruction information about the traveling route thus determined transmitted from the first communications device 31 to the client terminal 4 associated with the target mover 2A. This allows the controller 42 of the client terminal 4 to control the movement of the target mover 2A in accordance with the instruction information received from the route determiner 32A.

(3) Operation of Fourth Embodiment

Figure 22:
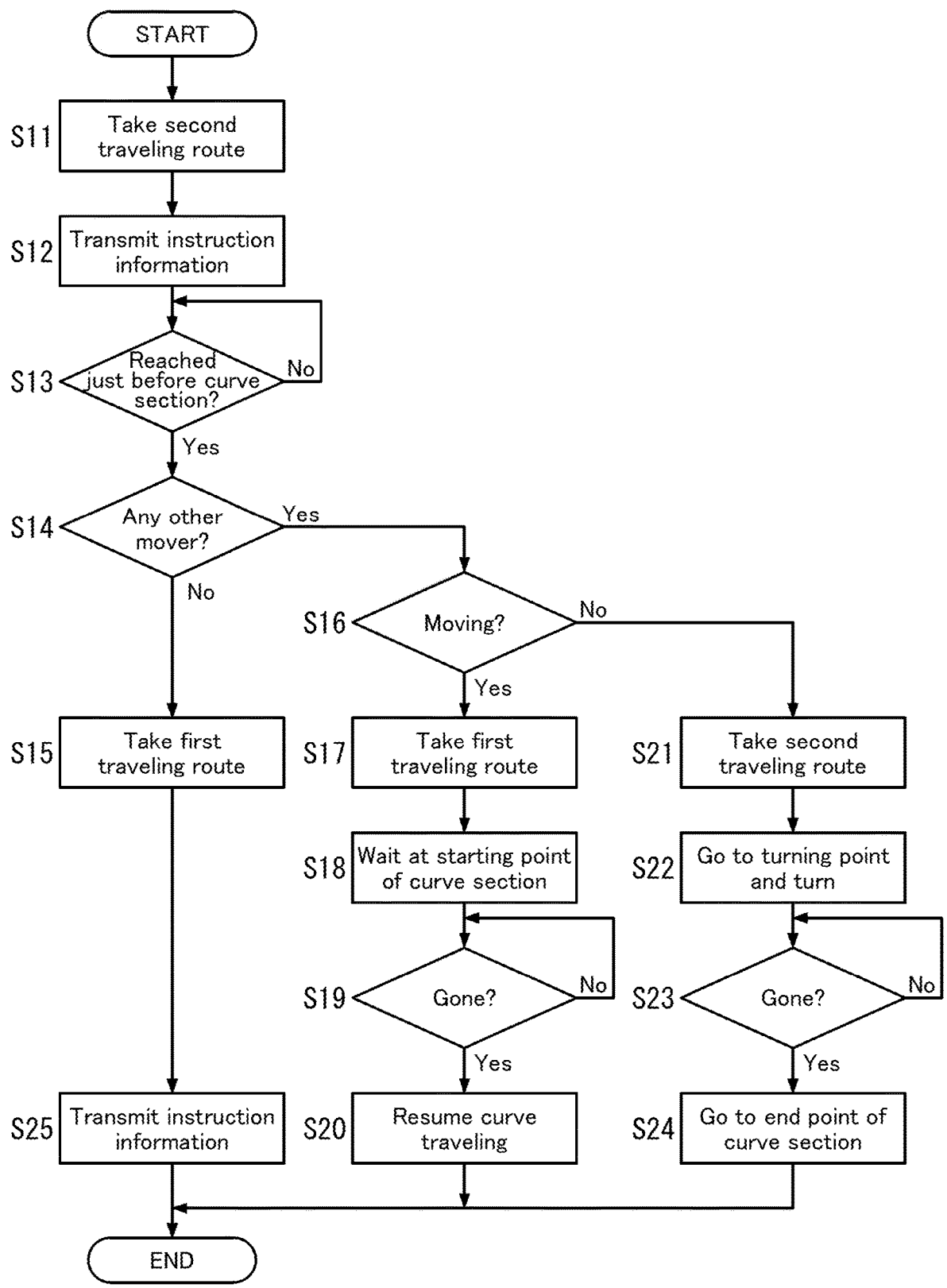
FIG. 22 is a flowchart showing the procedure of operation of the mover control system.
Figure 23:
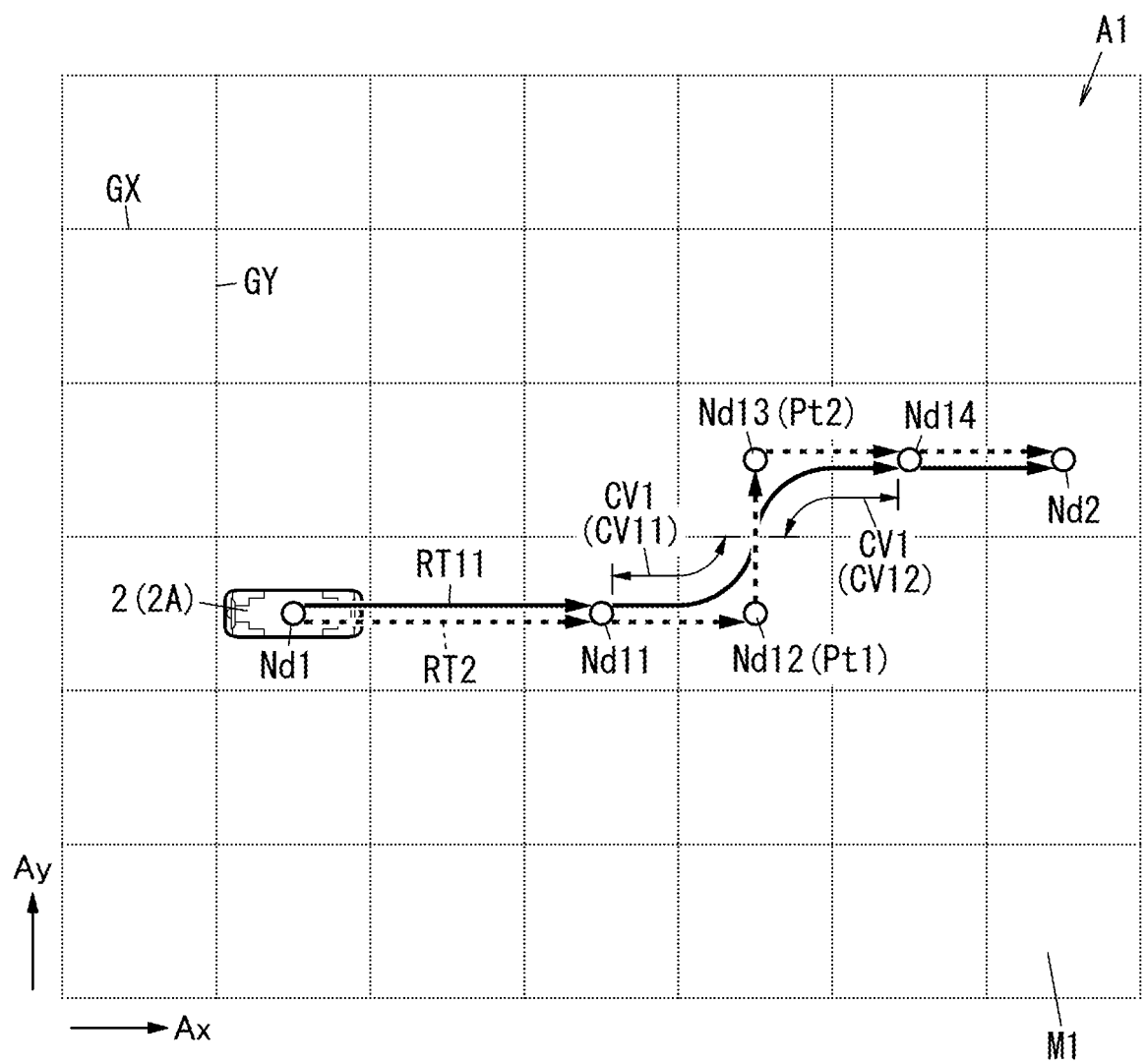
FIG. 23 is a schematic representation showing a concept of the operation of the mover control system by illustrating, as another top view of the predetermined area, how the mover travels within the predetermined area.

Next, it will be described in detail with reference to FIG. 20 and FIGS. 21-23 how the mover control system 1A and mover system 10 according to this embodiment operate. FIGS. 20 and 23 schematically illustrate, as top views of the predetermined area A1, how the mover 2 travels within the predetermined area A1. Note that in FIGS. 20 and 23, the grid lines GX and GY dividing the subarea A10, the circles indicating the nodes Ndm, and the lines indicating the traveling routes for the mover 2 (target mover 2A) are all shown there for illustrative purposes only and are actually absent from the predetermined area A1.

In the following description, it will be described, as an example, how the mover control system 1A and mover system 10 operate to make the target mover 2A move from the first spot (i.e., the spot corresponding to the node Nd1) to the second spot (i.e., the spot corresponding to the node Nd2) within the predetermined area A1.

Figure 21:
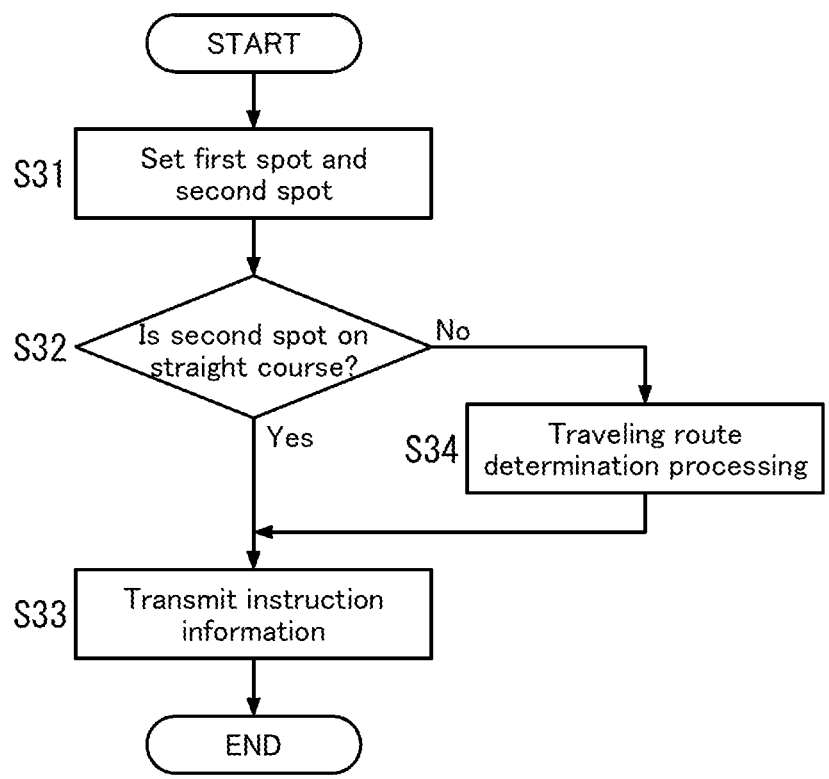
FIG. 21 is a flowchart showing the procedure of operation of the mover control system.

FIG. 21 is a flowchart showing how the mover control system 1A operates. The route determiner 32A of the server device 3A sets, based on the information provided by the information terminal 6, for example, a first spot as the departure point for the target mover 2A and a second spot as the destination point for the target mover 2A (in Step S31), and then determines whether or not the second spot is located on the straight course CS1 (in Step S32).

When finding the second spot located on the straight course CS1 (if the answer is YES in Step S32), the route determiner 32A determines the traveling route for the target mover 2A to be a path connecting the first and second spots linearly and transmits instruction information about the traveling route to the client terminal 4 via the first communications device 31 (in Step S33). On receiving the instruction information from the server device 3A via the second communications device 41, the controller 42 of the client terminal 4 makes the target mover 2A travel along the linear traveling route in accordance with the instruction information.

On the other hand, when finding the second spot not located on the straight course CS1 (if the answer is NO in Step S32), the route determiner 32A determines, in accordance with a predetermined decision condition, the traveling route for the target mover 2A to be either the first traveling route RT1 or the second traveling route RT2 (in Step S34). On determining the traveling route for the target mover 2A, the route determiner 32A transmits instruction information about the traveling route to the client terminal 4 via the first communications device 31 (in Step S33). On receiving the instruction information from the server device 3A via the second communications device 41, the controller 42 of the client terminal 4 makes the target mover 2A travel along the traveling route determined by the route determiner 32A in accordance with the instruction information.

The processing step S34 in which the route determiner 32A determines the traveling route for the target mover 2A will be described in further detail with reference to the flowchart of FIG. 22.

The route determiner 32A determines, at the timing when the target mover 2A departs from the first spot, the traveling route for the target mover 2A to be the second traveling route RT2 in which the mover 2A should change the traveling direction by turning at the turning point (in Step S11). In that case, the route determiner 32A defines the subareas A10, through which the target mover 2A passes in moving from the current spot to the turning point Pt1, as a reserved area, to which the access of the other mover 2B is restricted. Restricting the access of the other mover 2B to the reserved area for the target mover 2A reduces the chances of the other mover 2B interfering with the target mover 2A moving toward the turning point Pt1. The route determiner 32A transmits the instruction information, instructing that the second traveling route RT2 should be taken, to the client terminal 4 associated with the target mover 2A via the first communications device 31 (in Step S12). On receiving the instruction information from the server device 3A via the second communications device 41, the controller 42 of the client terminal 4 makes the target mover 2A travel along the second traveling route RT2 in accordance with the instruction information. That is to say, the controller 42 of the client terminal 4 makes the target mover 2A move straight from the first spot (i.e., the spot corresponding to the node Nd1) toward the turning point Pt1 (i.e., the spot corresponding to the node Nd12).

The route determiner 32A detects the current location of the target mover 2A based on the information received at regular intervals from the client terminal 4 of the target mover 2A to determine whether or not the target mover 2A has reached a spot right before the curve section CV1 (in Step S13). As used herein, the "spot right before the curve section CV1" may refer to a spot corresponding to the node Nd11, defining the starting point of the curve section CV1, and may be a spot located at a distance L1 from the node Nd12. On detecting that the center of the target mover 2A (i.e., its center in a plan view) has reached the spot right before the curve section CV1, the route determiner 32A determines that the target mover 2A should have reached the spot right before the curve section CV1.

When the target mover 2A reaches the spot right before the curve section CV1 (if the answer is YES in Step S13), the route determiner 32A determines, according to the status of the other mover 2B in a target section A20 (see FIG. 20) including at least a part of the curve section CV1, which traveling route the target mover 2A should take. The target section A20 may be, for example, a section including one subarea, covering the end point of the curve section CV1 (i.e., the spot corresponding to the node Nd13), out of the plurality of subareas A10 defined by dividing the predetermined area A1.

When finding no other movers 2B present in the target section A20 (if the answer is NO in Step S14), the route determiner 32A determines the traveling route for the target mover 2A to be the first traveling route RT1 (in Step S15). That is to say, when finding no other movers 2B present in the target section A20, covering at least a part of the curve section CV1, at the timing when the target mover 2A is going to enter the curve section CV1, the route determiner 32A determines the traveling route for the target mover 2A to be the first traveling route RT1. On determining the traveling route for the target mover 2A to be the first traveling route RT1, the route determiner 32A transmits instruction information, indicating that the first traveling route RT1 be taken, from the first communications device 31 to the client terminal 4 associated with the target mover 2A (in Step S25). On receiving the instruction information from the server device 3A via the second communications device 41, the controller 42 of the client terminal 4 makes the target mover 2A travel along the first traveling route RT1 through the end point of the curve section CV1 (i.e., the spot corresponding to the node Nd13) in accordance with the instruction information.

On the other hand, when finding any other mover 2B present in the target section A20 (if the answer is YES in Step S16), the route determiner 32A determines whether or not the other mover 2B present in the target section A20 is now traveling (in Step S16). As used herein, if the other mover 2B is traveling, it means that the wheels of the other mover 2B are turning, i.e., the other mover 2B is actually moving.

When finding the other mover 2B present in the target section A20 traveling (if the answer is YES in Step S16), the route determiner 32A determines the traveling route for the target mover 2A to be the first traveling route RT1 (in Step S17). Then, the route determiner 32A has instruction information, instructing the mover 2 to wait at the spot corresponding to the starting point of the curve section CV1 (i.e., the spot corresponding to the node Nd11), transmitted from the first communications device 31 to the client terminal 4 (in Step S18). On receiving the instruction information from the server device 3A via the second communications device 41, the controller 42 of the client terminal 4 makes the target mover 2A stop at the spot corresponding to the starting point of the curve section CV1 in accordance with the instruction information. Thereafter, when determining, in accordance with the information acquired at regular intervals from the other mover 2B, that the other mover 2B has gone out of the target section A20 (if the answer is YES in Step S19), the route determiner 32A has instruction information, instructing the target mover 2A to resume traveling along the first traveling route RT1, transmitted from the first communications device 31 to the client terminal 4 (in Step S20). On receiving the instruction information from the server device 3A via the second communications device 41, the controller 42 of the client terminal 4 makes the target mover 2A travel along the first traveling route RT1 (i.e., travel along the curve) in accordance with the instruction information. In this manner, the route determiner 32A changes the traveling routes of the target mover 2A from the second traveling route RT2 instructed in Step S12 into the first traveling route RT1. In summary, the route determiner 32A instructs the target mover 2A (i.e., the client terminal 4 associated with the target mover 2A) to take the second traveling route RT2 until just before the target mover 2A enters the curve section CV1. Then, when determining that the traveling route should be the first traveling route RT1, the route determiner 32A instructs the target mover 2A (i.e., the client terminal 4 associated with the target mover 2A) to take the first traveling route RT1 at the timing when the target mover 2A enters the curve section CV1. Therefore, even if the client terminal 4 fails to receive, due to a communication error, for example, the instruction information instructing that the first traveling route RT1 should be taken as the traveling route, the controller 42 of the client terminal 4 is still able to make the target mover 2A go to the turning point in accordance with the instruction information received previously. This reduces the chances of the target mover 2A stopping at the starting point of the curve section CV1 due to failure to receive the instruction information from the server device 3A.

On the other hand, when finding the other mover 2B present in the target section A20 being at a stop (if the answer is NO in Step S16), the route determiner 32A determines that the traveling route for the target mover 2A should be the second traveling route RT2 along which the mover 2 needs to change the traveling direction by turning at the turning point (in Step S21). The route determiner 32A has instruction information, instructing the target mover 2A to go to the turning point Pt1 (i.e., the spot corresponding to the node Nd12), turn at the turning point Pt1, and wait there on the spot, transmitted from the first communications device 31 to the client terminal 4 (in Step S22). On receiving the instruction information from the server device 3A via the second communications device 41, the controller 42 of the client terminal 4 makes the target mover 2A go to the turning point Pt in accordance with the instruction information. Then, the controller 42 of the client terminal 4 makes the target mover 2A turn 90 degrees on the spot such that the target mover 2A will head toward the end point of the curve section CV1 (i.e., the spot corresponding to the node Nd13) and then stop there. That is to say, when finding another mover 2B present at the end point of the curve section CV1, the route determiner 32A determines that the second traveling route RT2 should be taken, thus making the target mover 2A go to the turning point Pt1 and turn and stop at the turning point Pt1. Thereafter, when determining, based on the information acquired at regular intervals from the other mover 2B, that the other mover 2B has gone out of the target section A20 (if the answer is YES in Step S23), the route determiner 32A has instruction information, instructing the target mover 2A to move straight toward the end point of the curve section CV1 (i.e., the spot corresponding to the node Nd13), transmitted from the first communications device 31 to the client terminal 4 (in Step S24). On receiving the instruction information from the server device 3A via the second communications device 41, the controller 42 of the client terminal 4 makes the target mover 2A travel straight from the turning point Pt1 through the end point of the curve section CV1 along the second traveling route RT2 in accordance with the instruction information.

When the target mover 2A reaches the vicinity of the end point of the curve section CV1 in this manner, the route determiner 32A has instruction information, instructing the target mover 2A to move straight from the end point of the curve section CV1 through the second spot, transmitted from the first communications device 31 to the client terminal 4. In this case, on finding the Y-axis distance from the end point of the curve section CV1 to the center of the target mover 2A shorter than the length L1 and also finding the angle formed between the traveling direction of the target mover 2A and the Y-axis equal to or smaller than ±10 degrees, the route determiner 32A determines that the target mover 2A have reached the vicinity of the end point. On receiving the instruction information from the server device 3A via the second communications device 41, the controller 42 of the client terminal 4 makes the target mover 2A move toward the second spot in accordance with the instruction information. This allows the mover control system 1A to move the target mover 2A from the first spot (i.e., the spot corresponding to the node Nd1) through the second spot (i.e., the spot corresponding to the node Nd2).

In this embodiment, on determining the traveling route for the target mover 2A, the route determiner 32A defines, according to the traveling route of the target mover 2A, at least one subarea, where the target mover 2A is moving, out of the plurality of subareas A10 to be a reserved area to which the access of the other mover 2B is restricted. In this case, the route determiner 32A determines the traveling route for the target mover 2A such that the traveling route passes through one subarea A10, not defined to be the reserved area, out of the plurality of subareas A10 within the predetermined area A1. This allows the traveling routes for the respective movers 2 to be determined such that the movers 2 do not interfere with each other.

When determining the traveling route for the target mover 2A to be the second traveling route RT2, the route determiner 32A defines the subareas, through which the target mover 2A passes between the starting point and end point of the curve section CV1 (i.e., the subareas corresponding to the nodes Nd11, Nd12, and N13, respectively), to be a reserved area RA2 (see FIG. 20).

On the other hand, when determining the traveling route for the target mover 2A to be the first traveling route, the route determiner 32A defines subareas corresponding to the curve section CV1, along which the target mover 2A travels, and a subarea located inside of the curve section CV1 to be a reserved area RA1 (see FIG. 20). In traveling along the curve section CV1, the target mover 2A could reach the subarea located inside of the curve section CV1, and therefore, the access of the other mover 2B to the subarea located inside of the curve section CV1 needs to be restricted. That is why the route determiner 32A defines the subareas corresponding to the curve section CV1 (i.e., the subareas corresponding to the nodes Nd11, Nd12, and Nd13) and the subarea located inside of the curve section CV1 to be the reserved area RA1.

In this manner, the route determiner 32A makes the reserved area RA1 when the target mover 2A travels along the first traveling route RT1 different from the reserved area RA2 when the target mover 2A travels along the second traveling route RT2. The route determiner 32A defining the reserved area according to the traveling route in this manner reduces the chances of unnecessary subareas being defined as the reserved area and also reduces the chances of the target mover 2A interfering with the other mover 2B. The reserved area RA2 for the second traveling route RT2 along which the mover changes its traveling direction by turning around at the turning point is narrower than the reserved area RA1 for the first traveling route RT1, thus allowing the space to be used more efficiently.

In the embodiment described above, the traveling route leading from the first spot to the second spot includes a single curve section CV1. However, the traveling route for the target mover 2A may be changed appropriately. Optionally, the traveling route leading from the first spot to the second spot may include a plurality of curve sections. For example, a traveling route leading from a first spot (i.e., a spot corresponding to a node Nd1) to a second spot (i.e., a spot corresponding to a node Nd2) may include two curve sections CV1 (CV11, CV12) as shown in FIG. 23. In that case, the starting point of the curve section CV11 is a spot corresponding to a node Nd11 and the end point of the curve section CV11 becomes an intermediate spot between a spot corresponding to a node Nd12 and a spot corresponding to a node Nd13. The starting point of the curve section CV12 is an intermediate spot between the spot corresponding to the node Nd12 and the spot corresponding to the node Nd13, and the end point of the curve section CV12 becomes a spot corresponding to a node Nd14. In that case, the route determiner 32A determines, in accordance with the predetermined decision condition, at a point just before the curve section CV11, the traveling route for the target mover 2A to be either the first traveling route that requires the target mover 2A to travel along the curve section CV11 or the second traveling route that requires the target mover 2A to turn around at the turning point Pt1. In addition, the route determiner 32A also determines, in accordance with the predetermined decision condition, at a point just before the curve section CV12, the traveling route for the target mover 2A to be either the first traveling route that requires the target mover 2A to travel along the curve section CV12 or the second traveling route that requires the target mover 2A to turn around at the turning point Pt2.

(4) Variations of Fourth Embodiment

The fourth embodiment described above is only one of various embodiments of the present disclosure, and may be readily modified, changed, replaced, or combined with any other embodiments, depending on a design choice or any other factor, without departing from a true spirit and scope of the present disclosure.

Also, the same function as that of the mover control system 1A according to the fourth embodiment may be implemented as a mover control method, a computer program, or a non-transitory storage medium that stores the computer program thereon, for example. A mover control method according to an aspect includes the following processing to be performed when determining a traveling route that allows a mover 2 traveling within a predetermined area A1 to move from a first spot Nd1 to a second spot Nd2. Specifically, when finding the second spot Nd2 not located on a straight course CS1, which is a course that the mover 2 takes to go straight from the first spot Nd1 toward the second spot Nd2, the mover control method includes determining, in accordance with a predetermined decision condition, the traveling route to be either a first traveling route RT1 or a second traveling route RT2. The first traveling route RT1 requires the mover 2 to change its traveling direction by traveling along a curve section CV1 that is set halfway through the first traveling route RT1 leading from the first spot Nd1 to the second spot Nd2. The second traveling route RT2 requires the mover 2 to change its traveling direction by turning at a turning point Pt1, Pt2 that is set halfway through the straight course CS1 leading from the first spot Nd1 to the second spot Nd2. A (computer) program according to another aspect is designed to make a computer system execute the mover control method described above.

Figure 24:
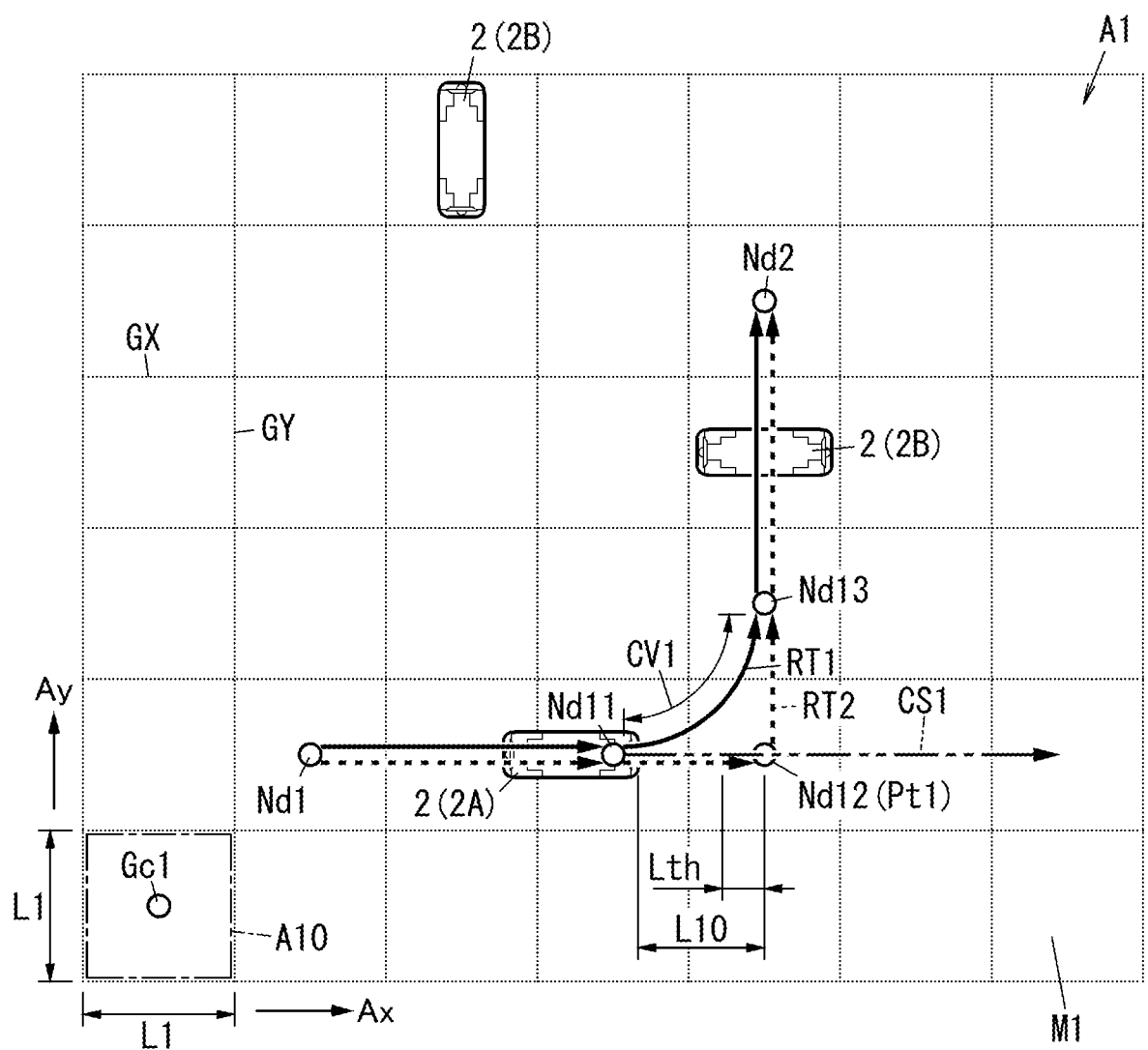
FIG. 24 is a schematic representation showing a concept of the operation of a mover control system according to a variation of the fourth embodiment by illustrating, as a top view of a predetermined area, how the mover travels within the predetermined area.

In the fourth embodiment, the decision condition on which the route determiner 32A determines the traveling route for the target mover 2A may include a condition that a distance L10 (see FIG. 24) from a current location of the target mover 2A to the turning point Pt1 be equal to or less than a predetermined threshold value Lth. The threshold value Lth may be determined based on the minimum radius of rotation of the mover 2, for example. In this embodiment, the distance between adjacent nodes (i.e., the length L1 of each side of the subarea A10) is 180 cm and the threshold value Lth is 50 cm, for example. The route determiner 32A acquires information about the current location of the target mover 2A at regular intervals, and determines, when finding the distance L10 from the current location of the target mover 2A to the turning point Pt1 equal to or less than the threshold value Lth, the traveling route to be the second traveling route RT2. In this manner, when the target mover 2A has approached the turning point Pt1 to the extent that the distance L10 becomes equal to or less than the threshold value Lth, the route determiner 32A determines the traveling route for the target mover 2A to be the second traveling route RT2, thus reducing the chances of the target mover 2A turning at a radius of curvature smaller than a predetermined radius of curvature. As used herein, the "predetermined radius of curvature" is a radius of curvature in a situation where the target mover 2A turns at a spot where the distance L10 is equal to the threshold value Lth, and is a value approximately equal to the threshold value Lth.

In the fourth embodiment described above, the first spot, the second spot, and the turning point are spots corresponding to respective nodes that are set on the map M1 corresponding to the predetermined area A1. However, this is only an example and should not be construed as limiting. Alternatively, the first spot, the second spot, and the turning point may also be arbitrary spots in the predetermined area A1. In the fourth embodiment, the first spot may be the departure point of the mover 2 or a halfway point on the traveling route. Likewise, the second spot may be the destination point of the mover 2 or a halfway point on the traveling route.

Also, in the fourth embodiment described above, the mover 2 changes its traveling direction by turning 90 degrees at the turning point. However, this is only an example and should not be construed as limiting. Alternatively, the mover 2 may also change its traveling direction by turning 180 degrees, 270 degrees, or any other arbitrary angle at the turning point. In addition, the mover 2 changes its traveling direction by turning counterclockwise in a top view. However, this is only an example and should not be construed as limiting. Alternatively, the mover 2 may also change its traveling direction by turning clockwise in a top view. Furthermore, in the fourth embodiment described above, the radius of rotation at the curve section CV1 is equal to the length L1 corresponding to each side of the subarea A10. Alternatively, the radius of rotation at the curve section CV1 may also be integral number of times as long as the length L1 or any other arbitrary value.

Furthermore, in the fourth embodiment described above, the decision condition on which the route determiner 32A determines the traveling route for the target mover 2A is condition for the other mover 2B. However, this is only an example and should not be construed as limiting. In the mover control system 1A and mover system 10 according to this embodiment, the mover 2 is implemented as a carrier mover configured to mount an object (such as the burden 92) thereon. In this case, the decision condition for determining the traveling route may include a status of the object mounted on the target mover 2A. That is to say, the route determiner 32A may determine, according to the status of the object mounted on the target mover 2A, the traveling route for the target mover 2A to be either the first traveling route RT1 or the second traveling route RT2. The first traveling route RT1 that requires the target mover 2A to travel along the curve section would apply greater acceleration to the object mounted on the target mover 2A than the second traveling route RT2 that requires the target mover 2A to turn at the turning point. The route determiner 32A takes the weight, the balance of the center of gravity, the degree of stability, and other factors of the object mounted on the target mover 2A into account, and determines, when expecting the object mounted to turn without falling down or dropping, the traveling route for the target mover 2A to be the first traveling route RT1, thus shortening the amount of time it takes to move the target mover 2A. Note that the mover 2 does not have to be a carrier mover to mount the burden 92 thereon but may also be any of various types of movers designed to accommodate humans. Examples of such movers include carts, vehicles, electric wheelchairs, and motorized stretchers, all of which are designed to accommodate and carry humans.

The various configurations described for the fourth embodiment (and its variations) may be adopted as appropriate in combination with various configurations described for the first embodiment (and its variations).

(Resume)

As can be seen from the foregoing description, a mover control system (1, 1A) according to a first aspect includes a controller (42), a node generator (32), and a path generator (33). The controller (42) controls a mover (2) traveling within a predetermined area (A1). The node generator (32) generates a pair of specified nodes (Ndm) at respective arbitrary locations on a map (M1) corresponding to the predetermined area (A1). The a pair of specified nodes (Ndm) are nodes where the mover (2) is controllable. The path generator (33) generates a path (Pm) between the pair of specified nodes (Ndm). The controller (42) makes the mover (2) travel along a traveling route (R10) corresponding to the path (Pm) within the predetermined area (A1).

This aspect allows specified nodes (Ndm) to be set at any arbitrary locations on the map (M1) irrespective of the grid lines (G1). That is to say, this enables, instead of setting nodes on the premise that grid lines (G1) should be defined first before any path (Pm) is generated, setting nodes first, and then generating a path (Pm) on the basis of the nodes. Consequently, this mover control system (1, 1A) improves the flexibility of control, while reducing an increase in computational load.

A mover control system (1, 1A) according to a second aspect, which may be implemented in conjunction with the first aspect, further includes a virtual node generator (35). The virtual node generator (35) generates, when an interval between the pair of specified nodes (Ndm) is equal to or greater than an upper limit value (2L), at least one virtual node (Nvm) on the path (Pm) separately from the pair of specified nodes (Ndm).

According to this aspect, generating at least one virtual node (Nvm) on the path (Pm) allows the interval between two adjacent nodes on the path (Pm) to be decreased to less than the upper limit value (2L).

A mover control system (1, 1A) according to a third aspect, which may be implemented in conjunction with the second aspect, further includes a display controller (38) and a user interface (63). The display controller (38) displays a setting screen (D1) including the map (M1). The user interface (63) outputs a command signal in response to at least a user's command of designating a pair of specified locations on the map (M1) on the setting screen (D1). The node generator (32) generates, in accordance with the command signal, the pair of specified nodes (Ndm) at the pair of specified locations on the map (M1).

According to this aspect, the user only needs to designate a pair of specified locations on the map (M1) to generate the pair of specified nodes (Ndm) at the pair of specified locations and also generate at least one virtual node (Nvm) between the pair of specified nodes (Ndm). Thus, compared with a grid method that requires the user to design a traveling route while specifying squares one by one on a grip map in order to design a control plan for controlling the mover (2), this reduces the number of points to be specified on the map (M1) by the user. In other words, even when the mover (2) needs to be controlled along a relatively long straight route, for example, this mover control system (1, 1A) requires the user to designate just the pair of specified locations, respectively defining both ends (namely, a starting point and an end point) of the straight route, to select the straight route. Consequently, this mover control system (1, 1A) facilitates the design of a control plan.

In a mover control system (1, 1A) according to a fourth aspect, which may be implemented in conjunction with the third aspect, each of the nodes is a control point where at least one of a traveling velocity or traveling direction of the mover (2) is controllable.

This aspect allows at least one virtual node (Nvm) generated between the pair of specified nodes (Ndm) to be used as a control point as well, thus enabling at least one of the traveling velocity or traveling direction of the mover (2) to be controlled at a smaller step.

A mover control system (1, 1A) according to a fifth aspect, which may be implemented in conjunction with the third or fourth aspect, performs, when the path (Pm) or each of the pair of specified nodes (Ndm) satisfies a predetermined restriction condition, a predetermined type of restriction processing of restricting generation of the path (Pm) or each of the pair of specified nodes (Ndm).

This aspect allows a restriction condition to be placed on the generation of some path (Pm) or a pair of specified nodes (Ndm) that would cause any inconvenience for the control of the mover (2) (such as intersection of two paths (Pm)). Therefore, this reduces the chances of the user generating such a path (Pm) or pair of specified nodes (Ndm) that would cause any inconvenience for the control of the mover (2).

A mover control system (1, 1A) according to a sixth aspect, which may be implemented in conjunction with any one of the third to fifth aspects, further includes an exception node generator (36). The exception node generator (36) generates, on the map (M1), at least one exception node (Nem) separately from the pair of specified nodes (Ndm) and the virtual node (Nvm). When a plurality of exception nodes (Nem) are generated at an interval less than a lower limit value (L), the plurality of exception nodes (Nem) are grouped such that a sum of intervals between adjacent ones of the plurality of exception nodes (Nem) is equal to or greater than the lower limit value (L).

This aspect allows nodes to be generated even at an interval less than the lower limit value (L) by generating additional exception nodes (Nem).

A mover control system (1, 1A) according to a seventh aspect, which may be implemented in conjunction with any one of the third to sixth aspects, further includes a location adjuster (37) to adjust a location of at least one of the pair of specified nodes (Ndm). The map (M1) includes a first axis (Ax) and a second axis (Ay) that intersect with each other. The location adjuster (37) adjusts the location of at least one of the pair of specified nodes (Ndm) such that the pair of specified nodes (Ndm) are arranged parallel to the first axis (Ax) or the second axis (Ay) on the map (M1).

This aspect allows the location of at least one of the pair of specified nodes (Ndm) to be adjusted such that even when the user designates the pair of specified locations roughly on the map (M1), the pair of specified nodes (Ndm) still become parallel to the first axis (Ax) or the second axis (Ay).

In a mover control system (1, 1A) according to an eighth aspect, which may be implemented in conjunction with any one of the third to seventh aspects, the node generator (32) generates, in an arbitrary area on the map (M1), a plurality of nodes included in an area template (T1, T2). That is to say, the node generator (32) generates, when the area template (T1, T2) including a combination of a plurality of nodes is set in the arbitrary area on the map (M1) on the setting screen (D1), the plurality of nodes in that arbitrary area on the map (M1).

This aspect allows the plurality of nodes included in the area template (T1, T2) to be set collectively, thus simplifying the design process compared with setting the plurality of nodes one by one.

In a mover control system (1, 1A) according to a ninth aspect, which may be implemented in conjunction with the eighth aspect, the plurality of nodes included in the area template (T1, T2) are movable on the map (M1) on the setting screen (D1) while maintaining their relative positional relationship.

This aspect allows the plurality of nodes included in the area template (T1, T2) to be moved collectively, thus simplifying the design process compared with moving the plurality of nodes one by one.

In a mover control system (1, 1A) according to a tenth aspect, which may be implemented in conjunction with any one of the third to ninth aspects, the display controller (38) displays a map drawing (Dr1) as a plan view of the predetermined area (A1) along with the map (M1) on the setting screen (D1) such that the map drawing (Dr1) overlaps with the map (M1).

This aspect allows the user to design a control plan for controlling the mover (2) while taking, into account, the locations of fittings, furniture, and other types of equipment, which are located within the predetermined area (A1) but not shown on the map (M1), thus improving the efficiency of design of the control plan.

In a mover control system (1, 1A) according to an eleventh aspect, which may be implemented in conjunction with any one of the second to tenth aspects, the virtual node generator (35) determines a numerical number and a location of the at least one virtual node (Nvm) such that an interval between the adjacent nodes on the path (Pm) becomes equal to or greater than a lower limit value (L) and less than the upper limit value (2L).

This aspect allows an appropriate number of virtual nodes (Nvm) to be generated at suitable locations on the path (Pm) such that the interval between adjacent nodes on the path (Pm) is optimized.

A mover control system (1, 1A) according to a twelfth aspect, which may be implemented in conjunction with any one of the first to eleventh aspects, further includes a reservation unit (34). The mover (2) includes a plurality of movers (2), and one of the plurality of movers (2) is picked as a target mover (2t). The reservation unit (34) performs reservation processing of marking one or more of the nodes, associated with the target mover (2t), as occupied. The controller (42) restricts access of any mover (2), other than the target mover (2t), out of the plurality of movers (2) to at least one zone (Zm), corresponding to the one or more nodes marked as occupied, in the predetermined area (A1).

This aspect allows the zone (Zm), corresponding to one of the nodes marked as occupied, to be occupied by the target mover (2t), thus avoiding collision between the plurality of movers (2) in the zone (Zm).

In a mover control system (1, 1A) according to a thirteenth aspect, which may be implemented in conjunction with the twelfth aspect, the reservation unit (34) marks, while performing the reservation processing, a reserved number of the nodes as occupied. The reserved number of nodes are counted in a traveling direction from one of the nodes corresponding to a zone (Zm) where the target mover (2t) is currently located. The reservation unit (34) performs the reservation processing every time the zone (Zm) where the target mover (2t) is currently located changes.

This aspect allows a minimum required reserved number of nodes to be marked as occupied, thus minimizing the number of zones (Zm) occupied by the target mover (2t).

A mover control system (1, 1A) according to a fourteenth aspect, which may be implemented in conjunction with the thirteenth aspect, further includes a communications terminal (5). The communications terminal (5) communicates, by wireless communication via radio waves, with a communications device (second communications device 41) built in the mover (2) traveling within the predetermined area (A1). The reservation unit (34) determines the reserved number according to a status of the wireless communication between the communications terminal (5) and the communications device (second communications device 41).

According to this aspect, the reserved number is not fixed but varies according to the status of the wireless communication, thus allowing the number of zones (Zm) occupied by the target mover (2t) to be set flexibly.

In a mover control system (1, 1A) according to a fifteenth aspect, which may be implemented in conjunction with the fourteenth aspect, the reservation unit (34) determines the reserved number according to the status of the wireless communication such that as radio field strength of the wireless communication decreases, the reserved number increases.

According to this aspect, the lower the radio field strength of the wireless communication is, the larger the number of the zones (Zm) occupied by the target mover (2t) is. This reduces the chances of the target mover (2t) being stagnated in a zone (Zm) where the radio field strength is low.

In a mover control system (1, 1A) according to a sixteenth aspect, which may be implemented in conjunction with any one of the first to fifteenth aspects, the map (M1) includes grid lines (G1). The node generator (32) generates the specified nodes (Ndm) irrespective of locations of the grid lines (G1).

This aspect allows the specified nodes (Ndm) to be set at arbitrary locations on the map (M1) with the grid lines (G1) used as a reference or input aid for setting the nodes.

A mover control system (1, 1A) according to a seventeenth aspect, which may be implemented in conjunction with any one of the first to sixteenth aspects, further includes a route determiner (32A). The route determiner (32A) determines a traveling route that allows the mover (2) to move from a first spot (Nd1) to a second spot (Nd2) and instructs the mover (2) to travel along the traveling route. When finding the second spot (Nd2) not located on a straight course (CS1), the route determiner (32A) determines, in accordance with a predetermined decision condition, the traveling route to be either a first traveling route (RT1) or a second traveling route (RT2). The straight course (CS1) is a course that the mover (2) takes to go straight from the first spot (Nd1) toward the second spot (Nd2). The first traveling route (RT1) requires the mover (2) to change its traveling direction by traveling along a curve section (CV1) that is set halfway through the first traveling route (RT1) leading from the first spot (Nd1) to the second spot (Nd2). The second traveling route (RT2) requires the mover (2) to change its traveling direction by turning at a turning point (Pt1, Pt2) that is set halfway through the straight course (CS1) leading from the first spot (Nd1) to the second spot (Nd2).

According to this aspect, the route determiner (32A) determines, in accordance with a predetermined decision condition, a traveling route for the mover (2) to move from the first spot (Nd1) toward the second spot (Nd2), to be either the first traveling route (RT1) or the second traveling route (RT2). When the traveling route for the mover (2) is determined to be the first traveling route (RT1), the mover (2) does not have to stop and make a turn at the turning point (Pt1, Pt2), which would be required for the mover (2) to make when taking the second traveling route (RT2). Thus, this provides a mover control system (1, 1A) that would shorten the traveling time for the mover (2).

A mover system (10) according to an eighteenth aspect includes: the mover control system (1, 1A) according to any one of the first to seventeenth aspects; and the mover (2).

This aspect allows specified nodes (Ndm) to be set at any arbitrary locations on the map (M1) irrespective of the grid lines (G1). That is to say, this enables, instead of setting nodes on the premise that grid lines (G1) should be defined first before any path (Pm) is generated, setting nodes first, and then generating a path (Pm) on the basis of the nodes. Thus, this mover system (10) improves the flexibility of control, while reducing an increase in computational load.

A mover control method according to a nineteenth aspect is designed to control a mover (2) traveling within a predetermined area (A1). The mover control method includes node generation processing and path generation processing. The node generation processing includes generating a pair of specified nodes (Ndm) at respective arbitrary locations on a map (M1) corresponding to the predetermined area (A1). The pair of specified nodes (Ndm) are nodes where the mover (2) is controllable. The path generation processing includes generating a path (Pm) between the pair of specified nodes (Ndm). The mover control method includes making the mover (2) travel along a traveling route (R10) corresponding to the path (Pm) within the predetermined area (A1).

This aspect allows specified nodes (Ndm) to be set at any arbitrary locations on the map (M1) irrespective of the grid lines (G1). That is to say, this enables, instead of setting nodes on the premise that grid lines (G1) should be defined first before any path (Pm) is generated, setting nodes first, and then generating a path (Pm) on the basis of the nodes. Thus, this mover control method improves the flexibility of control, while reducing an increase in computational load.

A non-transitory storage medium according to a twentieth aspect stores a program designed to make a computer system execute the mover control method according to the nineteenth aspect.

This aspect allows specified nodes (Ndm) to be set at any arbitrary locations on the map (M1) irrespective of the grid lines (G1). That is to say, this enables, instead of setting nodes on the premise that grid lines (G1) should be defined first before any path (Pm) is generated, setting nodes first, and then generating a path (Pm) on the basis of the nodes. Thus, this program improves the flexibility of control, while reducing an increase in computational load.

Note that these aspects are only exemplary aspects of the present disclosure. Optionally, various configurations of the mover control systems (1, 1A) according to the first to fourth embodiments and their variations are also implementable as, for example, a mover control method or a program.

Note that the constituent elements according to the second to seventeenth aspects are not essential elements for the mover control system (1, 1A) but may be omitted as appropriate.

A design support system (100) according to a twenty-first aspect is configured to support the design of a control plan for controlling a mover (2) traveling within a predetermined area (A1). The design support system (100) includes a display controller (38), a user interface (63), a node generator (32), and a virtual node generator (35). The display controller (38) displays a setting screen (D1) including a map (M1) corresponding to the predetermined area (A1). The user interface (63) outputs a command signal in response to at least a user's command of designating a pair of specified locations on the map (M1) on the setting screen (D1). The node generator (32) generates, in accordance with the command signal, a pair of specified nodes (Ndm), where the mover (2) is controllable, at the pair of specified locations on the map (M1). The virtual node generator (35) generates, between the pair of specified nodes (Ndm) on the map (M1), at least one virtual node (Nvm) separately from the pair of specified nodes (Ndm).

According to this aspect, the user only needs to designate a pair of specified locations on the map (M1) to generate the pair of specified nodes (Ndm) at the pair of specified locations first and then generate at least one virtual node (Nvm) between the pair of specified nodes (Ndm). Thus, compared with a grid method that requires the user to design a traveling route while specifying squares one by one on a grip map in order to design a control plan for controlling the mover (2), this reduces the number of points to be specified on the map (M1) by the user. In other words, even when the mover (2) needs to be controlled along a relatively long straight route, for example, this design support system (100) requires the user to designate just the pair of specified locations, respectively defining both ends (namely, a starting point and an end point) of the straight route, to select the straight route. Consequently, this design support system (100) facilitates the design of a control plan.

In a design support system (100) according to a twenty-second aspect, which may be implemented in conjunction with the twenty-first aspect, the pair of specified nodes (Ndm) are generated at arbitrary locations on the map (M1).

This aspect allows specified nodes (Ndm) to be set at any arbitrary locations on the map (M1) irrespective of the grid lines (G1). Thus, this improves the flexibility of control, while reducing an increase in computational load.

In a design support system (100) according to a twenty-third aspect, which may be implemented in conjunction with the twenty-first or twenty-second aspect, each of the nodes is a control point where at least one of a traveling velocity or traveling direction of the mover (2) is controllable.

This aspect allows at least one virtual node (Nvm) generated between the pair of specified nodes (Ndm) to be used as a control point as well, thus enabling at least one of the traveling velocity or traveling direction of the mover (2) to be controlled at a smaller step.

A design support system (100) according to a twenty-fourth aspect, which may be implemented in conjunction with any one of the twenty-first to twenty-third aspects, further includes a path generator (33) to generate, between the pair of specified nodes (Ndm), a path (Pm) defining a traveling route (R10) for the mover (2). The virtual node generator (35) generates the virtual node (Nvm) on the path (Pm).

This aspect allows the traveling route (R10) for the mover (2) to be designed as well.

A design support system (100) according to a twenty-fifth aspect, which may be implemented in conjunction with the twenty-fourth aspect, performs, when the path (Pm) or each of the pair of specified nodes (Ndm) satisfies a predetermined restriction condition, a predetermined type of restriction processing of restricting generation of the path (Pm) or each of the pair of specified nodes (Ndm).

This aspect allows a restriction condition to be placed on the generation of some path (Pm) or a pair of specified nodes (Ndm) that would cause any inconvenience for the control of the mover (2) (such as intersection of two paths (Pm)). Therefore, this reduces the chances of the user generating such a path (Pm) or pair of specified nodes (Ndm) that would cause any inconvenience for the control of the mover (2).

A design support system (100) according to a twenty-sixth aspect, which may be implemented in conjunction with any one of the twenty-first to twenty-fifth aspects, further includes an exception node generator (36). The exception node generator (36) generates, on the map (M1), at least one exception node (Nem) separately from the pair of specified nodes (Ndm) and the virtual node (Nvm). When a plurality of exception nodes (Nem) are generated at an interval less than a lower limit value (L), the plurality of exception nodes (Nem) are grouped such that a sum of intervals between adjacent ones of the plurality of exception nodes (Nem) is equal to or greater than the lower limit value (L).

This aspect allows nodes to be generated even at an interval less than the lower limit value (L) by generating additional exception nodes (Nem).

A design support system (100) according to a twenty-seventh aspect, which may be implemented in conjunction with any one of the twenty-first to twenty-sixth aspects, further includes a location adjuster (37) to adjust a location of at least one of the pair of specified nodes (Ndm). The map (M1) includes a first axis (Ax) and a second axis (Ay) that intersect with each other. The location adjuster (37) adjusts the location of at least one of the pair of specified nodes (Ndm) such that the pair of specified nodes (Ndm) are arranged parallel to the first axis (Ax) or the second axis (Ay) on the map (M1).

This aspect allows the location of at least one of the pair of specified nodes (Ndm) to be adjusted such that even when the user designates the pair of specified locations roughly on the map (M1), the pair of specified nodes (Ndm) still become parallel to the first axis (Ax) or the second axis (Ay).

In a design support system (100) according to a twenty-eighth aspect, which may be implemented in conjunction with any one of the twenty-first to twenty-seventh aspects, the node generator (32) generates, in an arbitrary area on the map (M1), a plurality of nodes included in an area template (T1, T2). That is to say, the node generator (32) generates, when the area template (T1, T2) including a combination of a plurality of nodes is set in the arbitrary area on the map (M1) on the setting screen (D1), the plurality of nodes in that arbitrary area on the map (M1).

This aspect allows the plurality of nodes included in the area template (T1, T2) to be set collectively, thus simplifying the design process compared with setting the plurality of nodes one by one.

In a design support system (100) according to a twenty-ninth aspect, which may be implemented in conjunction with the twenty-eighth aspect, the plurality of nodes included in the area template (T1, T2) are movable on the map (M1) on the setting screen (D1) while maintaining their relative positional relationship.

This aspect allows the plurality of nodes included in the area template (T1, T2) to be moved collectively, thus simplifying the design process compared with moving the plurality of nodes one by one.

In a design support system (100) according to a thirtieth aspect, which may be implemented in conjunction with any one of the twenty-first to twenty-ninth aspects, the display controller (38) displays, as a plan view of the predetermined area (A1), a map drawing (Dr1) along with the map (M1) on the setting screen (D1) such that the map drawing (Dr1) overlaps with the map (M1).

This aspect allows the user to design the control plan for controlling the mover (2) while taking, into account, the locations of fittings, furniture, and other types of equipment, which are located within the predetermined area (A1) but not shown on the map (M1), thus improving the efficiency of design of the control plan.

A design support system (100) according to a thirty-first aspect, which may be implemented in conjunction with any one of the twenty-first to thirtieth aspects, has the function of recognizing structure information included in the map (M1).

This aspect allows the locations of structural elements, such as walls and columns, within the predetermined area (A1) to be recognized automatically from the map (M1) even when the user does not specify those locations.

A design support system (100) according to a thirty-second aspect, which may be implemented in conjunction with the thirty-first aspect, has the function of setting, based on the locations, indicated by the structure information, on the map (M1), a restricted area (A11), to which the mover's (2) access is restricted, on the map (M1).

This aspect allows the restricted area (A11), to which the mover's (2) access is restricted, to be set automatically based on the locations, indicated by the structure information, on the map (M1), even when the user does not specify the restricted area (A11).

A design support system (100) according to a thirty-third aspect, which may be implemented in conjunction with any one of the twenty-first to thirty-second aspects, has the function of setting, on the map (M1), an operation regulated area (A12) where particular types of operation by the mover (2) are regulated.

This aspect allows the particular types of operation by the mover (2) to be regulated in the operation regulated area (A12).

A design support method according to a thirty-fourth aspect is a method for supporting the design of a control plan for controlling a mover (2) traveling within a predetermined area (A1). The design support method includes display control processing, command reception processing, node generation processing, and virtual node generation processing. The display control processing includes displaying a setting screen (D1) including a map (M1) corresponding to the predetermined area (A1). The command reception processing includes receiving at least a user's command of designating a pair of specified locations on the map (M1) on the setting screen (D1). The node generation processing includes generating, in accordance with the user's command, a pair of specified nodes (Ndm), where the mover (2) is controllable, at the pair of specified locations on the map (M1). The virtual node generation processing includes generating, between the pair of specified nodes (Ndm) on the map (M1), at least one virtual node (Nvm) separately from the pair of specified nodes (Ndm).

According to this aspect, the user only needs to designate a pair of specified locations on the map (M1) to generate the pair of specified nodes (Ndm) at the pair of specified locations first and then generate at least one virtual node (Nvm) between the pair of specified nodes (Ndm). Thus, compared with a grid method that requires the user to design a traveling route while specifying squares one by one on a grip map in order to design a control plan for controlling the mover (2), this reduces the number of points to be specified on the map (M1) by the user. In other words, even when the mover (2) needs to be controlled along a relatively long straight route, for example, this design support method requires the user to designate just the pair of specified locations, respectively defining both ends (namely, a starting point and an end point) of the straight route, to select the straight route. Consequently, this design support method facilitates the design of a control plan.

A program according to a thirty-fifth aspect is designed to make a computer system execute the design support method according to the thirty-fourth aspect.

According to this aspect, the user only needs to designate a pair of specified locations on the map (M1) to generate the pair of specified nodes (Ndm) at the pair of specified locations first and then generate at least one virtual node (Nvm) between the pair of specified nodes (Ndm). Thus, compared with a grid method that requires the user to design a traveling route while specifying squares one by one on a grip map in order to design a control plan for controlling the mover (2), this reduces the number of points to be specified on the map (M1) by the user. In other words, even when the mover (2) needs to be controlled along a relatively long straight route, for example, this program requires the user to designate just the pair of specified locations, respectively defining both ends (namely, a starting point and an end point) of the straight route, to select the straight route. Consequently, this program facilitates the design of a control plan.

Note that these aspects are only exemplary aspects of the present disclosure. Optionally, various configurations of the design support system (100) according to the first to fourth embodiments and their variations are also implementable as, for example, a design support method or a program.

Note that the constituent elements according to the twenty-second to thirty-third aspects are not essential elements for the design support system (100) but may be omitted as appropriate.

A mover control system (1, 1A) according to a thirty-sixth aspect includes a route determiner (32A) and a controller (42). The route determiner (32A) determines a traveling route that allows a mover (2) traveling within a predetermined area (A1) to move from a first spot (Nd1) to a second spot (Nd2) and instructs the mover (2) to travel along the traveling route. The controller (42) instructs the mover (2) to travel along the traveling route determined by the route determiner (32A). When finding the second spot (Nd2) not located on a straight course (CS1), the route determiner (32A) determines, in accordance with a predetermined decision condition, the traveling route to be either a first traveling route (RT1) or a second traveling route (RT2). The straight course (CS1) is a course that the mover (2) takes to go straight from the first spot (Nd1) toward the second spot (Nd2). The first traveling route (RT1) requires the mover (2) to change its traveling direction by traveling along a curve section (CV1) that is set halfway through the first traveling route (RT1) leading from the first spot (Nd1) to the second spot (Nd2). The second traveling route (RT2) requires the mover (2) to change its traveling direction by turning at a turning point (Pt1, Pt2) that is set halfway through the straight course (CS1) leading from the first spot (Nd1) to the second spot (Nd2).

According to this aspect, the route determiner (32A) determines, in accordance with a predetermined decision condition, a traveling route for the mover (2) to move from the first spot (Nd1) toward the second spot (Nd2), to be either the first traveling route (RT1) or the second traveling route (RT2). When the mover's (2) traveling route is determined to be the first traveling route (RT1), the mover (2) does not have to stop and make a turn at the turning point (Pt1, Pt2), which would be required for the mover (2) to make when taking the second traveling route (RT2). Thus, this provides a mover control system (1, 1A) that would shorten the traveling time for the mover (2).

In a mover control system (1, 1A) according to a thirty-seventh aspect, which may be implemented in conjunction with the thirty-sixth aspect, the mover (2) includes a plurality of movers (2), one of which is a target mover (2A). The decision condition on which a determination is made which traveling route (RT1, RT2) the target mover (2A) should take to go from the first spot (Nd1) to the second spot (Nd2) includes a traveling status of another mover (2B), other than the target mover (2A), out of the plurality of movers (2).

This aspect allows the route determiner (32A) to determine the traveling route for the target mover (2A) according to the traveling status of the other mover (2B).

In a mover control system (1, 1A) according to a thirty-eighth aspect, which may be implemented in conjunction with the thirty-seventh aspect, the traveling status is a status of the other mover (2B) on the traveling route.

This aspect allows the route determiner (32A) to determine the traveling route for the target mover (2A) according to the traveling status of the other mover (2B) on the traveling route.

In a mover control system (1, 1A) according to a thirty-ninth aspect, which may be implemented in conjunction with the thirty-eighth aspect, the route determiner (32A) determines, on finding no other movers (2B) present in a target section (A20) at a predetermined timing, the traveling route to be the first traveling route (RT1). The predetermined timing is a timing when the target mover (2A) is going to enter the curve section (CV1). The target section (A20) includes at least a part of the curve section (CV1).

This aspect allows, when no other movers (2B) are present in the target section (A20), the target mover (2A) to travel along the first traveling route (RT1), thus shortening the traveling time for the target mover (2A). This is because when no other movers (2B) are present in the target section (A20), the chances of the target mover (2A) interfering with the other movers (2B) while traveling along the first traveling route (RT1) are slim.

In a mover control system (1, 1A) according to a fortieth aspect, which may be implemented in conjunction with any one of the thirty-seventh to thirty-ninth aspects, the route determiner (32A) determines, when finding the other mover (2B) present at an end point of the curve section (CV1), the traveling route to be the second traveling route (RT2). In that case, the route determiner (32A) instructs the target mover (2A) to go to the turning point (Pt1, Pt2) and make a turn and stop at the turning point (Pt1, Pt2).

This aspect reduces the chances of the target mover (2A) interfering with the other mover (2B) by instructing the target mover (2A) to go to the turning point (Pt1, Pt2) and make a turn and stop at the turning point (Pt1, Pt2). In addition, compared with having the target mover (2A) wait before the curve section (CV1), this shortens the traveling time for the target mover (2A) by allowing the target mover (2A) to reach the turning point (Pt1, Pt2).

In a mover control system (1, 1A) according to a forty-first aspect, which may be implemented in conjunction with any one of the thirty-seventh to fortieth aspects, the route determiner (32A) divides the predetermined area (A1) into a plurality of subareas (A10). The route determiner (32A) specifies at least one subarea (A10), where the target mover (2A) is traveling, out of the plurality of subareas (A10) as a reserved area, to which the other mover's (2B) access is restricted. The reserved area when the target mover (2A) is traveling along the first traveling route (RT1) is different from the reserved area when the target mover (2A) is traveling along the second traveling route (RT2).

This aspect allows the reserved area to be changed depending on whether the target mover (2A) is traveling along the first traveling route (RT1) or the second traveling route (RT2). Thus, changing the reserved area according to the traveling route reduces the chances of an unnecessary area being set as the reserved area, and also reduces the chances of the target mover (2A) interfering with the other mover (2B).

In a mover control system (1, 1A) according to a forty-second aspect, which may be implemented in conjunction with any one of the thirty-sixth to forty-first aspects, the decision condition includes a condition that a distance (L10) from a current location of the mover (2) to the turning point (Pt1, Pt2) be equal to or less than a predetermined threshold value (Lth). The route determiner (32A) determines, when finding the distance (L10) equal to or less than the threshold value (Lth), the mover's (2) traveling route to be the second traveling route (RT2).

According to this aspect, if the distance (L10) is equal to or less than the threshold value (Lth), the mover's (2) traveling route is determined to be the second traveling route (RT2), thus reducing the chances of the mover (2) turning at a radius of curvature smaller than a predetermined one. As used herein, the "predetermined radius of curvature" is a radius of curvature in a situation where the mover (2) turns at a spot where the distance (L10) is equal to the threshold value (Lth).

In a mover control system (1, 1A) according to a forty-third aspect, which may be implemented in conjunction with any one of the thirty-sixth to forty-second aspects, the route determiner (32A) instructs the mover (2) to travel along the second traveling route (RT2) until just before the mover (2) enters the curve section (CV1). The route determiner (32A) instructs, when determining the traveling route to be the first traveling route (RT1), the mover (2) to change its traveling routes into the first traveling route (RT1) at a timing when the mover (2) enters the curve section (CV1).

This aspect allows the mover (2) to travel along the second traveling route (RT2) if the route determiner (32A) is unable to convey the instruction to travel along the first traveling route (RT1) to the controller (42).

In a mover control system (1, 1A) according to a forty-fourth aspect, which may be implemented in conjunction with any one of the thirty-sixth to forty-third aspects, the mover (2) is a carrier vehicle to mount an object thereon. The decision condition includes a status of the object (92) mounted on the mover (2).

This aspect allows the route determiner (32A) to determine the traveling route according to the status of the object (92) mounted on the mover (2).

A mover system (10) according to a forty-fifth aspect includes: the mover control system (1, 1A) according to any one of the thirty-sixth to forty-fourth aspects; and the mover (2).

According to this aspect, the route determiner (32A) determines, in accordance with a predetermined decision condition, a traveling route for the mover (2) to move from the first spot (Nd1) toward the second spot (Nd2) to be either the first traveling route (RT1) or the second traveling route (RT2). When the mover's (2) traveling route is determined to be the first traveling route (RT1), the mover (2) does not have to stop and make a turn at the turning point (Pt1, Pt2), which would be required for the mover (2) to make when taking the second traveling route (RT2). Thus, this provides a mover system (10) that would shorten the traveling time for the mover (2).

A mover control method according to a forty-sixth aspect includes the following processing to be performed when determining a traveling route that allows a mover (2) traveling within a predetermined area (A1) to move from a first spot (Nd1) to a second spot (Nd2). Specifically, when finding the second spot (Nd2) not located on a straight course (CS1), which is a course that the mover (2) takes to go straight from the first spot (Nd1) toward the second spot (Nd2), the mover control method includes determining, in accordance with a predetermined decision condition, the traveling route to be either a first traveling route (RT1) or a second traveling route (RT2). The first traveling route (RT1) requires the mover (2) to change its traveling direction by traveling along a curve section (CV1) that is set halfway through the first traveling route (RT1) leading from the first spot (Nd1) to the second spot (Nd2). The second traveling route (RT2) requires the mover (2) to change its traveling direction by turning at a turning point (Pt1, Pt2) that is set halfway through the straight course (CS1) leading from the first spot (Nd1) to the second spot (Nd2).

According to this aspect, a traveling route for the mover (2) to move from the first spot (Nd1) toward the second spot (Nd2) is determined, in accordance with a predetermined decision condition, to be either the first traveling route (RT1) or the second traveling route (RT2). When the mover's (2) traveling route is determined to be the first traveling route (RT1), the mover (2) does not have to stop and make a turn at the turning point (Pt1, Pt2), which would be required for the mover (2) to make when taking the second traveling route (RT2). Thus, this provides a mover control method that would shorten the traveling time for the mover (2).

A program according to a forty-seventh aspect is designed to make a computer system execute the mover control method according to the forty-sixth aspect.

According to this aspect, a traveling route that allows the mover (2) to move from the first spot (Nd1) toward the second spot (Nd2) is determined, in accordance with a predetermined decision condition, to be either the first traveling route (RT1) or the second traveling route (RT2). When the mover's (2) traveling route is determined to be the first traveling route (RT1), the mover (2) does not have to stop and make a turn at the turning point (Pt1, Pt2), which would be required for the mover (2) to make when taking the second traveling route (RT2). Thus, this provides a program that would shorten the traveling time for the mover (2).

Note that these aspects are only exemplary aspects of the present disclosure. Optionally, various configurations of the mover control system (1, 1A) according to the embodiments and their variations are also implementable as, for example, a mover control method, a (computer) program, or a non-transitory storage medium that stores the program thereon.

Note that the constituent elements according to the thirty-seventh to forty-fourth aspects are not essential elements for the mover control system (1, 1A) but may be omitted as appropriate.

The invention claimed is:

1. A mover control system comprising:
a controller configured to control a mover traveling within a predetermined area;
a node generator configured to generate a pair of specified nodes at respective arbitrary locations on a map corresponding to the predetermined area, the pair of specified nodes being nodes where the mover is controllable;
a path generator configured to generate a path connected between the pair of specified nodes,
a virtual node generator configured to, when an interval between the pair of specified nodes is equal to or greater than an upper limit value, generate at least one virtual node on the path connected between the pair of specified nodes, wherein the pair of specified nodes and the at least one virtual node constitute a plurality of nodes on the path, and
the controller being configured to cause the mover to travel along a traveling route corresponding to the path within the predetermined area by instructing the mover on at least one of a traveling velocity or a traveling direction of the mover until the next node is reached, when the mover is located at each of the plurality of nodes on the path.

2. The mover control system of claim 1, further comprising:
a display controller configured to display a setting screen including the map; and
a user interface configured to output a command signal in response to at least a user's command of designating a pair of specified locations on the map on the setting screen, wherein
the node generator is configured to generate, in accordance with the command signal, the pair of specified nodes at the pair of specified locations on the map.

3. The mover control system of claim 2, wherein
each of the nodes is a control point where at least one of a traveling velocity or traveling direction of the mover is controllable.

4. The mover control system of claim 2, wherein
the mover control system is configured to, when the path or each of the pair of specified nodes satisfies a predetermined restriction condition, perform a predetermined type of restriction processing of restricting generation of the path or each of the pair of specified nodes.

5. The mover control system of claim 2, further comprising
an exception node generator configured to generate, on the map, at least one exception node separately from the pair of specified nodes and the virtual node, wherein
when a plurality of exception nodes are generated at an interval less than a lower limit value, the plurality of exception nodes are grouped such that a sum of intervals between adjacent ones of the exception nodes is equal to or greater than the lower limit value.

6. The mover control system of claim 2, further comprising
a location adjuster configured to adjust a location of at least one of the pair of specified nodes, wherein
the map includes a first axis and a second axis that intersect with each other, and
the location adjuster is configured to adjust the location of the pair of specified nodes such that the pair of specified nodes are arranged parallel to either the first axis or the second axis on the map.

7. The mover control system of claim 2, wherein
the node generator is configured to generate the pair of specified nodes over an area template including a combination of a plurality of nodes set in an arbitrary area on the map on the setting screen.

8. The mover control system of claim 7, wherein
the plurality of nodes included in the area template are movable on the map on the setting screen while maintaining their relative positional relationship.

9. The mover control system of claim 2, wherein
the display controller is configured to display a map drawing as a plan view of the predetermined area along with the map on the setting screen such that the map drawing overlaps with the map.

10. The mover control system of claim 1, wherein
the virtual node generator is configured to determine a numerical number and a location of the at least one virtual node such that an interval between adjacent ones of the virtual and specified nodes on the path becomes equal to or greater than a lower limit value and less than the upper limit value.

11. The mover control system of claim 1, further comprising a reservation unit, wherein
the mover includes a plurality of movers, one of the plurality of movers being picked as a target mover,
the reservation unit is configured to perform reservation processing of marking one or more of the nodes, associated with the target mover, as occupied, and
the controller is configured to restrict access of any mover, other than the target mover, out of the plurality of movers to at least one zone, corresponding to the one or more nodes marked as occupied, in the predetermined area.

12. The mover control system of claim 11, wherein
the reservation unit is configured to, while performing the reservation processing, mark a reserved number of the nodes as occupied, the reserved number of nodes being counted in a traveling direction from one of the nodes corresponding to a zone where the target mover is currently located, and
the reservation unit is configured to perform the reservation processing every time the zone where the target mover is currently located changes.

13. The mover control system of claim 12, further comprising
a communications terminal configured to communicate, by wireless communication via radio waves, with a communications device built in the mover traveling within the predetermined area, wherein
the reservation unit is configured to determine the reserved number according to a status of the wireless communication between the communications terminal and the communications device.

14. The mover control system of claim 13, wherein
the reservation unit is configured to determine the reserved number according to the status of the wireless communication such that as radio field strength of the wireless communication decreases, the reserved number increases.

15. The mover control system of claim 1, wherein the map includes grid lines, and
the node generator is configured to generate the specified nodes irrespective of locations of the grid lines.

16. The mover control system of claim 1, further comprising
a route determiner configured to determine a traveling route that allows the mover to move from a first spot to a second spot and instruct the mover to travel along the traveling route, wherein
the route determiner is configured to, when finding the second spot not located on a straight course, determine, in accordance with a predetermined decision condition, the traveling route to be either a first traveling route or a second traveling route,
the straight course is a course that the mover takes to go straight from the first spot toward the second spot,
the first traveling route requires the mover to change its traveling direction by traveling along a curve section that is set halfway through the first traveling route leading from the first spot to the second spot, and
the second traveling route requires the mover to change its traveling direction by turning at a turning point that is set halfway through the straight course leading from the first spot to the second spot.

17. The mover control system of claim 1, wherein:
the controller is configured to cause the mover to travel along the traveling route corresponding to the path within the predetermined area by occupying a portion of the path between the pair of specified nodes based on the at least one virtual node.

18. A mover system comprising:
a mover control system; and
a mover,
the mover control system including:
   a controller configured to control the mover traveling within a predetermined area;
   a node generator configured to generate a pair of specified nodes at respective arbitrary locations on a map corresponding to the predetermined area, the pair of specified nodes being nodes where the mover is controllable;
   a path generator configured to generate a path connected between the pair of specified nodes, and
   a virtual node generator configured to, when an interval between the pair of specified nodes is equal to or greater than an upper limit value, generate at least one virtual node on the path, the at least one virtual node being different from the pair of specified nodes, wherein the pair of specified nodes and the at least one virtual node constitute a plurality of nodes on the path,
the controller being configured to cause the mover to travel along a traveling route corresponding to the path within the predetermined area by instructing the mover on at least one of a traveling velocity or a traveling direction of the mover until the next node is reached, when the mover is located at each of the plurality of nodes on the path.

19. A mover control method for controlling a mover traveling within a predetermined area, the mover control method comprising:
generating a pair of specified nodes at respective arbitrary locations on a map corresponding to the predetermined area, the pair of specified nodes being nodes where the mover is controllable; and
generating a path connected between the pair of specified nodes,
in response to an interval between the pair of specified nodes being equal to or greater than an upper limit value, generating at least one virtual node on the path connected between the pair of specified nodes, wherein the pair of specified nodes and the at least one virtual node constitute a plurality of nodes on the path, and
causing the mover to travel along a traveling route corresponding to the path within the predetermined area by instructing the mover on at least one of a traveling velocity or a traveling direction of the mover until the next node is reached, when the mover is located at each of the plurality of nodes on the path.

20. A non-transitory storage medium storing a program designed to make a computer system execute the mover control method of claim 19.

* * * * *